United States Patent [19]
Matsuishi et al.

[11] Patent Number: 5,463,738
[45] Date of Patent: Oct. 31, 1995

[54] MICROCOMPUTER, PROGRAM DEVELOPMENT APPARATUS, AND PROGRAM DEVELOPMENT SYSTEM

[75] Inventors: Tsugumi Matsuishi; Toshihiko Hori; Shinji Suda, all of Hyogo, Japan

[73] Assignee: Mitsubishi Denki Kabushiki Kaisha, Tokyo, Japan

[21] Appl. No.: 903,201

[22] Filed: Jun. 23, 1992

[30] Foreign Application Priority Data

| | | | |
|---|---|---|---|
| Jun. 27, 1991 | [JP] | Japan | 3-156864 |
| Nov. 25, 1991 | [JP] | Japan | 3-308947 |
| Mar. 13, 1992 | [JP] | Japan | 4-055728 |

[51] Int. Cl.$^6$ ............................................. G06F 13/00
[52] U.S. Cl. ..................... 395/823; 364/DIG. 1; 364/232.8; 364/221.7; 395/427
[58] Field of Search ............................ 395/700, 275, 395/425

[56] References Cited

U.S. PATENT DOCUMENTS 4,514,805  4/1985  McDonough et al. .
4,847,805  7/1989  Ishii et al. .

FOREIGN PATENT DOCUMENTS

| | | |
|---|---|---|
| 1173358 | 4/1989 | Japan . |
| 1158985 | 6/1989 | Japan . |
| 1183218 | 7/1989 | Japan . |
| 1173357 | 7/1989 | Japan . |
| 2230117 | 10/1990 | United Kingdom . |

OTHER PUBLICATIONS

Everson et al, "Emulator Advances In Microcomputers", Electro/86 and Mini/Micro Northeast Conference Record, 1986, 19/2, pp. 1–3.

*Primary Examiner*—Thomas M. Heckler
*Attorney, Agent, or Firm*—Townsend and Townsend and Crew

[57] ABSTRACT

An address detection circuit is formed in a pod so that the circuit generates a detection signal DET when an address signal specifying an address in the address area assigned to a newly-added circuit section is outputted from an evaluation MCU, and a disabling circuit 313 is formed in a port emulation circuit 31a so that the circuit 313 disables an input/output circuit 312 from being set to the input state by responding to the detection signal DET.

7 Claims, 43 Drawing Sheets

MICROCOMPUTER, PROGRAM DEVELOPMENT APPARATUS, AND PROGRAM DEVELOPMENT SYSTEM

BACKGROUND OF THE INVENTION

1. Field of the Invention

The present invention relates to a microcomputer, a program development apparatus for the microcomputer, and a program development system, particularly to the development of programs for Application Specific Integrated Circuits (ASIC).

2. Description of the Prior Art

Recently, demand has grown for development of Large Scale Integrated (LSI) circuits including microcomputer for specific application as electronic equipment is provided with more advanced functions, is further compacted, and becomes less expensive. It is also indispensable to develop a program for each developed LSI.

FIG. 33 is a schematic showing a program development procedure and a program development apparatus for the existing microcomputer (hereafter referred to as MCU).

A program for a MCU to be mounted on the evaluation board 4 is developed by using the program development apparatus 100. The evaluation board 4 is a board which will be operated by an MCU to be operated by a developed program. The program development apparatus 100 includes a host computer 1 for program development, a debugger 2, and a pod 3. A microcomputer 32 for program evaluation (hereafter referred to as evaluation MCU) equivalent to the MCU to be mounted on the evaluation board 4 is mounted on the pod 3. The pod 3 connects with a connector 40 which is connected to a socket 41 on the evaluation board 4 where the MCU is to be mounted. The program development apparatus 100 is manufactured by corresponding to the internal constitution of the MCU to be mounted on the evaluation board 4.

The program development apparatus 100 gives a program or data to the evaluation MCU 33 instead of the internal memory or external memory of the MCU to be mounted on the evaluation board 4 in order to operate the evaluation MCU 32 and traces the signal of each terminal in order to debug the program. The program development apparatus 100 also gives a signal same as the signal under actual operation of the MCU to the evaluation board 4 through the connector 40.

The host computer 1 gives various instructions to the debugger 2 for program development. The debugger 2 controls the operation of the evaluation MCU 32, holds the result of tracing the signal, and controls the pod 3 in accordance with the instructions from the host computer 1. The pod 3 controls exchange of signals between the evaluation MCU 32 and debugger 2 or evaluation board 4 by responding to the address signal outputted from the evaluation MCU 32, various control signals, and control signal given from the debugger 2.

A program developed by the development apparatus 100 is written in a EPROM (Electrically Programmable Read Only Memory) 5. A mask for ROM (Read Only Memory) is made by using the EPROM 5 and the program is written in the ROM 70 in the MCU 7 by using the mask 5.

FIG. 34 shows an approximate constitution of the debugger 2. The debugger 2 includes a control CPU (Central Processing Unit) 21, program memory 22, tracing control circuit 23, break control circuit 24, interface 25, and evaluation MCU control circuit 26. The program memory 22 stores the program for operating the control CPU 21, which is also used to run a developed program when the program is debugged. The control CPU 21 controls each control circuit in the debugger 2. The tracing control circuit 23 performs tracing control after running the program. The break control circuit 24 performs break control. The evaluation MCU control circuit 26 controls the evaluation MCU in the pod 3. The address signal given from the pod 3 is given to the control CPU 21, tracing control circuit 23, break control circuit 24, and evaluation MCU control circuit 26 through the address latch 27. Data is transferred between the control CPU 21 or program memory 22 and the pod 3 through the data bus buffer 28.

FIG. 35 shows an approximate constitution of the pod 3. The pod 3 includes a port emulation circuit 31, evaluation MCU 32, address latch 33, and data bus buffer 34. The port emulation circuit 31 gives data and address signal same as those under actual operation of the MCU to the evaluation board 4 through the data bus DB1 by means of time-sharing. The evaluation MCU 32 gives an address signal to the port emulation circuit 31 and address latch 33 through the address bus AB1.

Data is transferred between the evaluation MCU 32 and the port emulation circuit 31 or data bus buffer 34 through the data bus DB2. Some signal lines of the data bus DB2 are used to transfer data and address signal by means of time-sharing. Input and output signals in the MCU other than those which should pass through the port emulation circuit 31 are transferred between the evaluation MCU 32 and evaluation board 4 through the signal line DB3.

FIG. 36 shows the constitution of the main portion of the port emulation circuit 31 in detail. The port emulation circuit 31 includes an address detection circuit 310 and input/output control circuit 311, and a plurality of input/output circuits. FIG. 36 shows only one input/output circuit 312 related to a set of input/output terminals TP1 and TP2. The input/output terminal TP1 is connected to the evaluation MCU 32 and the input/output terminal TP2 is connected to the evaluation board 4 or debugger 2.

The input/output circuit 312 includes buffers BF1 and BF2, latches LT1 and LT2, transfer gates G1 and G2, and inverters G3 and G4. The address detection circuit 310 detects a predetermined address by responding to the address signal AD given from the evaluation MCU 32 and gives a detection signal to the input/output control circuit 311. That is, the address detection circuit 310 judges whether the the address signal AD given from the evaluation MCU 32 specifies the internal address area of the MCU 32 or the external address area of it and generates a detection signal in accordance with the result of judgment.

The input/output circuit 311 gives control signals CN1 to CN4 to the input/output circuit 312 by responding to the data enable signal /E and read/write signal R/W given from the evaluation MCU 32 and the detection signal given from the address detection circuit 310. Thereby, the input/output circuit 312 is set to the input or output state and an input/output operation timing is determined.

Addresses detected by the address detection circuit 310 are in the chip-inside address area of the MCU 32, which are normally set by hardware assembled in the address detection circuit 310. Because of space saving, the input/output control circuit 311 and address detection circuit 310 frequently comprise a one-chip IC in recent years.

The data enable signal/E indicates the data input/output enabling state for "L" and the data input/output disabling state for "H". The read/write signal R/W indicates the read state for "H" and the write state for "L".

When the control signal CN1 goes "L" and control signal CN2 goes "H", the buffer BF1 turns on and the buffer BF2 turns off. Thereby, the input/output circuit 312 is set to the output state. As a result, the control signal CN3 goes "L". Therefore, a signal (data or address signal) given from the evaluation MCU 32 to the input/output terminal TP1 is outputted to the input/output terminal TP2 through the latch LT1 and buffer BF1.

When the control signal CN1 goes "H" and the control signal CN2 goes "L", the buffer BF1 turns off and the buffer BF2 turns on. Thereby, the input/output circuit 312 is set to the input state. As a result, the control signal CN4 goes "L". Therefore, a signal given from the evaluation board 4 to the input/output terminal TP2 is inputted to the input/output terminal TP1 through the buffer BF2, latch LT2, and transfer gate G2.

The input/output terminal TP1 performs the function equivalent to one input/output terminal of the MCU. When a program is debugged, however, input/output terminals of the evaluation MCU 32 perform the operation for debugging such as outputting of normal operating signal and debugging signal by means of time-sharing. Therefore, the operation timing is controlled and the input/output state is set by the input/output control circuit 311 of the port emulation circuit 31 so that the operation of the input/output terminal TP1 will be apparently equivalent to the normal operation of the MCU.

FIG. 37 shows the constitution of a general MCU. The MCU 32 includes a CPU 321, RAM 322, ROM 323, and peripheral circuit section 324. The peripheral circuit section 324 includes a timer 325 and input/output port 326.

FIG. 38 shows a developed MCU. In the MCU 32, the CPU 321, RAM 322, ROM 323, timer 325, and input/output port 326 are connected to the bus EB for transferring signals. The bus EB, CPU 321, timer 325, and input/output port 326 are connected to a peripheral terminal circuit 327 for exchanging signals between the outside and inside of a chip.

The bus EB, timer 325, input/output port 326, and peripheral terminal circuit 327 correspond to the peripheral circuit section 324 shown in FIG. 37.

FIG. 39 shows another MCU. The CPU 321, RAM 322, ROM 323, A-D converter 328, and UART (Universal Asynchronous Receiver Transmitter) 329 are connected to the bus EB for transferring signals. The bus EB, CPU 321, A-D converter 328, and UART 329 are connected to an input/output circuit 330 for exchanging signals between the outside and inside of a chip. Therefore, signals can directly be exchanged between the CPU 321 and input/output circuit 330, between the A-D converter 328 and input/output circuit 330, and between the UART 329 and input/output circuit 330.

The bus EB, A-D converter 328, UART 329, and input/output circuit 330 correspond to the peripheral circuit section 324 shown in FIG. 37.

FIG. 40 shows an address map of the MCU 32. The address space in FIG. 40 is divided into the chip-inside address area A and chip-outside address area B. The chip-inside address area A includes the SFR (Special Function Register) area a1 assigned to control/data registers such as the timer 325 and input/output port 326 of the peripheral circuit section 324 in the MCU 32, the stored RAM area a2 assigned to the RAM 322 in the MCU 32, and the stored ROM area a3 assigned to the ROM 323 in the MCU 32.

When the evaluation MCU 32 in the program development apparatus 100 outputs an address signal for specifying an address in the SFR area a1, stored RAM area a2, or stored ROM area a3; the input/output control circuit 311 shown in FIG. 36 sets the input/output circuit 312 to the output state so that the signal outputted from the evaluation board 4 (or debugger 2) will not be given to the input/output terminals of the evaluation MCU 32. When the evaluation MCU 32 outputs an address signal for specifying an address in the extended section b, the input/output control circuit 311 sets the input/output circuit 312 to the input state so that the signal outputted from the evaluation board 4 (or debugger 2) will be given to the input/output terminals of the evaluation MCU 32.

An ASIC using an MCU as a core is recently developed in order to make applied equipment intelligent. To quickly develop the ASIC in a short time, new MCUs are frequently developed by using an already developed MCU as a core.

FIG. 41 shows the schematic constitution of the above new MCUs. The MCU 32a includes a MCU core 32b and a newly-added circuit section 32c in the same chip. The MCU core 32b includes a CPU 321, RAM 322, ROM 323, and peripheral circuit section 324 similarly to the already developed MCU 32 shown in FIG. 37.

FIG. 42 shows a new MCU. The MCU 32a includes a MCU core 32b and peripheral terminal circuit 327 having the same constitution as the MCU 32 shown in FIG. 38, and further includes a newly-added circuit section 32c for realizing a specific function.

FIG. 43 shows the constitution of the main portion and signal lines of the MCU 32a shown in FIGS. 41 and 42. Address signals and data are exchanged. between the MCU core 32b and input/output circuit 16 through the signal line L1. The MCU core 32b outputs the latch signal ALE to the newly-added circuit section 32c and outside of the chip through the signal line L2 and outputs the data enable signal/E and read/write signal R/W to the newly-added circuit section 32c and outside of the chip through the signal lines L3 and L4. Signals are exchanged between the newly-added circuit section 32c and input/output circuit 16 through the signal line L5.

An operating-mode determination circuit 17 gives the operating-mode signal S14 to the MCU core 32b by responding to the signal given from an external unit. The operating-mode signal S14 is also given to the newly-added circuit section 32c according to necessity. When the operating mode signal S14 goes "L", the MCU 32a is set to the normal operating mode. When the operating-mode signal S14 goes "H", the MCU 32a is set to the operating mode at development of a program.

FIG. 44 shows the constitution of an input/output circuit 16. The input/output circuit 16 includes a selection circuit 161, buffer 162, and external terminal 163.

The selection circuit 161 receives the MCU output signal DOM and newly-added circuit section output signal DOR and controls the buffer 162 by responding to the MCU control signal CM and newly-added circuit section control signal CR. The buffer 162 outputs the MCU output signal DOM or newly-added circuit section output signal DOR of the outside of the chip through the external terminal 163 and gives the signal to the inside of the chip as the MCU input signal DIM or newly-added circuit section input signal DIR.

The MCU control signal CM, MCU output signal DOM, and MCU input signal DIM are exchanged between the MCU core 32b and input/output circuit 16 through the signal line L1. The newly-added circuit section control signal CR, newly-added circuit section output signal DOR, and newly-added circuit section input signal DIR are exchanged between the newly-added circuit section 32c and input/output circuit 16 through the signal line L5.

FIG. 45 is a timing chart showing the operation when the MCU core 32b reads data from the newly-added circuit section 32c in the MCU 32a.

In the read period TR, the MCU core 32b is set to the read state and the read/write signal R/W is set to "H". Under this state, the MCU core 32b provides the input/output circuit 16 with the address signal AD1 for specifying the newly-added circuit section 32c through the signal line L1. Then, the address signal AD1 is given to the newly-added circuit section 32c from the input/output circuit 16 through the signal line L5.

Then, the address signal AD1 is fetched to the newly-added circuit section 32c by using the change of the latch signal ALE to "H" as a trigger. Thereby, the newly-added circuit section 32c provides the input/output circuit 16 with the data DT1 corresponding to the address signal AD1 through the signal line L5 from the point of time the data enable signal/E outputted from the MCU core 32b goes active ("L").

Moreover, the data DT1 is given to the MCU core 32b from the input/output circuit 16 through the signal line L1. Thus, data is read from the newly-added circuit section 32c.

FIG. 46 shows an address map of the MCU 32a in FIG. 41. Because the chip-inside address area A does not have an address area to be assigned to the memory and register of the newly-added circuit section 32c, the newly-added circuit area "c" to be assigned to the newly-added circuit section 32c is formed in the new chip-inside address area C1 corresponding to part of the chip-outside address area B shown in FIG. 40. Remaining area of address space is used as the chip-outside address area B1 containing the extended section b1.

Therefore, though the newly-added circuit section 32c shown in FIG. 41 is formed on the chip "ch" shared with the MCU core 32b, it is assigned with the the new chip-inside address area C1 other than the chip-inside address area A. The memory and register arranged in the newly-added circuit section 32c is specified by the addresses in the new chip-inside address area C.

[PROBLEM TO BE SOLVED BY THE INVENTION]

To develop a program for the MCU 32a shown in FIG. 41 by using the program development apparatus 100 for the MCU 32 shown in FIG. 37, the MCU 32a shown in FIG. 41 is connected as shown in FIG. 47 instead. of the evaluation MCU 32 shown in FIG. 35. The MCU core 32b in the MCU 32a and the newly-added circuit section 32c are connected to the input/output terminal TP of the port emulation circuit 31 through the bus EB and input/output terminal TM in FIG. 42. The address signal outputted from the MCU core 32b is given to the newly-added circuit section 32c and the port emulation circuit 31 through the address bus AB1.

When the MCU core 32b outputs an address signal for specifying an address in the newly-added circuit area "c" in order to specify the memory or register in the newly-added circuit section 32c, the address detection circuit 310 in the port emulation circuit 31 judges that the address signal specifies an address in the chip-outside address area B in FIG. 40. Therefore, the input/output control circuit 311 sets the input/output circuit 312 to the input state. As a result, the signal outputted from the evaluation board 4 (or debugger 2) is given to the input/output terminal TP of the port emulation circuit 31.

Meanwhile, because the memory or register in the newly-added circuit section 32c is specified by the address signal, signals are outputted from the newly-added circuit section 32.

As a result, the signal outputted from the port emulation circuit 31 collides with the signal outputted from the newly-added circuit section 32c and thereby, the MCU 32a does not normally operate.

Therefore, when a new MCU is developed, it is also necessary to develop a new program development apparatus corresponding to the MCU. As a result, the development cost and labor increase.

Recently, the address detection circuit 310 and input/output control circuit 311 (in FIG. 36) included in the port emulation circuit 31 in the pod 3 are frequently constituted by a one-chip IC. Therefore, change of setting of the address detected by the address detection circuit 310 results in development of a new IC. As a result, a large cost and long term are necessary.

SUMMARY OF THE INVENTION

It is an object of the present invention to provide a microcomputer, program development apparatus, and program development system which do not require development of a new program development apparatus when a new MCU is developed.

(1) Program development apparatus related to first embodiment

The program development apparatus for the microcomputer related to the first embodiment comprises input/output means and disabling means. The microcomputer includes an internal circuit assigned with a first address area. The input/output means is selectively set to the input state for inputting a signal given from an external unit to the microcomputer and to the output state for outputting a signal given from the microcomputer to an external unit by responding to an address signal sent from the microcomputer. The disabling means disables the input means from being set to the input state by receiving the address signal from the microcomputer when the address signal specifies an address in a second address area different from the first address area.

(2) Microcomputer related to embodiment

The microcomputer related to the second embodiment comprises a microcomputer, microcomputer core, logic circuit means, and detection means. The microcomputer core includes an internal circuit assigned with a first address area. The logic circuit means is assigned with a second address area different from the first address area. The detection means outputs a detection signal by receiving the address signal from the microcomputer core when the address signal specifies an address in the second address area.

The microcomputer can further be provided with a common external terminal and selection means. The selection means transfers an input or output signal for either microcomputer core or logic circuit means and a detection signal sent from the detection means to or from the common external terminal by means of time-sharing.

The detection means can output a detection signal even when the address signal specifies an address in a predetermined third address area different form the first and second address areas.

(3) Program development system related to third embodiment

The program development system related to the third embodiment includes a microcomputer and a program development apparatus for developing a program for the microcomputer.

The microcomputer includes a microcomputer core including an internal circuit assigned with a first address area, a logic circuit means assigned with a second address area different from the first address area, and a detection means for receiving an address signal from the microcomputer core. The detection means outputs a detection signal when the address signal specifies an address in the second address area.

The program development apparatus includes an input/output means and disabling means. The input/output means is selectively set to the input state for inputting a signal given from an external unit to the microcomputer and the output state for outputting a signal given from the microcomputer to an external unit by responding to an address signal sent from the microcomputer. The disabling means disables the input/output means from being set to the input state by responding to a detection signal sent from the detection means.

The microcomputer can further be provided with a common external terminal and selection means. The selection means transfers an input or output signal for either microcomputer core or logic circuit means and a detection signal sent from the detection means to or from the common external terminal by means of time-sharing.

The detection means can output a detection signal even when the address signal specifies an address in a predetermined third address area different form the first and second address areas (4) Program development system related to fourth embodiment The program development system related to the fourth embodiment includes a first microcomputer and a program development apparatus for developing a program for the first microcomputer.

The program development apparatus includes a second microcomputer and an input/output means. The second microcomputer includes an internal circuit assigned with a first address area. The input/output means is selectively set to the input state for inputting a signal given from an external unit to the second microcomputer and the output state for outputting a signal given from the second microcomputer to an external unit by responding to an address signal sent from the second microcomputer.

The first microcomputer includes a microcomputer core, logic circuit means, and control means. The microcomputer core includes an internal circuit assigned with the first address area. The logic circuit means is assigned with a second address area different from the first address area. The logic circuit means is connected to the second microcomputer and input/output means. The control means operates the logic circuit means independently.

(5) Microcomputer related to fifth embodiment

The microcomputer related to the fifth embodiment comprises a microcomputer, microcomputer core, logic circuit means, and indication signal output means. The microcomputer core includes an internal circuit assigned with a first address area. The logic circuit means is assigned with a second address area different from the first address area. The indication signal output means receives an address signal from the microcomputer core and outputs an indication signal for indicating disabling of external data from being inputted when the address signal specifies an address in the second address area.

(6) Program development apparatus related to sixth embodiment

The program development apparatus for a microcomputer related to the sixth embodiment comprises an input/output means and signal generation means. The microcomputer includes a control circuit for generating an enable/disable indication signal for indicating enabling or disabling of input/output of data and an internal circuit assigned with the first address area.

The input/output means is set to the input/output enabling state for enabling transfer of an external signal to or from the microcomputer when the enable/disable indication signal indicates "enable" and to the input/output disabling state for disabling transfer of the external signal to or from the microcomputer when the enable/disable indication signal indicates "disable". The signal generation means receives an address signal from the microcomputer and provides the input/output means with an enable/disable indication signal for setting the input/output means to the input/output disabling state instead of the enable/disable indication signal sent from the microcomputer when the address signal specifies an address in a second address area different from the first address area.

(7) Program development apparatus related to seventh embodiment

The program development apparatus for a microcomputer related to the seventh embodiment comprises an input/output means and signal generation means. The microcomputer includes a control circuit for generating a read/write indication signal to indicate read or write of data and an internal circuit assigned with a first address area.

The input/output means is set to the input state for inputting a signal given from an external unit to the microcomputer when the read/write indication signal indicates "read" and to the output state for outputting an signal given from the microcomputer to an external unit when the read/write indication signal specifies "write". The signal generation means receives an address signal from the microcomputer and provides the input/output means with a write indication signal for setting the input/output means to the output state instead of the read/write indication signal sent from the microcomputer.

(1) Program development apparatus related to first embodiment

When the address signal from the microcomputer specifies an address in the second address area, the input/output means is disabled from being set to the input state. Therefore, even when the second address area is assigned to an additional logic circuit in the microcomputer, the signal outputted from the additional logic circuit does not collide with the signal given from an external unit.

(2) Microcomputer related to second embodiment

When the address signal from the microcomputer core specifies an address in the second address area, a detection signal is outputted from the detection means. Therefore, it is possible to avoid collision of the signal outputted from the additional logic circuit in the microcomputer with signals given from an external unit by using the detection signal in the program development apparatus for developing a program for the microcomputer.

When the microcomputer is further provided with a common external terminal and selection means, an input or output signal and a detection signal are transferred to or from the common external terminal by the selection means by means of time-sharing.

If the detection signal is outputted even when the address signal specifies an address in the third address area, it is possible to connect an external circuit assigned with the third address area directly to the microcomputer. In this case, it is possible to avoid collision of a signal given from an external unit with another signal given from the external unit by using the detection signal in the program development apparatus.

(3) Program development system related to third embodiment

When the address signal from the microcomputer core specifies an address in the second address area, a detection signal is outputted from the detection means. The input/ output means in the program development apparatus is disabled from being set to the input state by responding to the detection signal. Therefore, the signal outputted from the logic circuit means does not collide with the signal given from an external unit.

When the microcomputer is further provided with a common external terminal and selection means, an input or output signal and a detection signal are transferred to or from the common external terminal by the selection means by means of time-sharing.

If the detection signal is outputted even when the address signal specifies an add in the third address area, it is possible to connect an external circuit assigned with the third address area directly to the microcomputer. In this case, it is possible to avoid collision of a signal given from an external unit with another signal given from the external unit by using the detection signal in the program development apparatus.

(4) Program development system related to fourth embodiment

The first microcomputer to be operated by a developed program is provided outside the program development apparatus and the second microcomputer serves as an evaluation microcomputer. The logic circuit means of the first microcomputer operates independently. Thereby, when the address signal from the second microcomputer specifies an address in the second address area, the signal of the logic circuit means in the first microcomputer provided outside the program development apparatus is transferred to or from the program development apparatus. Therefore, the signal from the logic circuit means in the first microcomputer does not collide with another signal.

(5) Microcomputer related to fifth embodiment

When the address signal from the microcomputer core specifies an address in the second address area, an indication signal for indicating disabling of external data from being inputted is outputted from the indication signal output means. Therefore, when the indication signal is used in the program development apparatus for developing a program for the microcomputer, it is possible to avoid collision of the signal outputted from the additional logic circuit in the microcomputer with the signal given from an external unit.

(6) Program development apparatus related to sixth embodiment

When the address from the microcomputer specifies an address in the second address area, the input/output means is changed to the input/output disabling means by the disable indication signal. Therefore, even when the second address area is assigned to the additional logic circuit in the microcomputer, the signal outputted from the additional logic circuit does not collide with the signal given from an external unit.

(7) Program development apparatus related to seventh embodiment

When the address signal from the microcomputer specifies an address in the second address area, the input/output means is set to the output state by the write indication signal. Therefore, even when the second address area is assigned to the additional logic circuit in the microcomputer, the signal outputted from the additional logic circuit does not collide with the signal given from an external unit.

The above and other objects, features, and advantages of the invention will become more apparent from the following description when taken in conjunction with the accompanying drawings.

Figure 1:
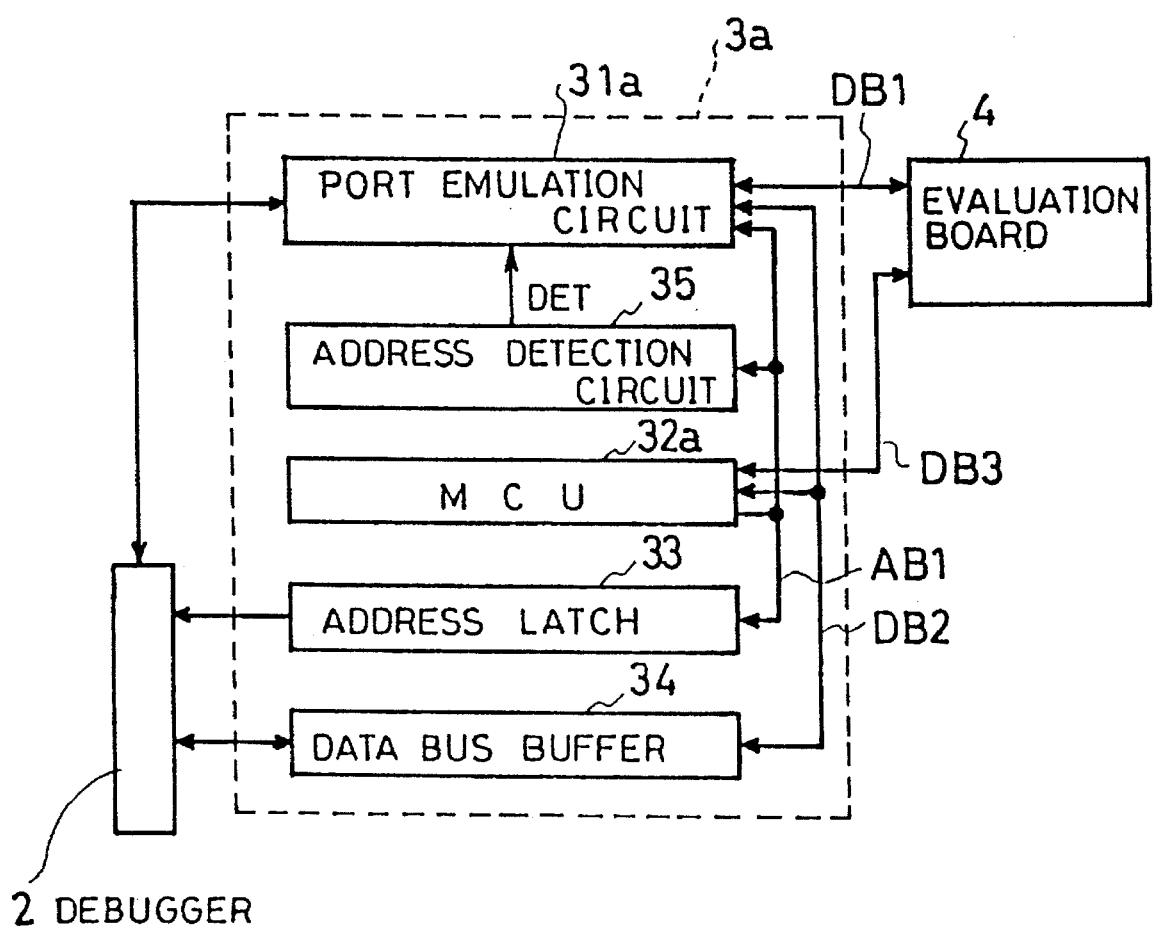
FIG. 1 is a block diagram showing the constitution of the pod of the program development apparatus of the first embodiment.
Figure 2:
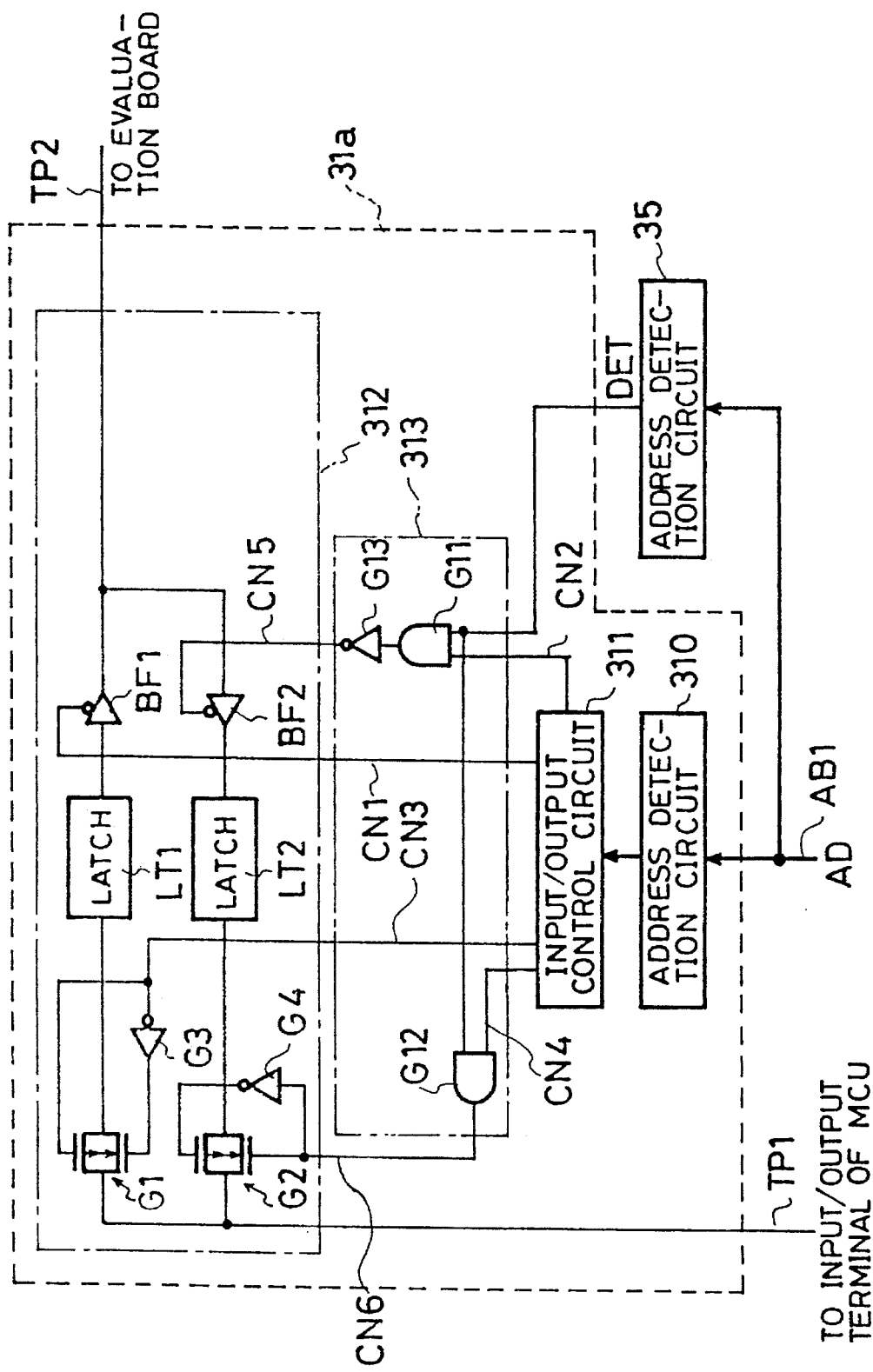
FIG. 2 shows detailed constitution of the port emulation circuit included in the pod in FIG. 1.
Figure 3:
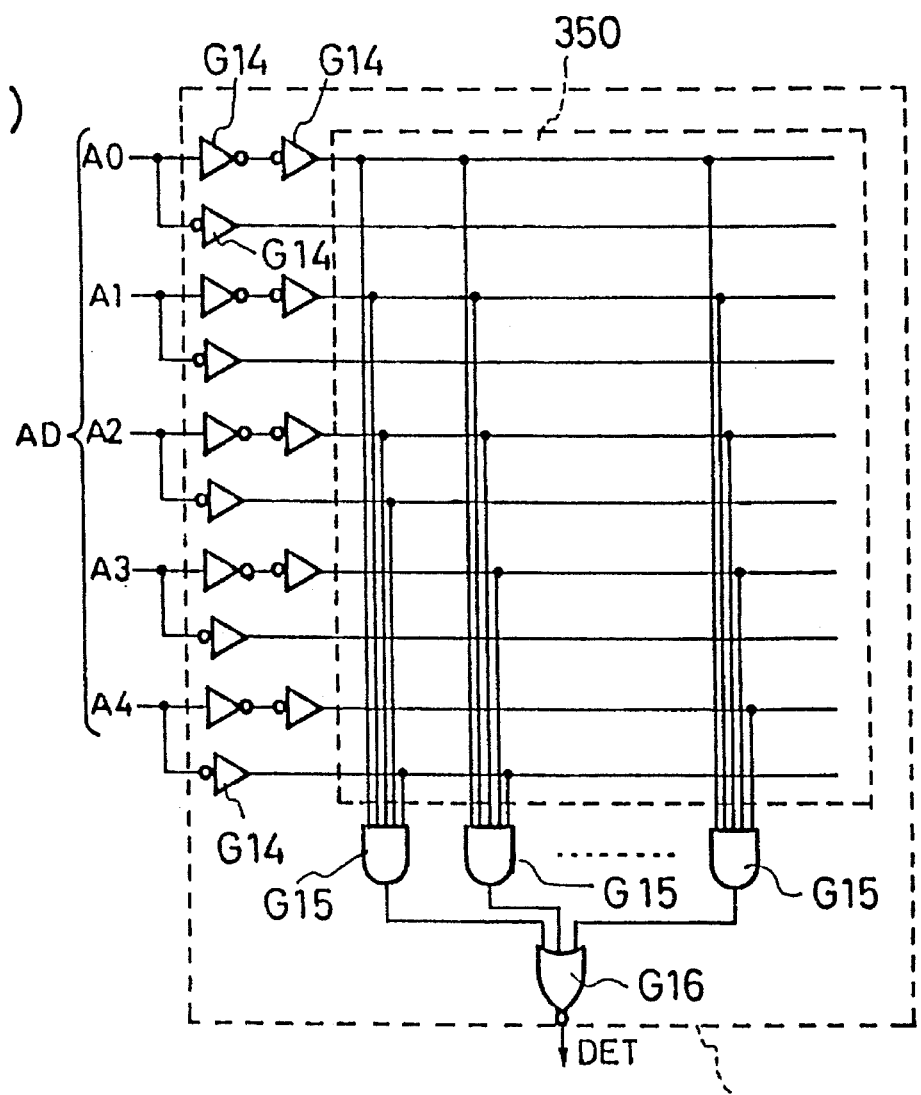
FIGS. 3(a) and (b) are a circuit diagrams showing an example of the constitution of an address detection circuit.
Figure 3:
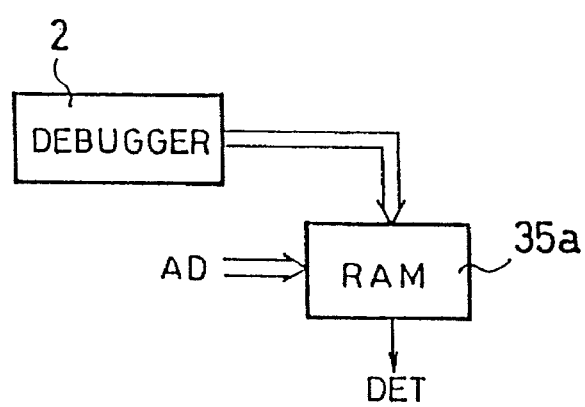

DESCRIPTION OF THE PREFERRED EMBODIMENTS (1) Program development apparatus of first embodiment (FIGS. 1 to 3)

Figure 33:
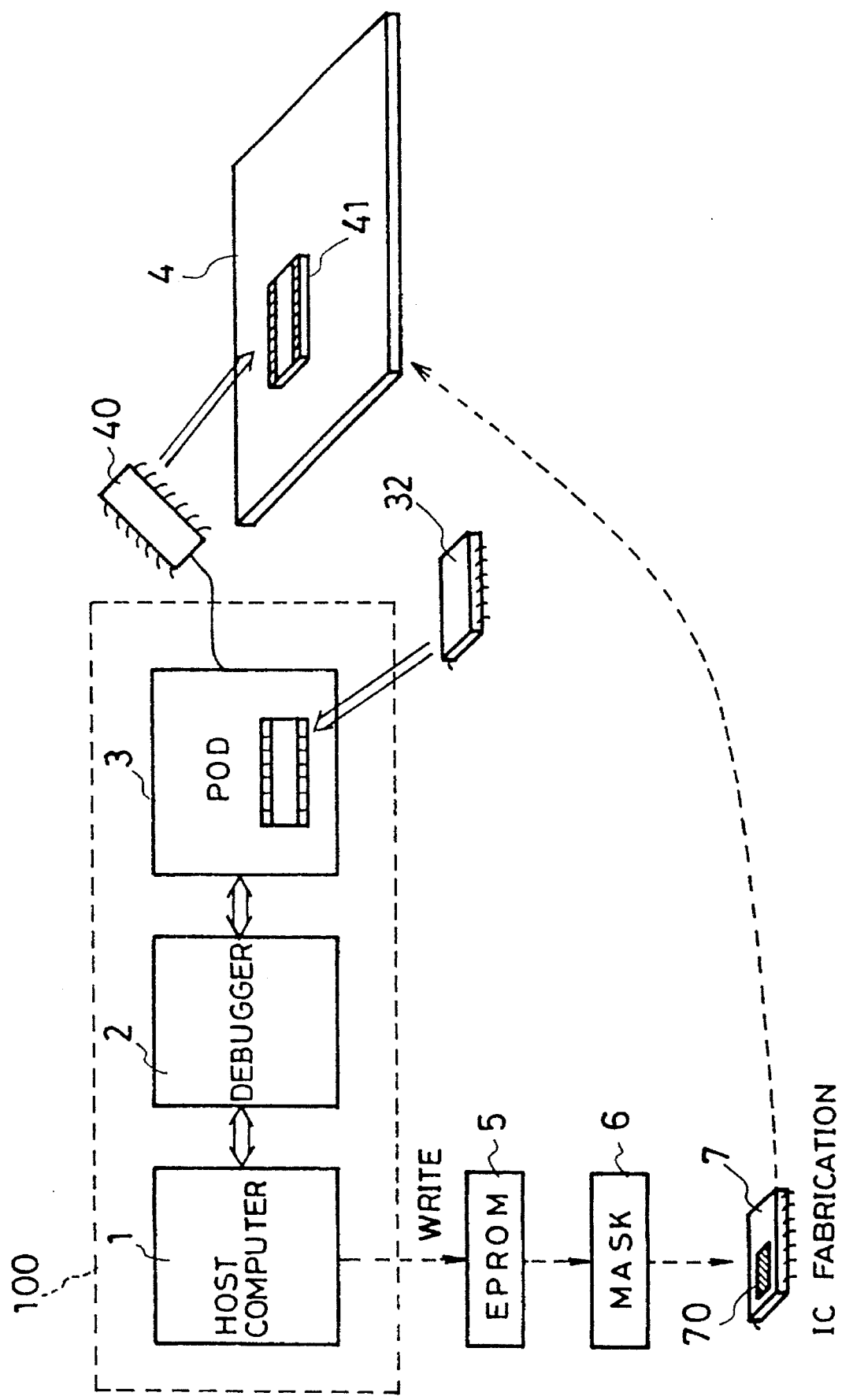
FIG. 33 is a schematic diagram showing the program development procedure and existing program development apparatus.

FIG. 1 is a block diagram showing the constitution of the pod 3a of the program development apparatus of the first embodiment. The entire constitution of the program development apparatus is the same as the constitution shown in FIG. 33.

Figure 41:
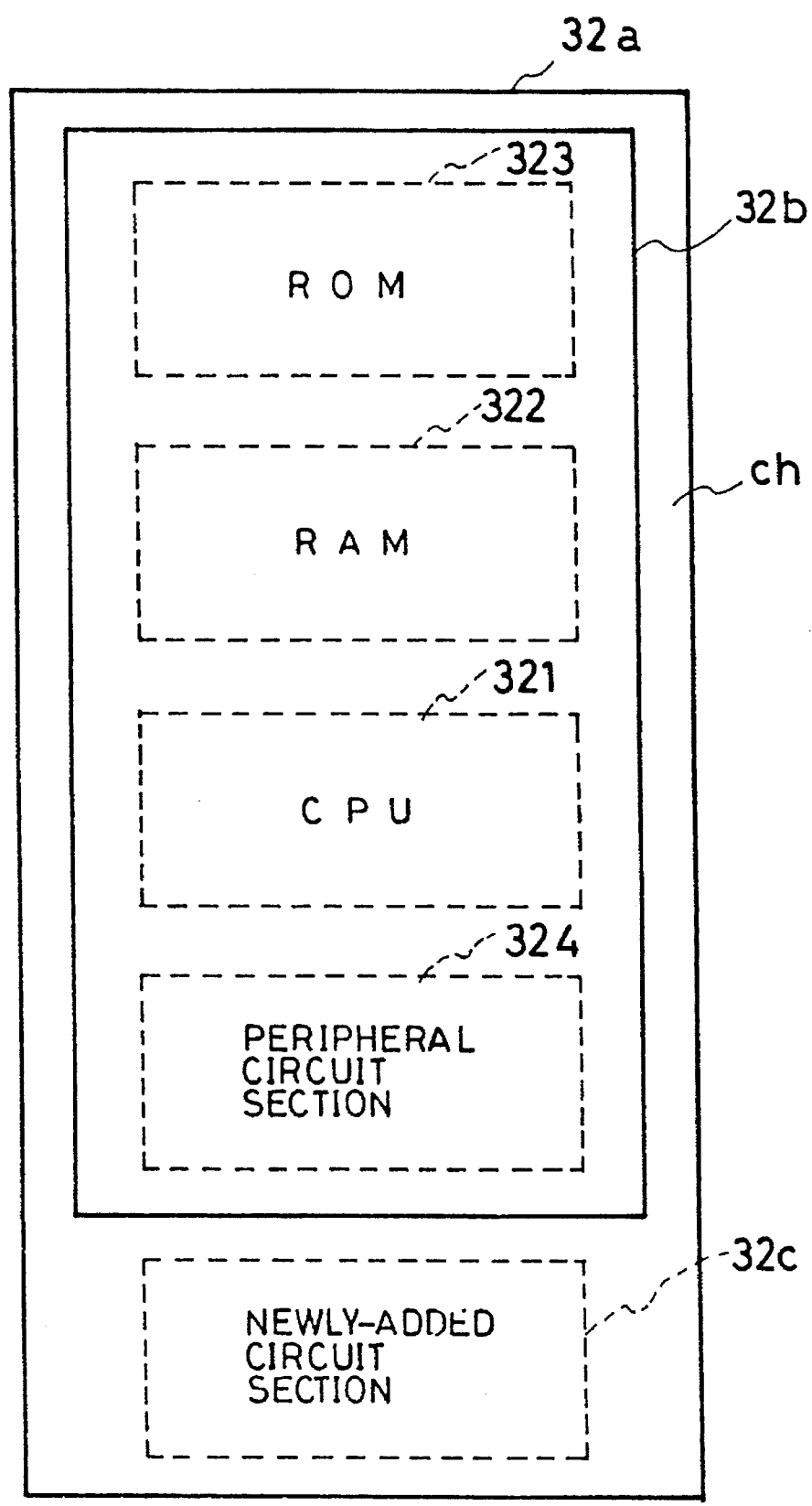
FIG. 41 is a block diagram of an MCU including a newly-added circuit section.

The pod 3a includes the port emulation circuit 31a, evaluation MCU 32a, address latch 33, data bus buffer 34, and address detection circuit 35. The constitution of the evaluation MCU 32a is the same as the constitution shown in FIG. 41. The address map of the evaluation MCU 32a is the same as the address map shown in FIG. 46.

An address signal is given to the address detection circuit 35 from the evaluation MCU 32a through the address bus AB1. The address detection circuit 35 gives the "L"-level detection signal DET to the port emulation circuit 31a when the address signal specifies an address in the newly-added circuit area "c" shown in FIG. 46.

Figure 36:
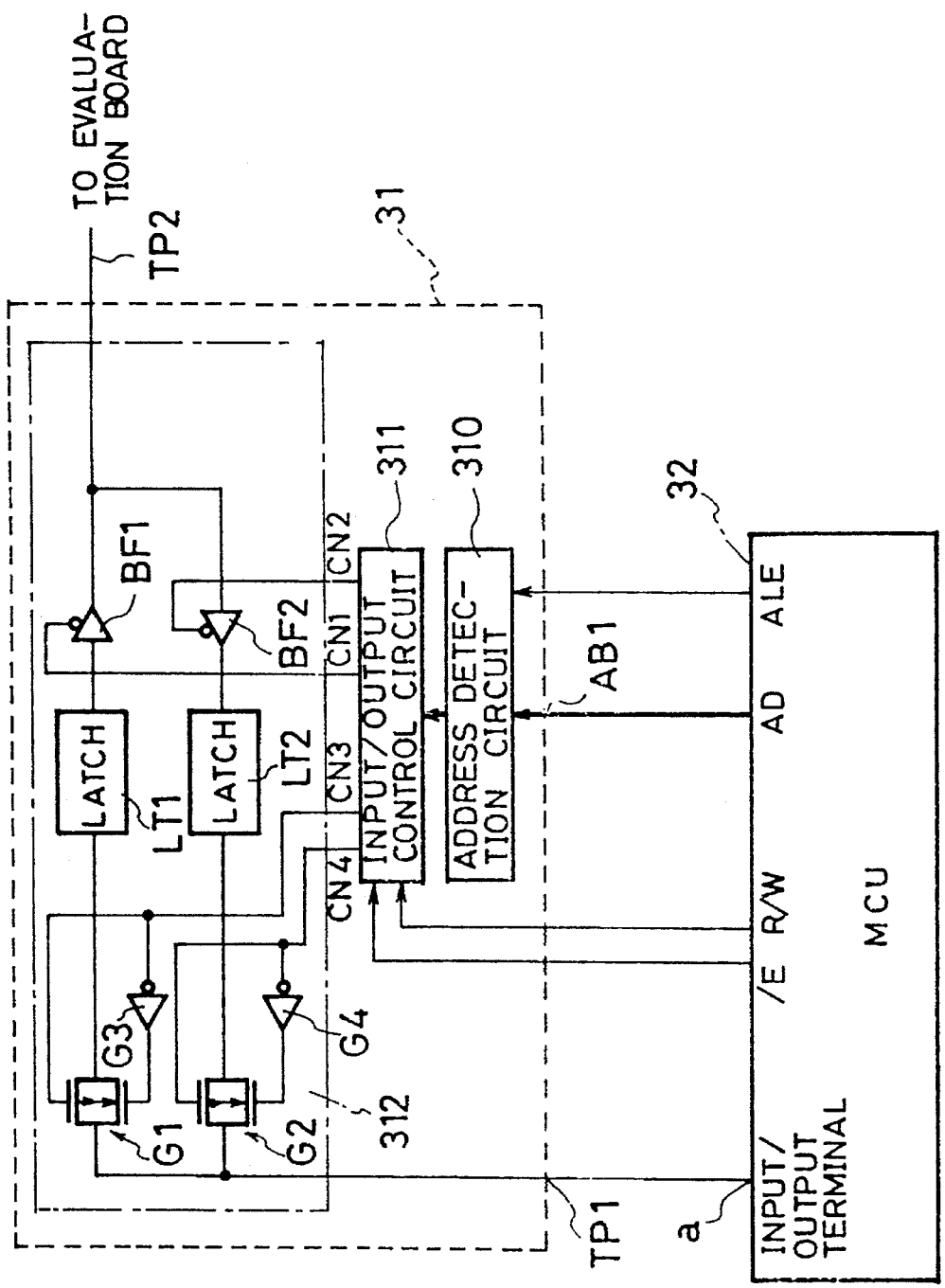
FIG. 36 is a block diagram showing the constitution of the port emulation circuit included in the pod in FIG. 35.

FIG. 2 shows the detailed constitution of the port emulation circuit 31a. The port emulation circuit 31a includes the address detection circuit 310, input/output control circuit 311, a plurality of input/output circuits, and disabling circuit 313. FIG. 2 shows only one input/output circuit 312 related to a set of input/output terminals TP1 and Tp2. The constitution of the input/output circuit 312 is the same as the constitution of the input/output circuit 312 shown in FIG. 36.

The disabling circuit 313 includes the AND gates G11 and G12 and the inverter G13. The detection signal DET is given to one input terminal of the AND gates G11 and G12 respectively from the address detection circuit 35. The control signal CN2 is given to the other input terminal of the AND gate G11 from the input/output control circuit 311. The control signal CN4 is given to the other input terminal of the AND gate G12 from the input/output control circuit 311. The output of the AND gate G11 is given to the control terminal of the buffer BF2 as the control signal CN5 through the inverter G13. The output of the AND gate G12 is given to the transfer gate G2 as the control signal CN6.

When the detection signal DET goes "L", the control signal CN5 goes "H" regardless of the control signals CN2 and CN4 and the control signal CN6 goes "L". Therefore, the buffer BF2 and the transfer gate G2 turn off. As a result, the input/output circuit 312 is disabled. from being set to the input state.

Thus, it is avoided that the signal given to the port emulation circuit 31a from the evaluation board collides with the signal outputted from the newly-added circuit section 32c in the evaluation MCU 32a.

Figure 20:
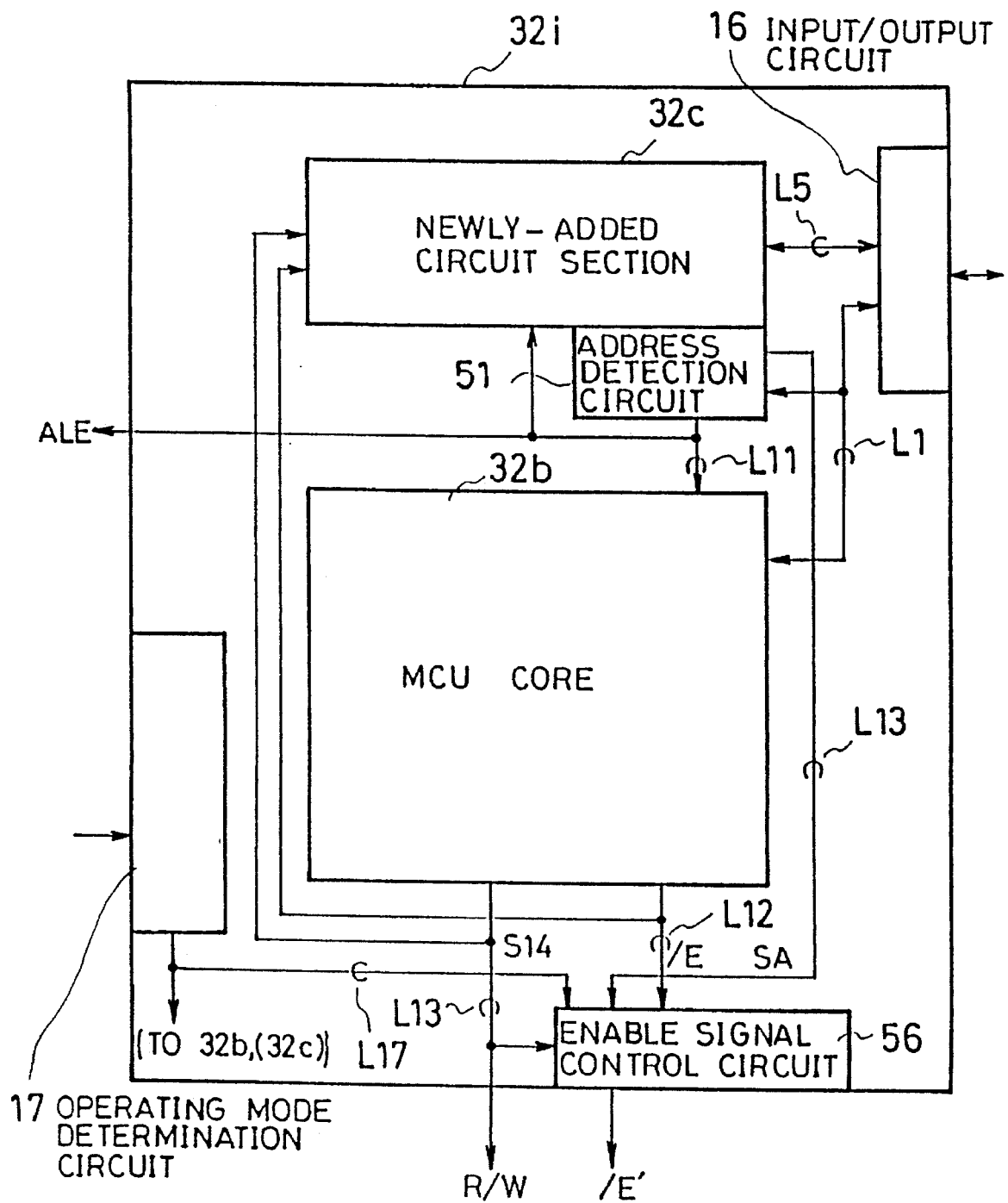
FIG. 20 is a block diagram showing the constitution of the microcomputer of the sixth embodiment.

FIG. 3(a) shows a constitution of the address detection circuit 35. The address detection circuit 35 includes a plurality of inverters G14, a plurality of AND gates G15, one NOR gate G16, and address detection section 350. Connection in the address detection section 350 is determined so that the detection signal DET outputted from the NOR gate G16 goes "L" when an address signal for specifying the newly-added circuit area "c" shown in FIG. 20 is given.

The address detection 35 comprises ICs such as EPROM and PLA (Programmable Logic Array). In this case, the address to be detected can easily be changed only by replacing the IC in the pod 3a.

As shown in FIG. 3(b), it is also possible to constitute the address detection circuit with the RAM 35a. In this case, the data stored in the RAM 35a can be rewritten by changing the execution program in the debugger 2. As a result, the address to be detected can easily be changed without replacing the IC in the pod 3a.

In general, because the board area of the pod 39 in the program development apparatus 100 is small, a port emulation circuit is formed by a gate array. To correct the gate array, cost and labor are required. Therefore, to change the address used for a newly developed MCU, it is impossible to easily correct the port-emulation circuit 31a. However, a program development apparatus for the newly developed MCU is required in a short time.

For the above embodiment, the external address detection circuit 35 disables input/output control from being performed by the address detection circuit 310 and input/output control circuit 311 in the port emulation circuit 31a. Thereby, it is avoided that the signals inside and outside the MCU chip collide with each other.

The address detection circuit 35, as shown in FIG. 3, can be constituted by a simple circuit and easily be replaced. Therefore, even if a new MCU is developed, it is unnecessary to develop a new program development apparatus corresponding to the MCU.

(2) Microcomputer of second embodiment and its program development system (FIGS. 4 to 7)

Figure 4:
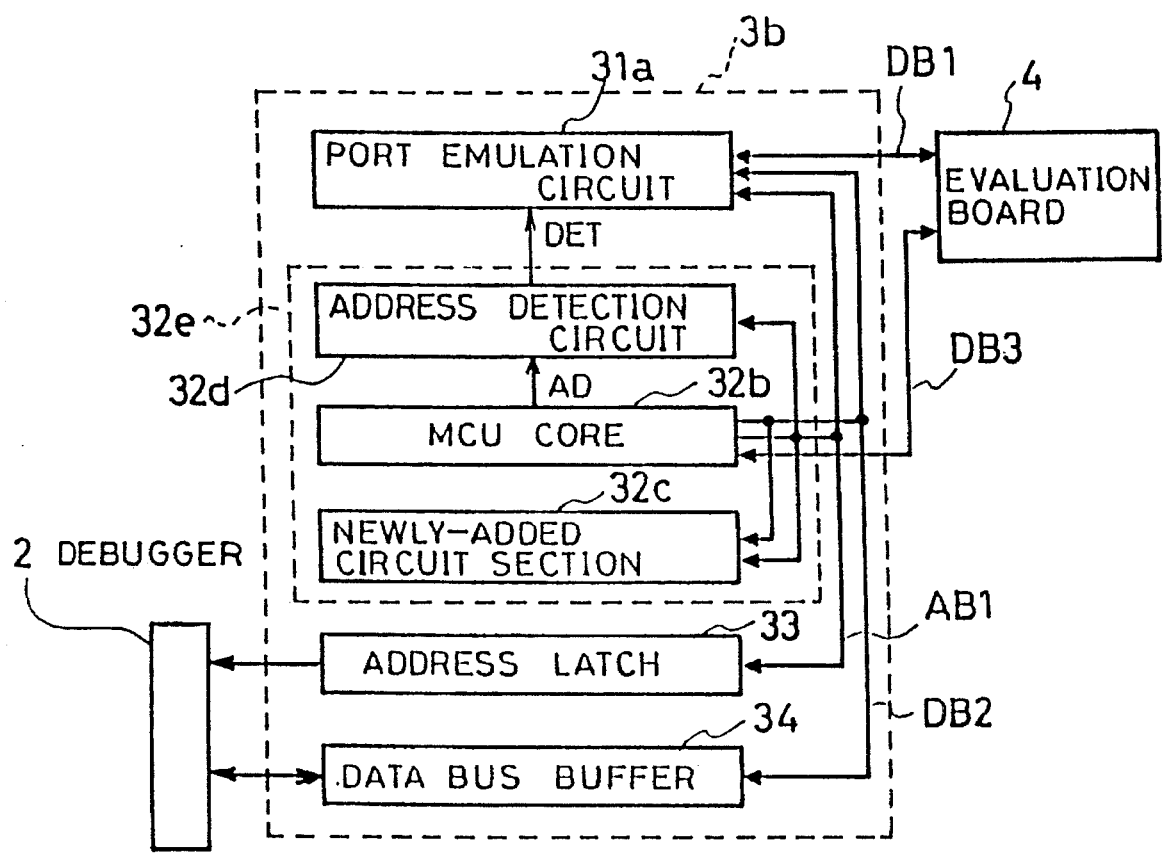
FIG. 4 is a block diagram showing the constitution of the pod of the program development system of the second embodiment.

FIG. 4 is a block diagram showing the constitution of the microcomputer of the second embodiment and the pod 3b in the program development system for the microcomputer. The entire constitution of the program development system is the same as the constitution shown in FIG. 33.

The pod 3b includes the port emulation circuit 31a, evaluation MCU 32e, address latch 33, and data buffer 34. The evaluation MCU 32e includes the MCU core 32b, newly-added circuit section 32c, and address detection circuit 32d. The address detection circuit 32d is formed together with the MCU core 32b and newly-added circuit section 32c on the same chip. The address map of the evaluation MCU 32e is the same as the address map shown in FIG. 46.

The address signal AD is given to the address detection circuit 32d from the MCU core 32b. The address detection circuit 32d gives the detection signal DET to the port emulation circuit 31a by responding to the address signal.

Figure 5:
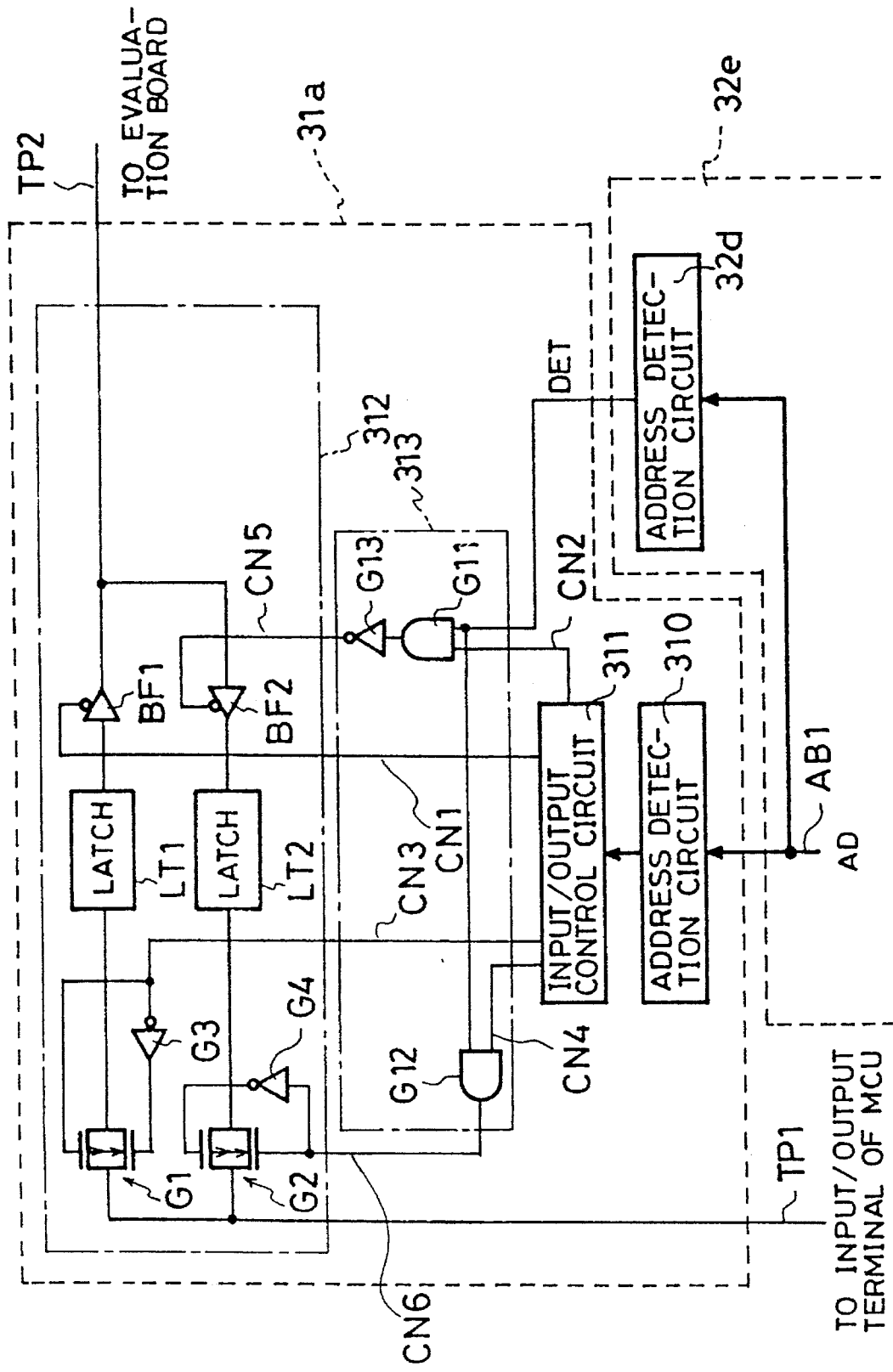
FIG. 5 shows detailed constitution of the port emulation circuit included in the pod in FIG. 4.

FIG. 5 shows the detailed constitution of the port emulation circuit 31a. The constitution and operation of the port emulation circuit 31a shown in FIG. 5 are the same as those of the port emulation circuit 31a shown in FIG. 2. However, the detection signal DET is given to the disabling circuit 313 in the port emulation circuit 31a from the address detection circuit 32d in the evaluation MCU 32e.

The address detection circuit 32d in the evaluation MCU 32e is constituted similarly to the address detection circuit in FIG. 3(a) or 3(b).

When the address signal AD given from the MCU core 32b in the evaluation MCU 32e (see FIG. 4) specifies an address in the newly-added circuit area "c" shown in FIG. 20, the detection signal DET outputted from the address detection circuit 32d goes "L". In this case, the input/output circuit 312 is disabled from being set to the input state by the disabling circuit 313. Therefore, it is avoided that the signals inside and outside the chip of the evaluation MCU 32e collide with each other.

For this embodiment, it is unnecessary to form an additional address bus in the pod 3b because the address detection circuit 32d is formed in the evaluation MCU 32e. Therefore, it is possible to constitute a pod having a small occupying area. Moreover, a developed pod can be used only by adding one wire in order to give the detection signal DET to the port emulation circuit 31a.

The MCU of the above embodiment requires an external terminal for outputting the detection signal DET. The external terminal is necessary for development of a program but it is unnecessary for normal operation. Therefore, as shown in FIG. 6, the external terminal TC can be shared by the output signal DO and detection signal DET from the MCU core 32e or newly-added circuit section 32c.

The selection circuit 32f includes the inverter G17, AND gates G18 to G20, and OR gate G21. The debugging-mode setting signal MD is given to one input terminal of the AND gate G18 from the MCU core 32b and the switching signal SW is given to the other input terminal of it from the MCU core 32b. The output of the AND gate G18 is given to one input terminal of the AND gate G19 and the detection signal DET is given to the other input terminal of it from the address detection circuit 32d. The output of the AND gate G18 is given to one input terminal of the AND gate G20 through the inverter G17 and the output signal DO is given to the other input terminal of it from the MCU core 32b or the general-purpose output register REG in the newly-added circuit section 32c. The output of the AND gate G19 is given to one input terminal of the OR gate G21 and the output of the AND gate G20 is given to the other input terminal of it. The output of the OR gate G21 is given to the external terminal TC.

The external terminal TC is connected to the output circuit 36 formed in the pod 3d. The output circuit 36 includes the flip flops F1 and F2. Signals are given to the data input terminals D of the flip flops F1 and F2 from the external terminal TC. The timing signal AL is given to the control terminal T of the flip flop F1 from the MCU core 32d. The timing signal E is given to the control terminal T of the flip flop F2 from the MCU core 32b. The detection signal DET outputted from the flip flop F1 is given to the port emulation circuit 31a and the output data DO outputted from the flip flop F2 is given to the data bus DB2 (see FIG. 4).

Figure 6:
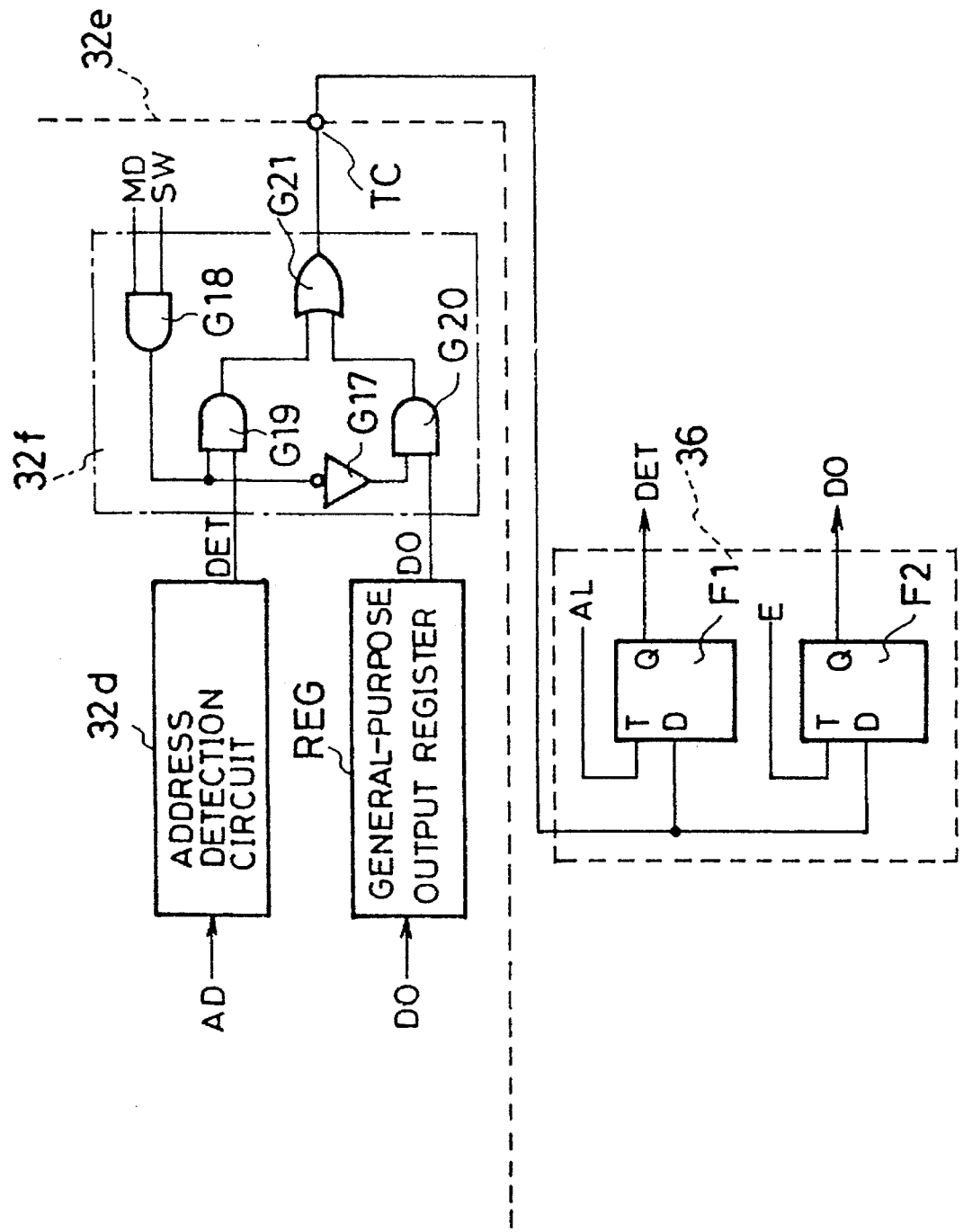
FIG. 6 is a circuit diagram showing the constitution of a portion related to a selection circuit.

The operation of the circuit in FIG. 6 is described, below by referring to FIG. 7. The debugging-mode setting signal MD goes "L" in the normal mode and goes "H" in the debugging mode. When the debugging-mode setting signal MD goes "L", the output of the AND gate G18 goes "L". Therefore, the output of the AND gate G19 is fixed to "L" and the the output data DO given from the general-purpose output register REG is outputted to the external terminal TC through the AND gate G20 and OR gate G21.

Figure 7:
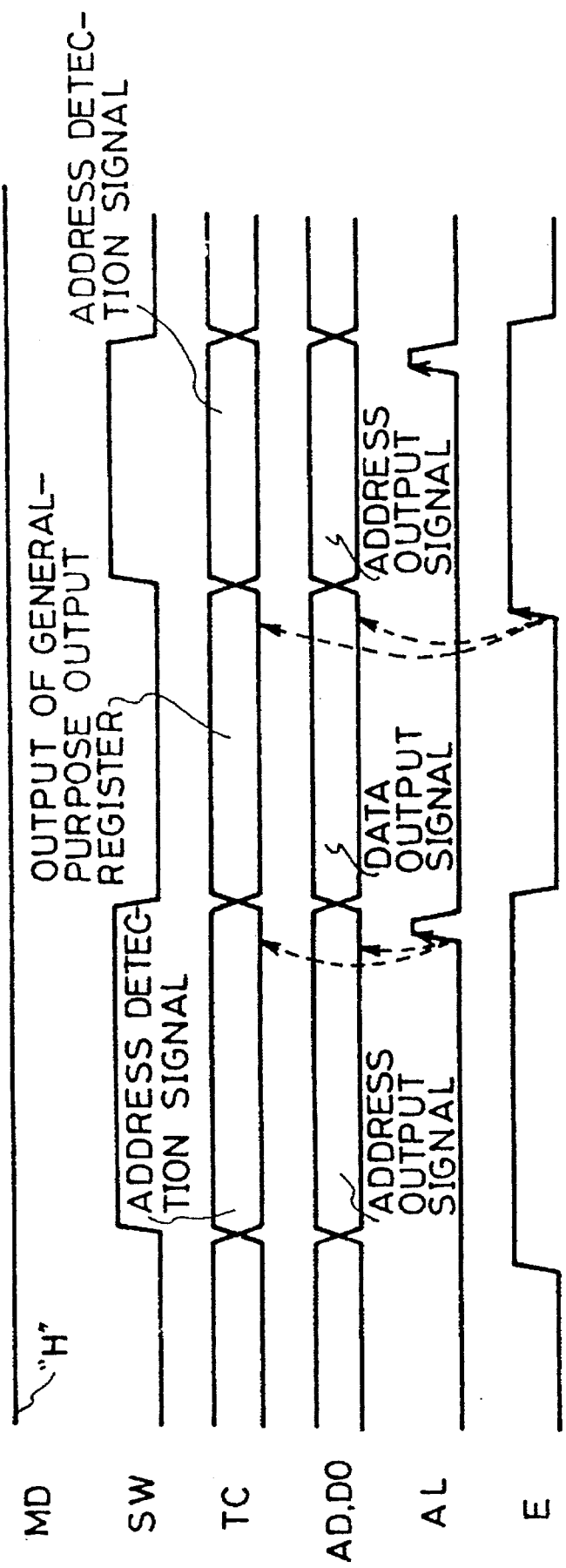
FIG. 7 is a waveform diagram of a signal of each portion of the circuit in FIG. 6.

As shown in FIG. 7, when the debugging-mode setting signal MD goes "H", the switching signal SW is outputted from the AND gate G18. When the switching signal SW is "H", the output of the AND gate G20 is fixed to "L" and the detection signal DET given from the address detection circuit 32d is outputted to the external terminal TC through the AND gate G19 and OR gate G21. The flip flop F1 latches and outputs the detection signal DET by responding to the rise of the timing signal AL.

When the switching signal SW goes "L", the output of the AND gate G18 goes "L". Thereby, the output of the AND gate G19 is fixed to "L" and the output data DO given from the general-purpose output register REG is outputted to the external terminal TC through the AND gate G20 and OR gate G21. The flip flop F2 latches and outputs the output data DO by responding to the rise of the timing signal E.

Thus, a program can be debugged while the external terminal TC realizes normal operation by providing the external terminal TC with the detection signal DET and output data DO by means of time-sharing. It is possible to use the switching signal for outputting data and address signal to the data bus DB2 (see FIG. 4) by means of time-sharing as the timing signals AL and E.

By using the constitution shown in FIG. 6, the detection signal DET outputted from the MCU 32e can be used without decreasing the number of input/output terminals for general-purpose signals in the program development system.

Figure 8:
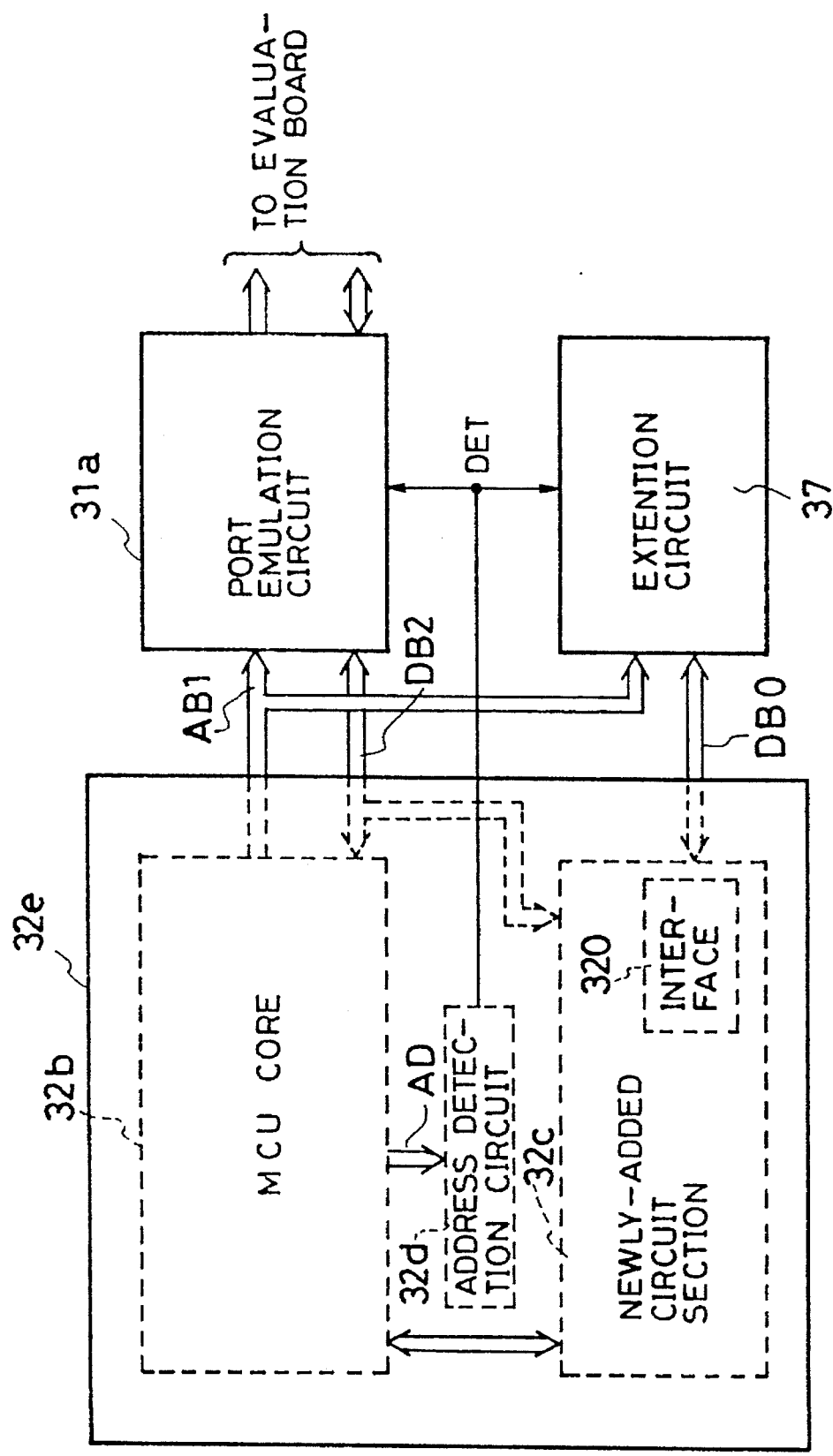
FIG. 8 is a block diagram showing the constitution of main portion of the program development system of the third embodiment.
Figure 9:
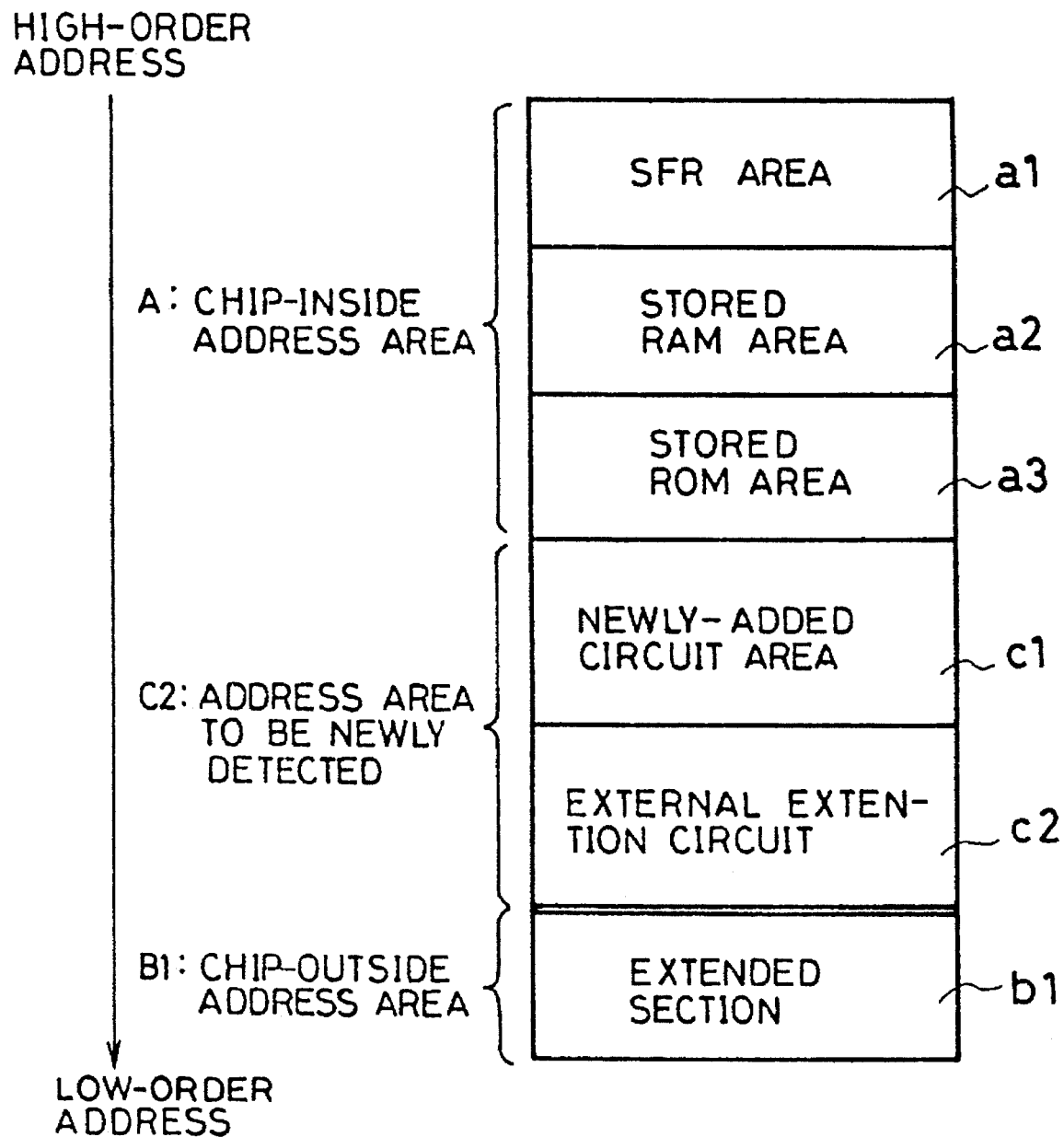
FIG. 9 shows an address map of the evaluation MCU in FIG. 8.

(3) Program development system of third embodiment (FIGS. 8 and 9)

FIG. 8 is a block diagram showing the constitution of the main portion of the program development system of the third embodiment. For this program development system, the extension circuit 37 is connected to the newly-added circuit section 32c in the evaluation MCU 32e through the dedicated data bus DBO. The dedicated. data bus DBO is connected. to the data bus DB2 in the evaluation MCU 32e through a interface 320 such as the FIFO (First In First Out) memory in the newly-added circuit 32c. An address signal is given to the extension circuit 37 through the address bus AB1.

The extension circuit 37 is assigned with the chip-inside address area A and a new address area different from the chip-inside address area C1. When the address signal outputted from the MCU core 32b specifies the address assigned to the extension circuit 37, the signal given from the evaluation board 4 to the port emulation circuit 31a collides with the signal outputted from the extension circuit 37 at the newly-added circuit section 32c if the address detection circuit 32d sets the detection signal DET to "L" only when the address signal specifies an address in the newly-added circuit area "c".

For this embodiment, the address detection circuit 32d sets the detection signal DET to "L" when the address signal specifies an address in the address area assigned to the newly-added circuit section 32c or to the extension circuit 37.

FIG. 9 shows an address map of the MCU 32e in this embodiment. The address area C2 newly detected by the address detection circuit 32d includes the newly-added circuit area c1 assigned to the newly-added circuit section 32c and the external extension circuit area c2 assigned to the extension circuit 37. The external extension circuit area c2 can also be an area to be used in future.

For the above embodiment, it is possible to connect the extension circuit 37 which cannot be connected to the evaluation MCU core 32c through the port emulation circuit 31a to the data bus DB2 on the chip of the evaluation MCU 32e through the interface 320 in the newly-added circuit section 32c of the chip. Also in this case, it is unnecessary to develop a new program development system even if the present program development system is modified because the signal given from the evaluation board 4 does not collide with the signal given from the extension circuit 37.

Figure 10:
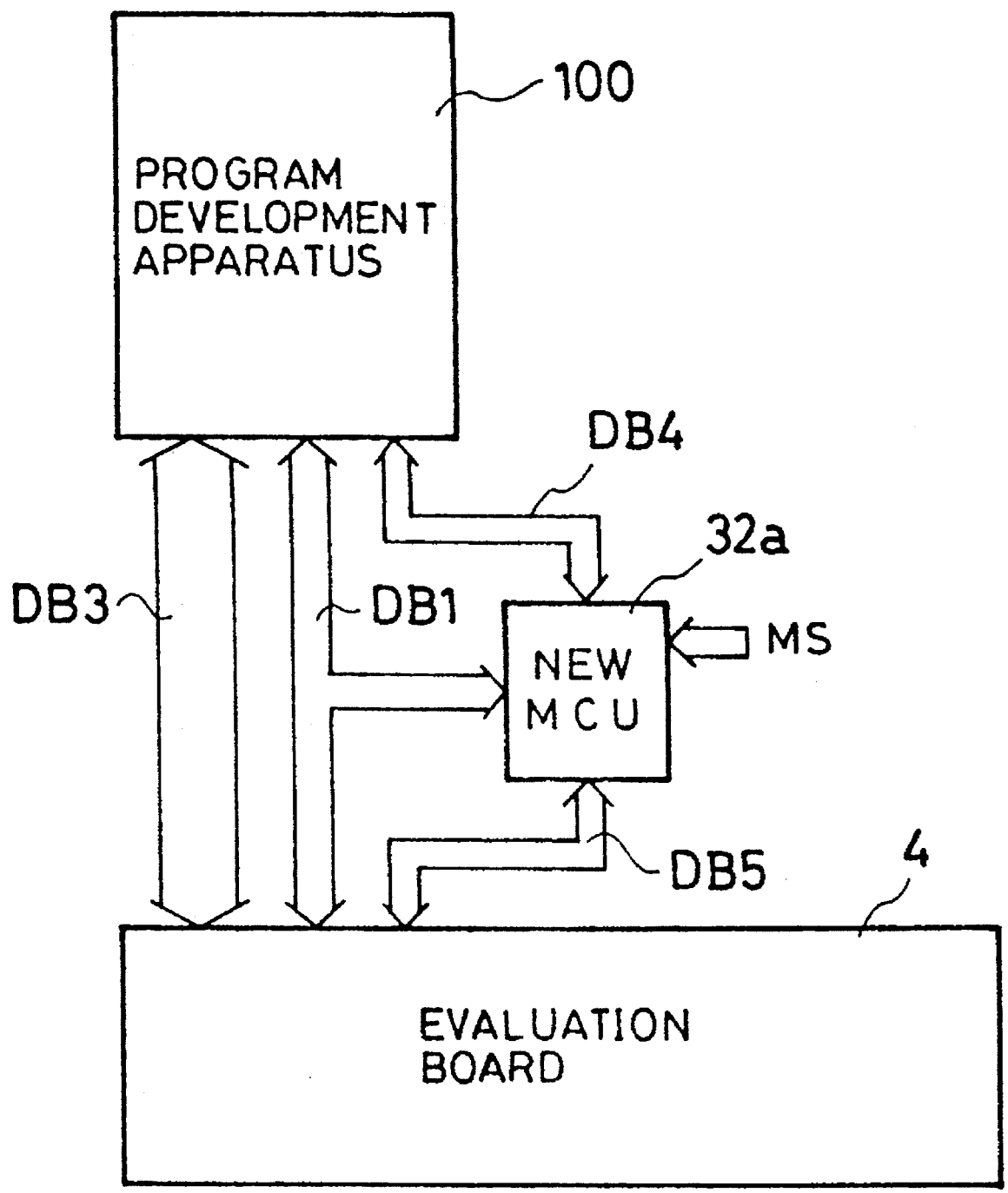
FIG. 10 is a block diagram showing detailed constitution of the program development system of the fourth embodiment.
Figure 11:
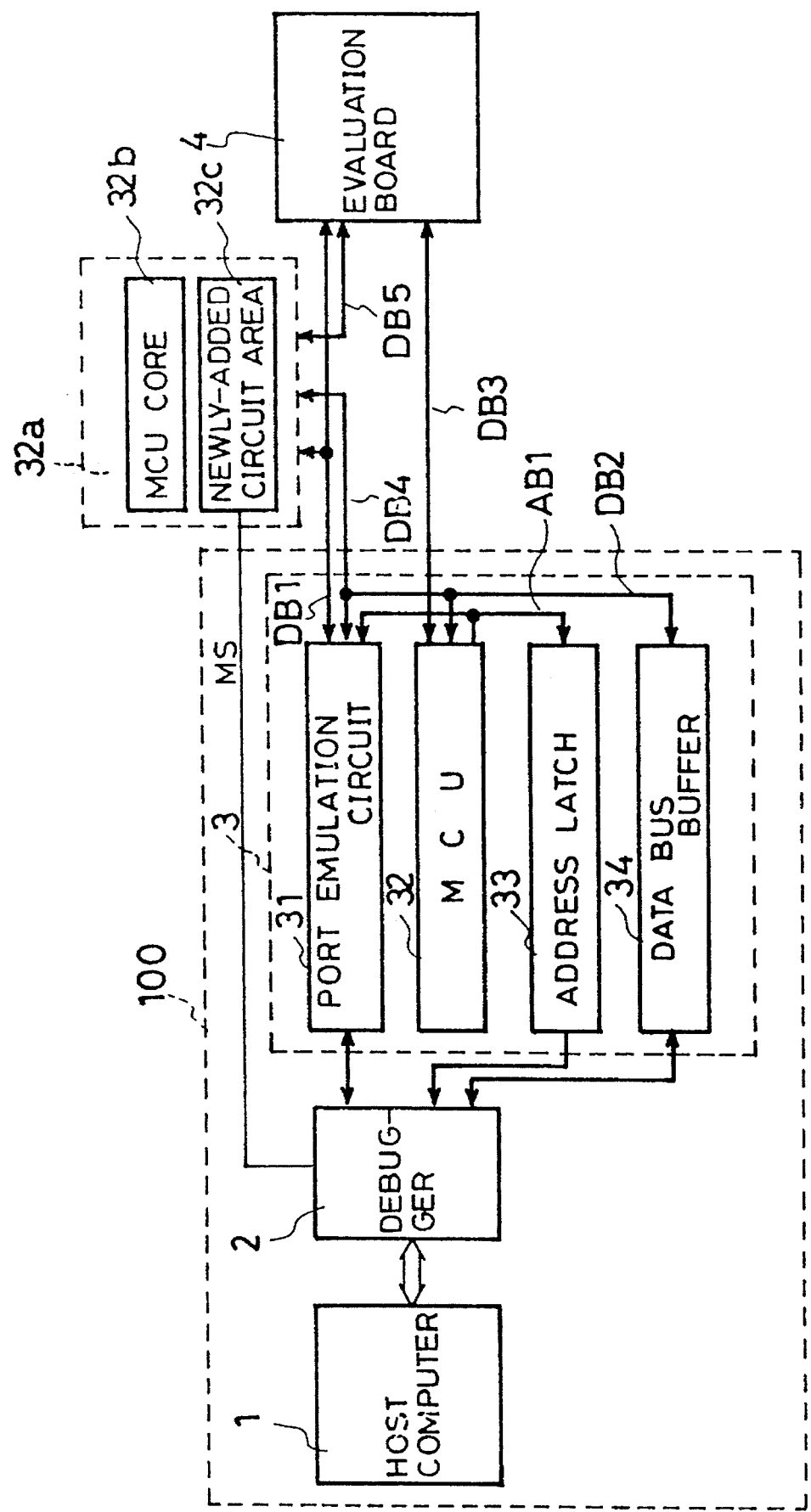
FIG. 11 is a block diagram showing detailed constitution of the program development system in FIG. 10.
Figure 12:
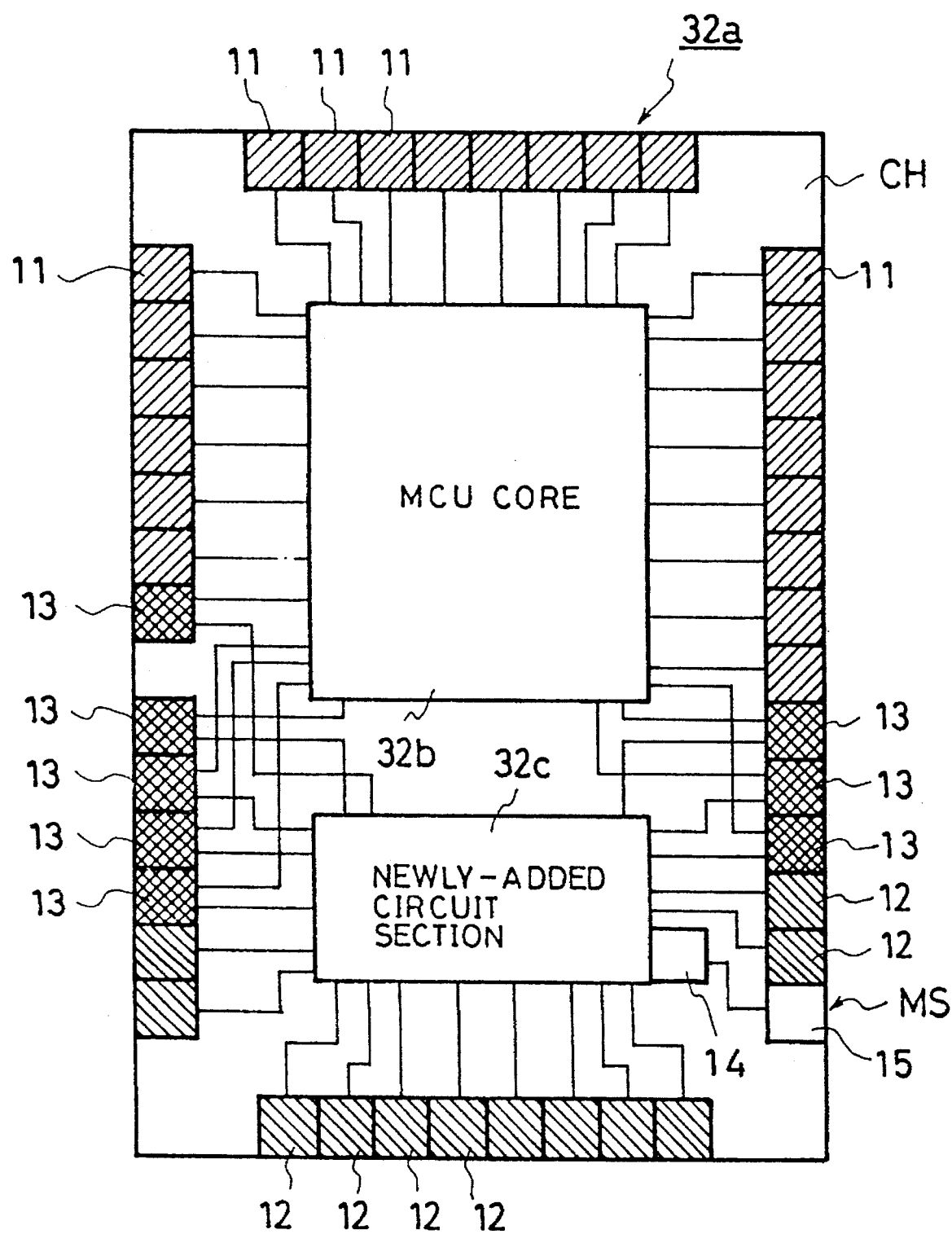
FIG. 12 is a block diagram showing an example of the constitution of a new MCU used for the program development system in FIG. 10.

(4) Program development system. of fourth embodiment (FIGS. 10 to 12)

FIG. 10 is a block diagram showing the constitution of the program development system of the fourth embodiment.

The program development system includes the program development apparatus 100, new MCU 32a, and evaluation board 4. A program for the new MCU 32a is developed by the program development apparatus 100. The evaluation board 4 is a board which is supposed to be operated by the new MCU 32a to be operated by a developed program when the MCU 32a is mounted.

As shown in FIG. 10, the new MCU 32a is connected to an external unit of the program development apparatus 100. The new MCU 32a is connected to the data bus DBI, the program development apparatus 100 through the data bus DB4, and the evaluation board 4 through the data bus DB5. The operating-mode setting signal MS is given to the new MCU 32a from the program development apparatus 100.

Figure 34:
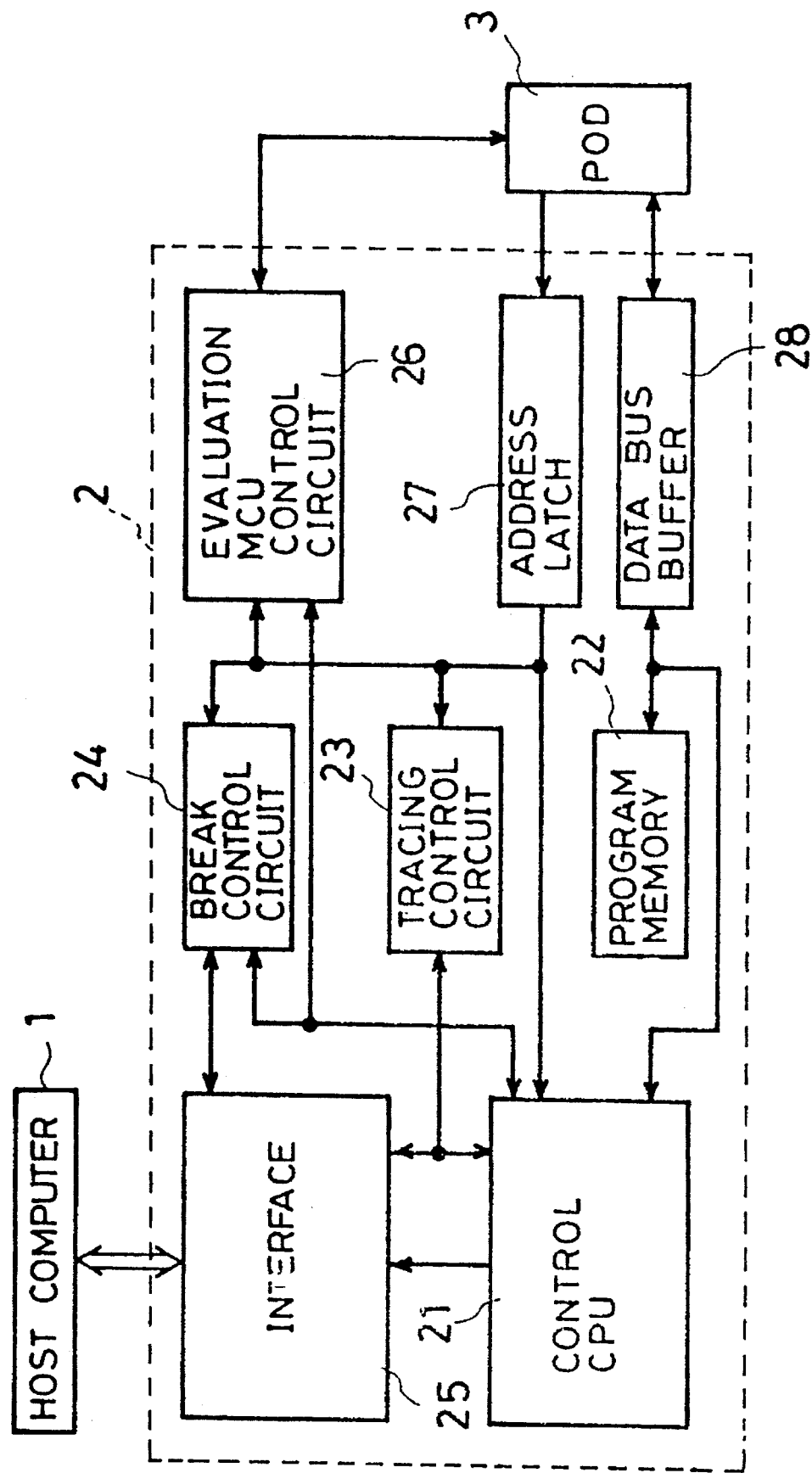
FIG. 34 is a block diagram showing the constitution of a debugger.
Figure 35:
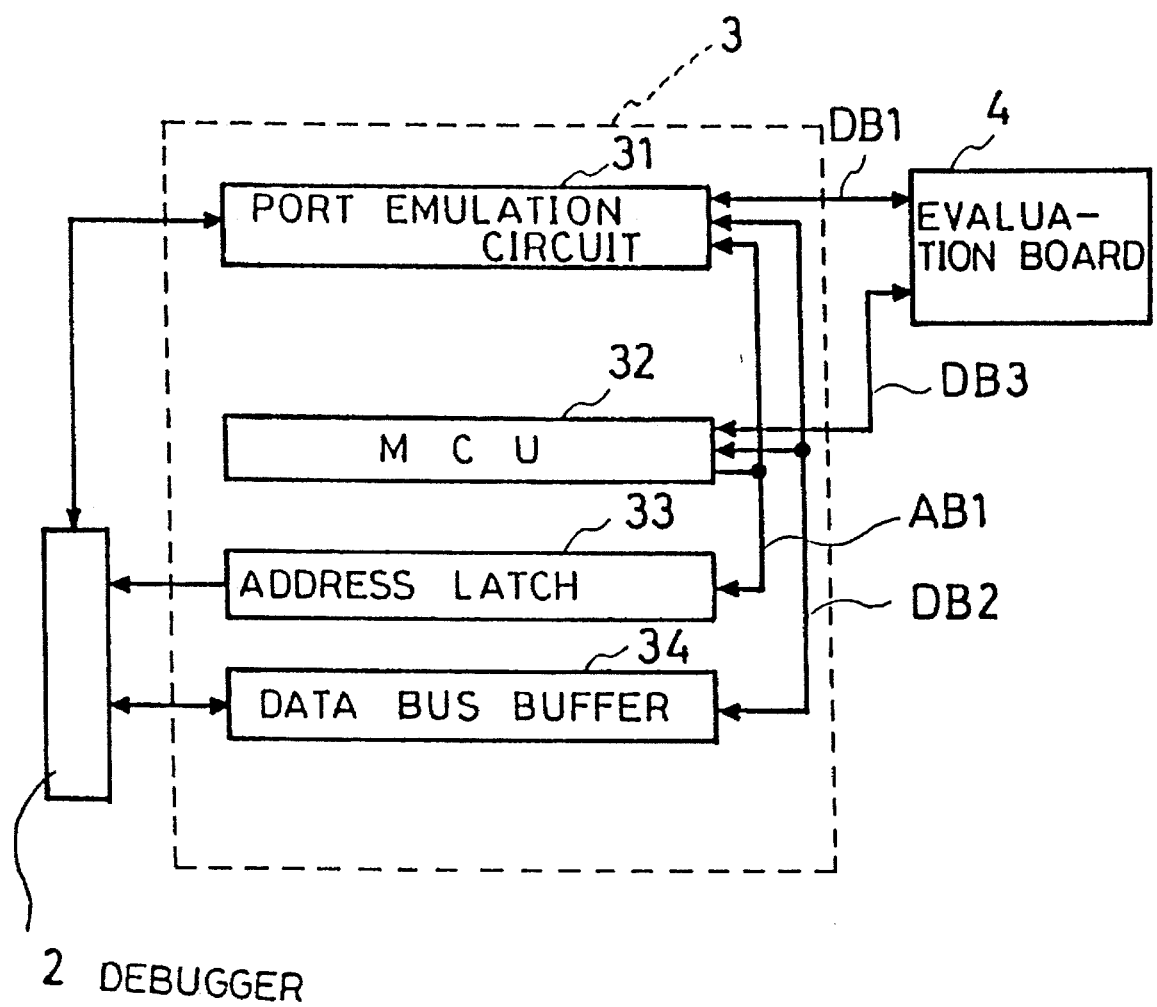
FIG. 35 is a block diagram showing the constitution of the port emulation circuit included in the program development apparatus in FIG. 33.

FIG. 11 shows further detailed constitution of the program development system. The program development apparatus 100 has the same constitution as the program development apparatus 100 shown in FIGS. 33 to 35.

The new MCU 32a includes the MCU core 32b and newly-added circuit section 32c. The new MCU 32a has the MCU operating mode in which the MCU core 32b operates independently and the added-circuit operating mode in which the newly-added circuit section 32c operates independently. These modes are set by the operating-mode setting signal MS.

Figure 46:
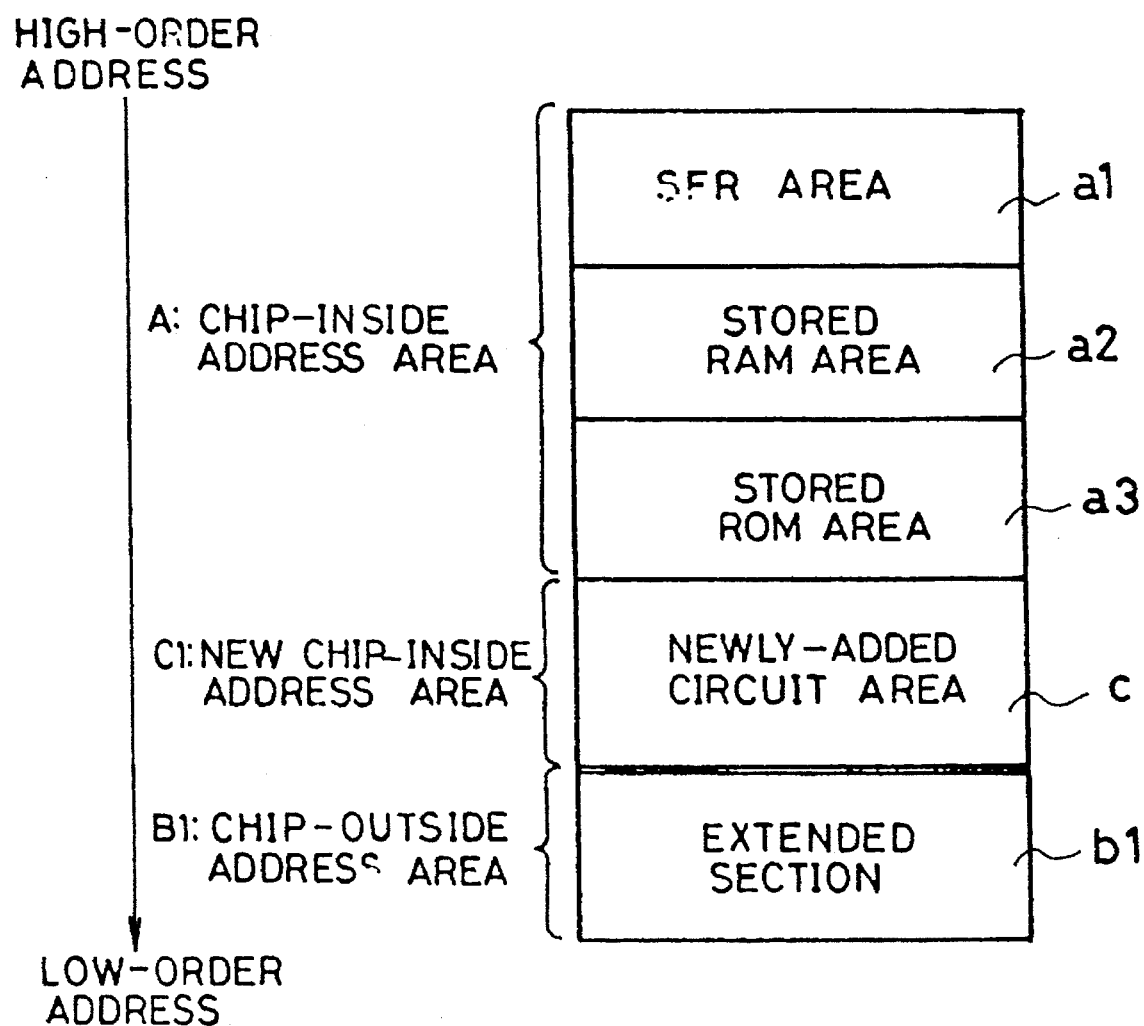
FIG. 46 shows an address map of the MCU in FIGS. 41 to 43.
Figure 47:
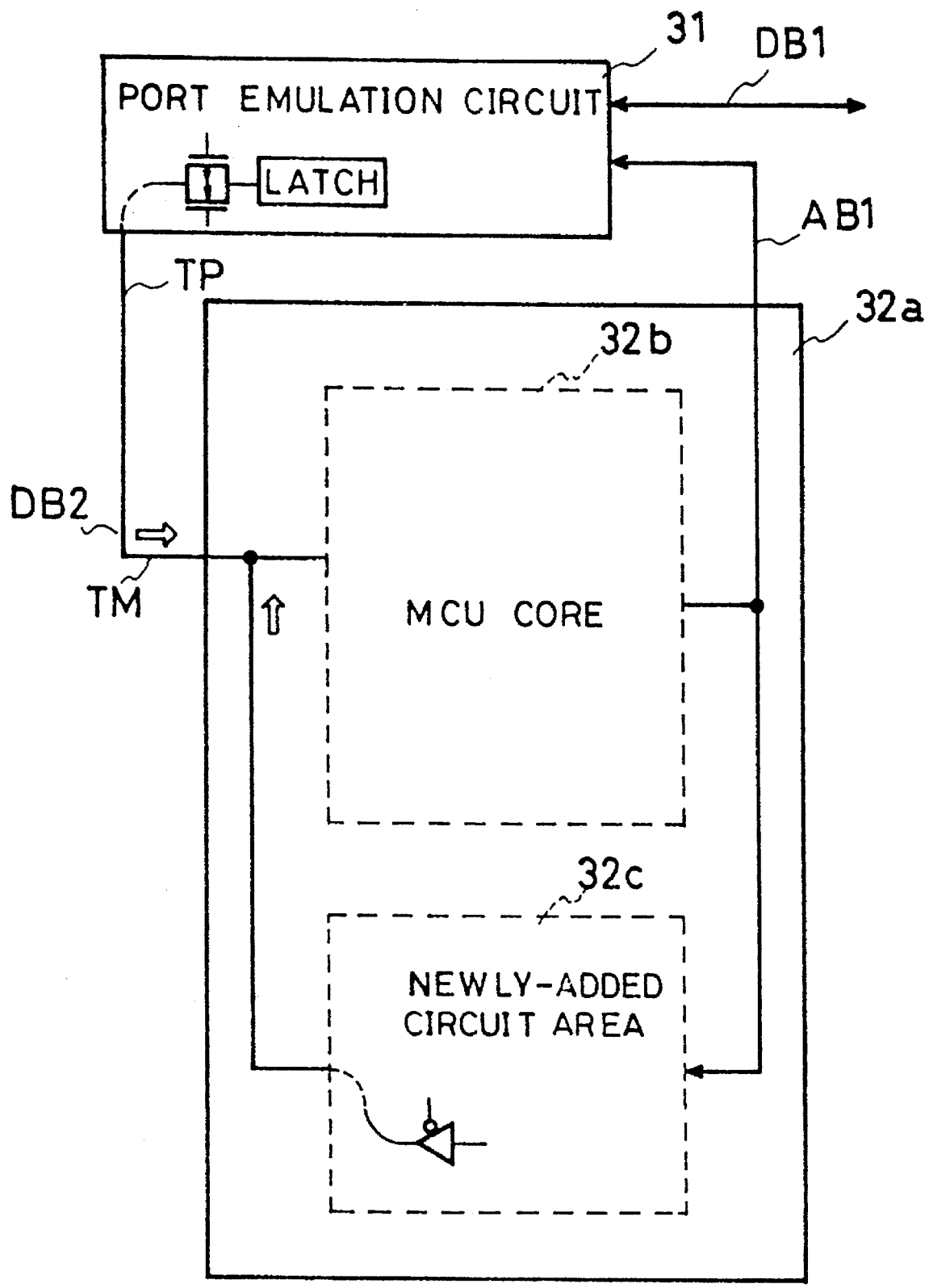
FIG. 47 is a diagram for explaining collision of signals in the existing program development apparatus.

The address map of the new MCU 32a is the same as the address map shown in FIG. 46. The new MCU 32a is connected to the evaluation MCU 32 through the data bus DB4 and the data bus DB2 in the pod 3.

Figure 37:
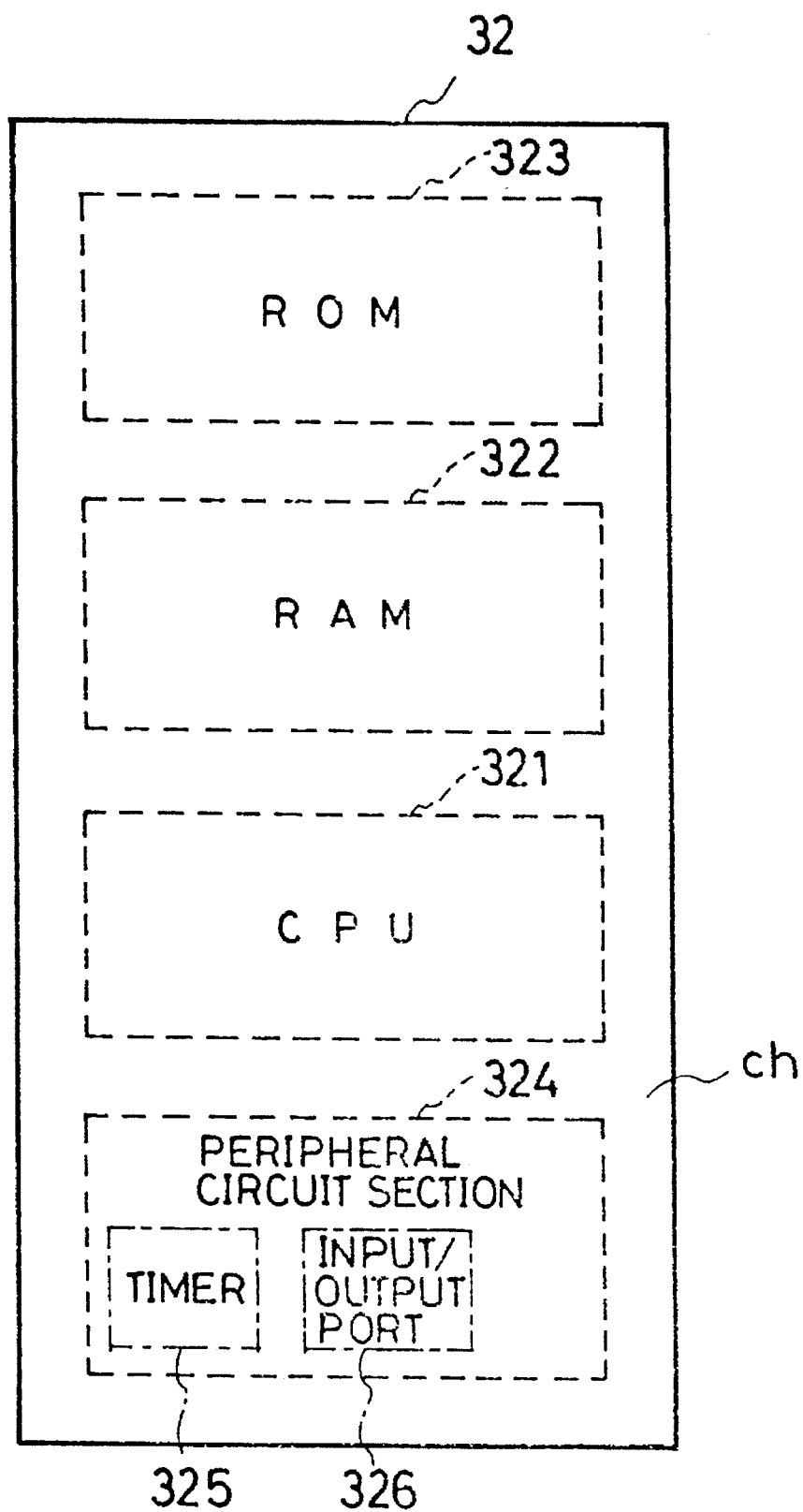
FIG. 37 is a block diagram showing a general MCU.

The evaluation MCU 32 in the pod 3 uses the MCU 32 shown in FIG. 37 or a new MCU same as the new MCU 32a. When the MCU same as the new MCU 32a is used, it is set to the MCU operating mode. In this case, the MCU 32a is set to the added-circuit operating mode by the operating-mode setting signal MS.

FIG. 12 shows a detailed constitution of the new MCU 32a which is disclosed in the official gazette of Japanese Patent Application No. 1-158985.

The MCU core 32b and newly-added circuit section 32c are formed on the chip CH. A plurality of dedicated peripheral circuits 11 for transferring signals to or from the MCU core 32b, a plurality of dedicated peripheral circuits 12 for transferring signals to or from the newly-added circuit section 32c, and a plurality of common peripheral circuits 13 for transferring signals to or from the MCU core 32b and newly-added circuit section 32c are formed on the periphery of the CH.

Moreover, the mode-setting signal input circuit 15 for receiving the operating-mode setting signal MS given from an external unit and the selection control circuit 14 for selectively connecting the MCU core 32b and newly-added circuit section 32c with the common peripheral circuit 13 by responding to the output of the mode-setting signal input circuit 15 are formed on the chip H.

The data bus DB1 shown in FIG. 11 is connected to any one of the common peripheral circuits 13 and the data bus DB4 is connected to any one of the remaining common peripheral circuits 13. The data bus DB5 is connected to the dedicated peripheral circuit 12. Therefore, the newly-added circuit section 32c is controlled by the control signal given from the evaluation MCU 32 in the pod 3 through the data bus DB4.

The new MCU 32a is formed outside the program development apparatus 100. Therefore, when the address signal for specifying an address in the newly-added circuit area "c" is outputted. from the evaluation MCU 32, the signal outputted from the newly-added circuit section 32c in the new MCU 32a is given to the port emulation circuit 31 through the data bus DB1.

Therefore, the signal outputted. from the new MCU 32a does not collide with the signal outputted from the evaluation board 4. As a result, a program can be debugged. by the program development apparatus 100.

(5) Microcomputer of fifth embodiment (FIGS. 13 to 16)

Figure 13:
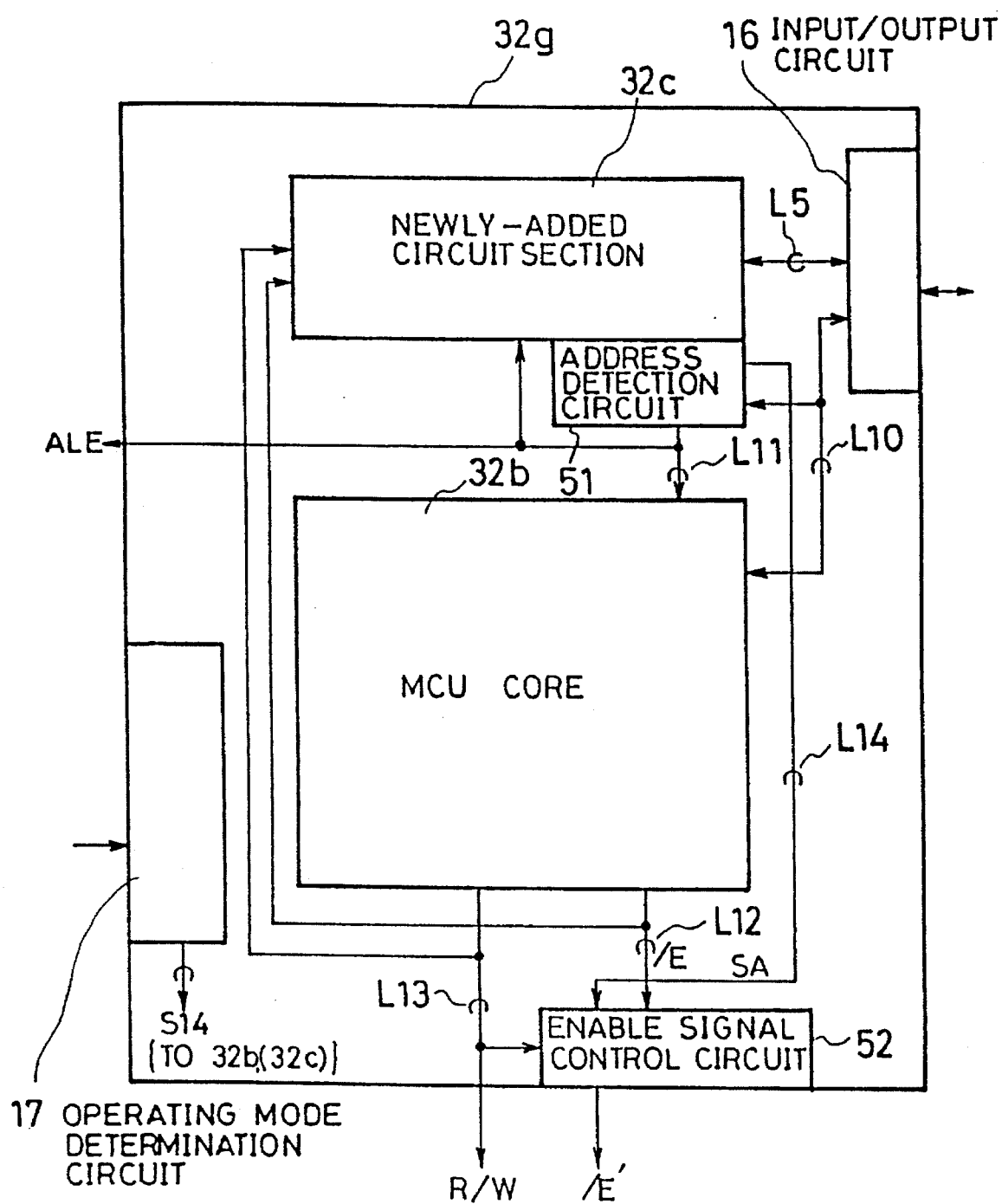
FIG. 13 is a block diagram showing the constitution of the microcomputer of the fifth embodiment.
Figure 38:
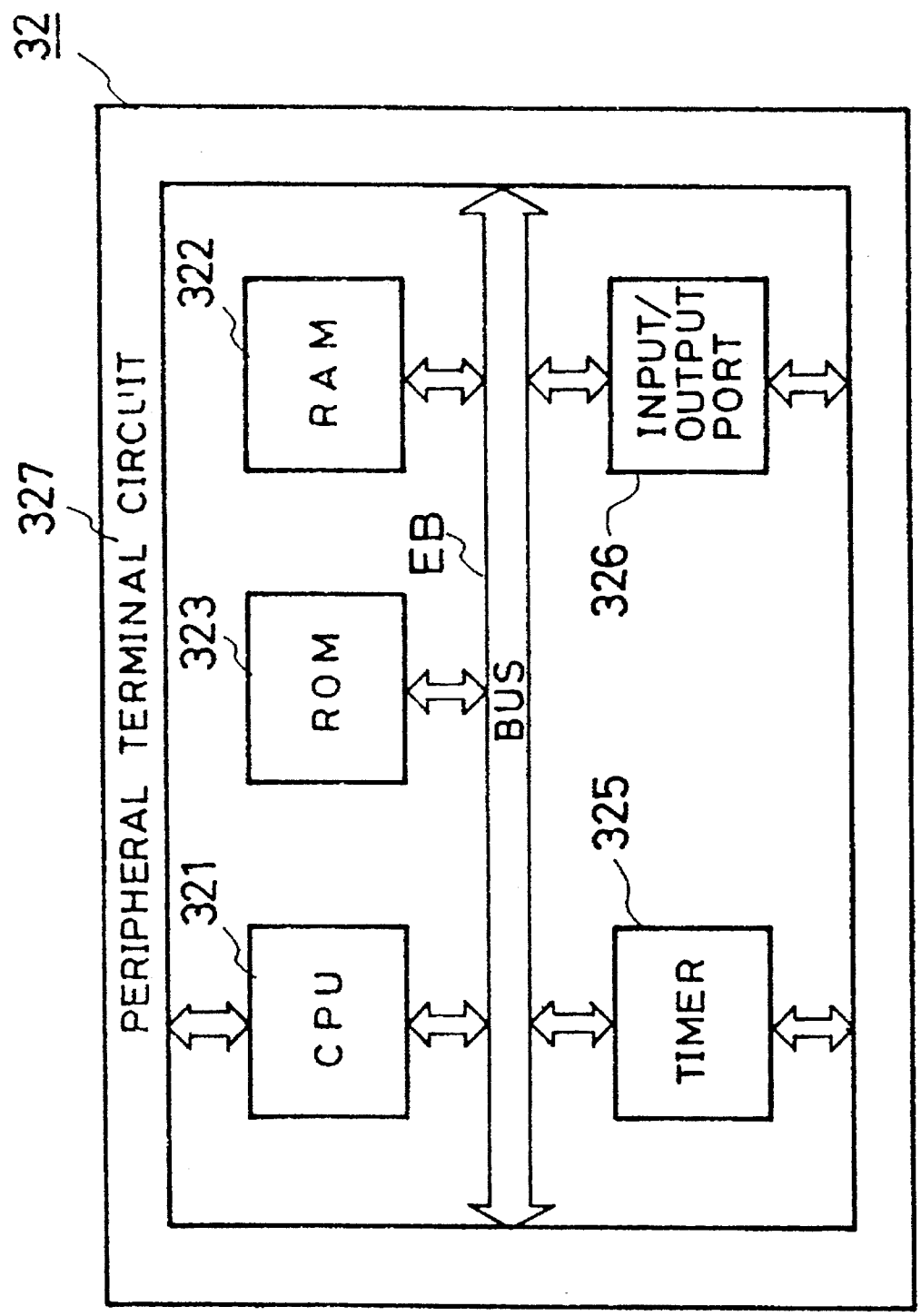
FIG. 38 is a block diagram showing an example of the constitution of a general MCU.
Figure 39:
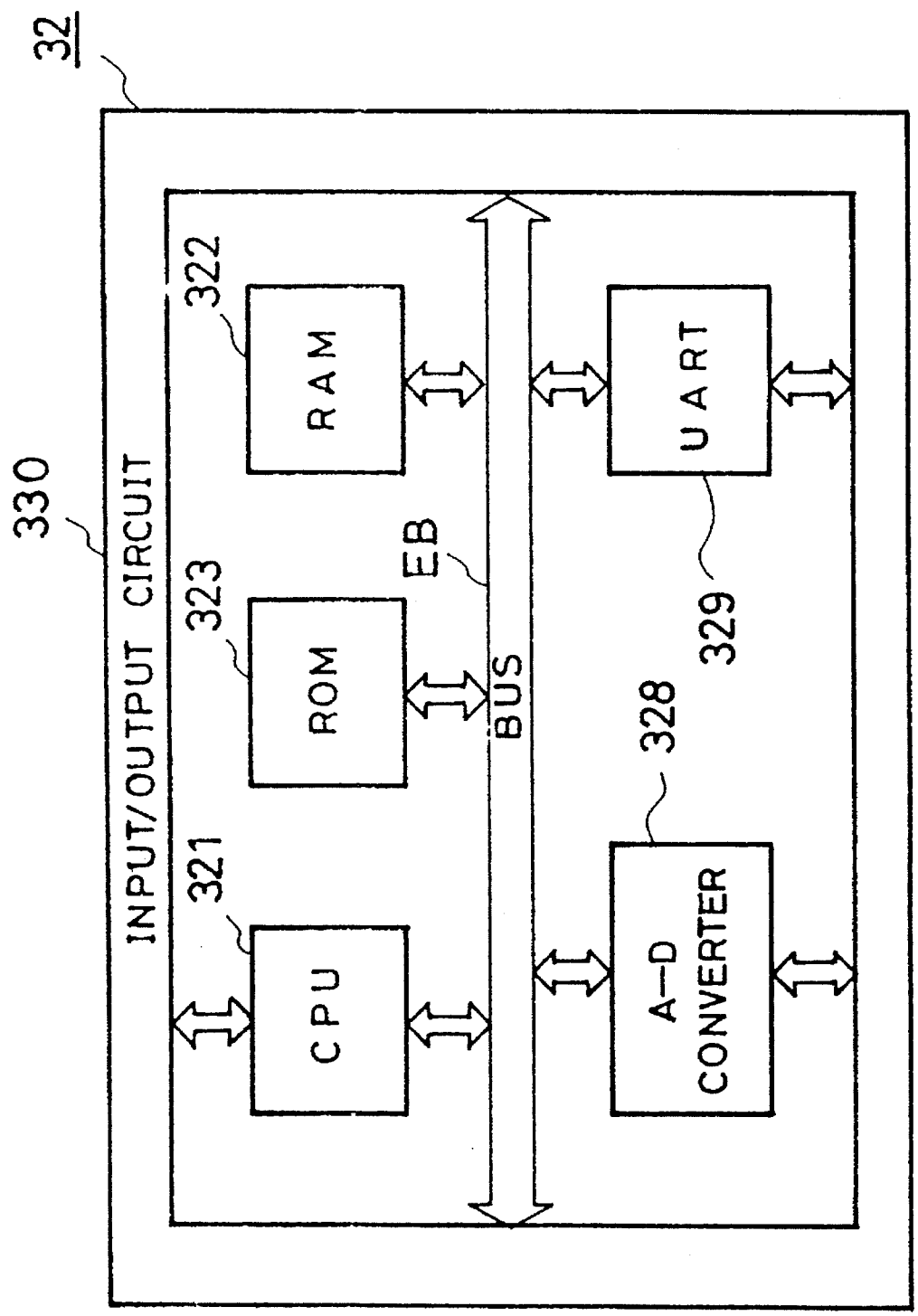
FIG. 39 is a block diagram showing another example of the constitution of a general MCU.
Figure 40:
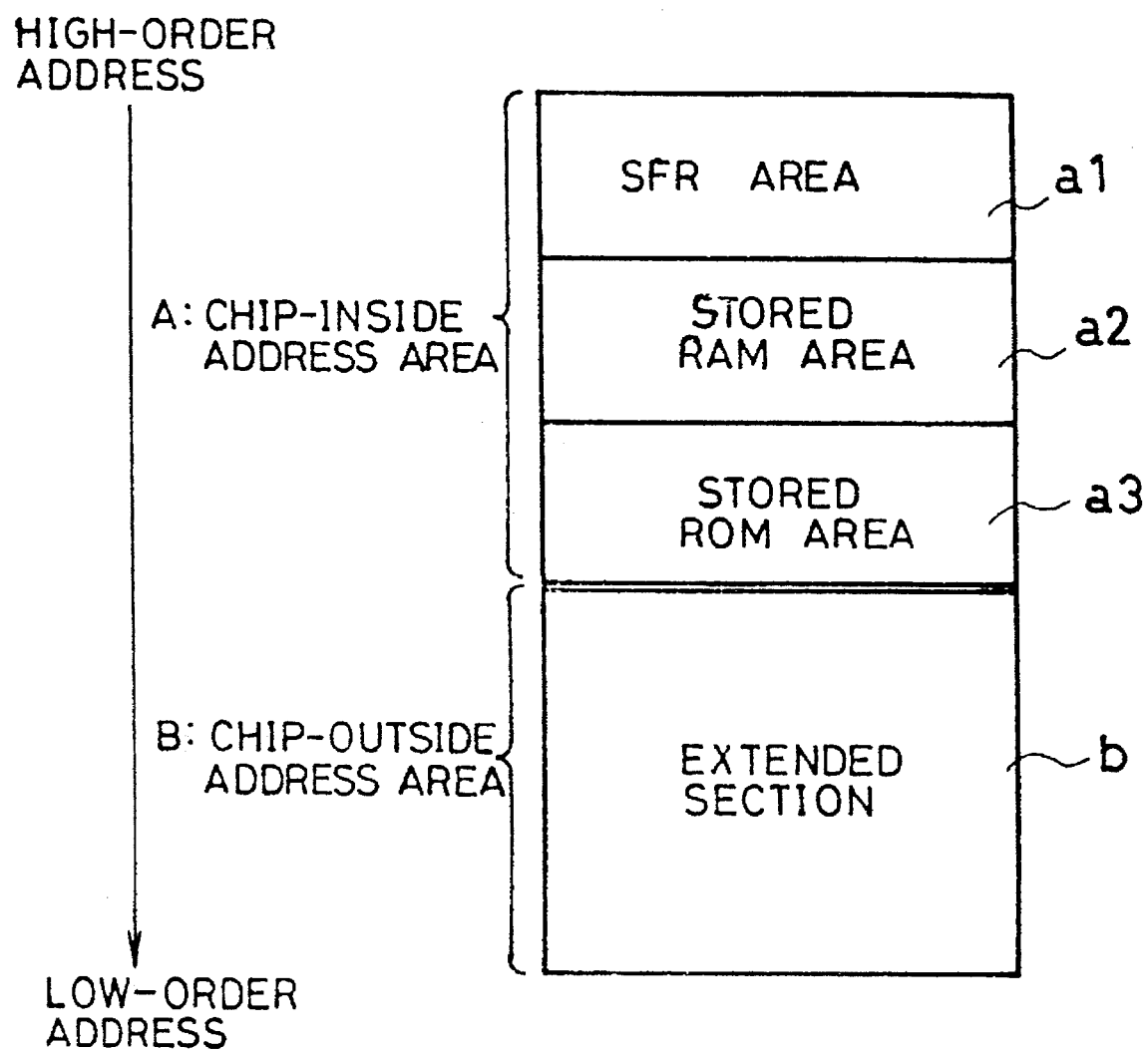
FIG. 40 shows an address map of a general MCU.

FIG. 13 is a block diagram showing the constitution of the microcomputer of the fifth embodiment. As shown in FIG. 13, the MCU 32g includes the address detection circuit 51 and enable signal control circuit 52 in addition to the MCU 32b having the same constitution as the existing MCU 32 (see FIGS. 37 to 39), newly-added circuit section 32c, input/output circuit 16, and operating-mode determination circuit 17.

Address signals and data are exchanged between the MCU core 32b, input/output circuit 16, and address detection circuit 51 through the signal line L10. The MCU core 32b outputs the latch signal ALE to the newly-added circuit section 32c, address detection circuit 51, and chip outside through the signal line L11. The MCU core 32b also gives the data enable signal /E to the newly-added circuit section 32c and enable signal control circuit 52 through the signal line L12. Moreover, the MCU core 32b outputs the read/write signal R/W to the newly-added circuit section 32c, enable signal control circuit 52, and chip outside through the signal line L13.

Signals are exchanged between the newly-added circuit section 32c and input/output circuit 16 through the signal line L5. The address detection circuit 51 gives the address detection signal SA to the enable signal control circuit 52 through the signal line L14. The enable signal control circuit 52 receives the address detection signal SA, read/write signal R/W, and data enable signal /E and outputs the external data enable signal /E' to an external unit.

The operating-mode determination circuit 17 gives the operating-mode signal S14 to the MCU core 32b by responding to the signal given from an external unit. The operating-mode signal S14 is also given to the newly-added circuit section 32c according to necessity. The MCU 32g is set to the normal operating mode when the operating-mode signal S14 is "L" and to the program development operating mode when the signal S14 is "H".

Figure 14:
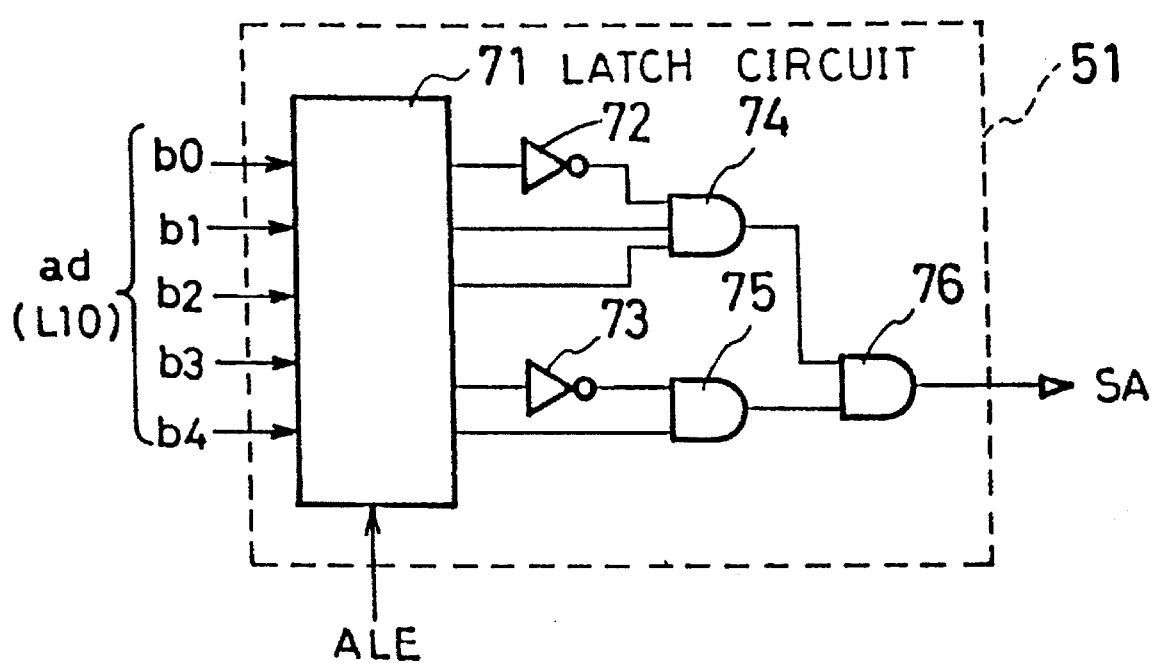
FIG. 14 is a circuit diagram showing the constitution of the address detection circuit included in the microcomputer in FIG. 13.

FIG. 14 shows detailed constitution of the address detection circuit 51. As shown in FIG. 14, the address detection circuit 51 includes the latch circuit 71, inverters 72 and 73, and AND gates 74 to 76. The latch circuit 71 fetches some address signals "ad" (b4 to b0) included in the address signal AD given through the signal line L10 from the MCU core 32b by responding to the latch signal ALE and outputs the signal to the gates 72 to 75 at the next stage. Finally, the output signal of the AND gate 76 serves as the address detection signal SA.

For the circuit shown in FIG. 14, it is premised that some address signals "ad" (b4 to b0) included in the address signal AD are always set to "10110" (binary) when the MCU core 32b accesses the newly-added circuit section 32c. Therefore, only when some address signals b4 to b0 are set to "10110" (binary), the address detection signal SA goes "H".

Figure 15:
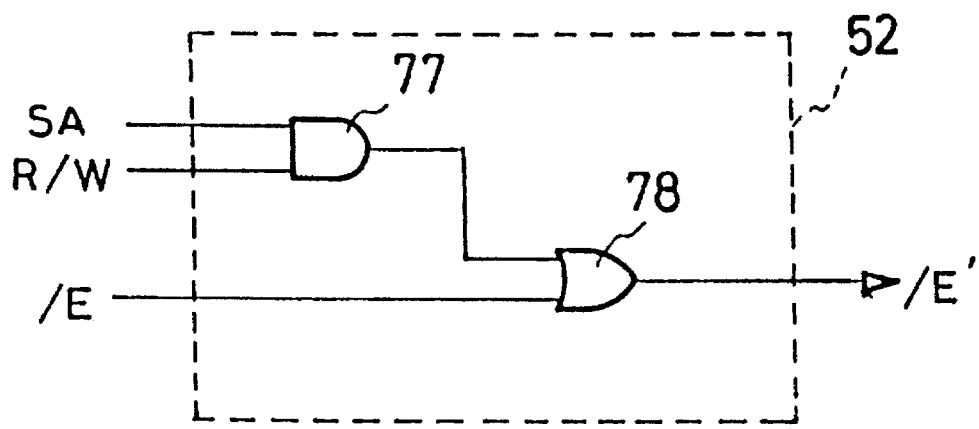
FIG. 15 is a circuit diagram showing the constitution of the enable signal control circuit included in the microcomputer in FIG. 13.

FIG. 15 shows detailed constitution of the enable signal control circuit 52. As shown in FIG. 15, the enable signal control circuit 52 includes the AND gate 77 and OR gate 78. The AND gate 77 receives the address detection signal SA and read/write signal R/W. The OR gate 78 receives the output signal of the AND gate 77 and the data enable signal /E. The output signal of the OR gate 78 serves as the external data enable signal /E'.

Figure 43:
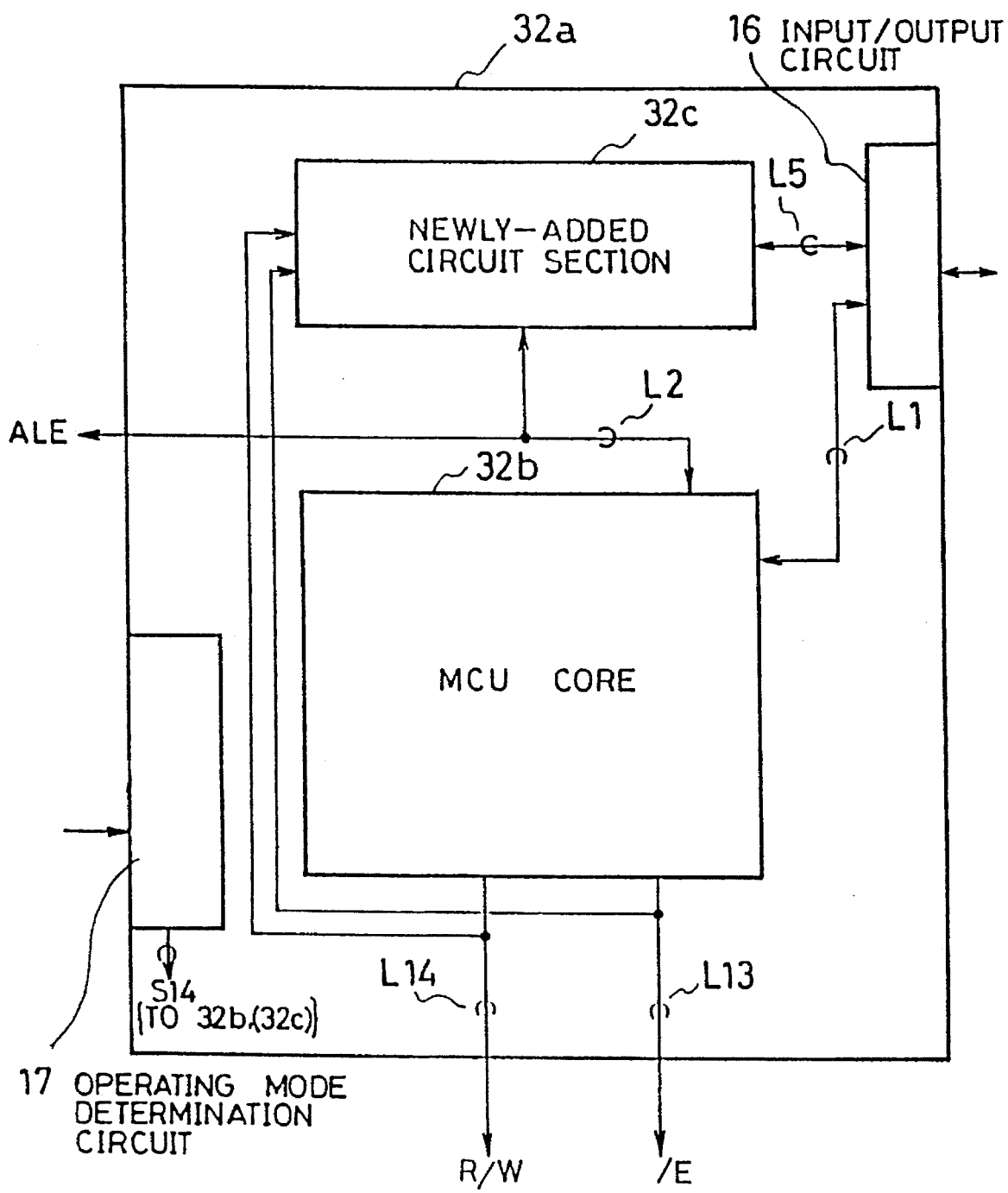
FIG. 43 is a block diagram showing the constitution of main portion of an MCU including a newly-added circuit section.
Figure 44:
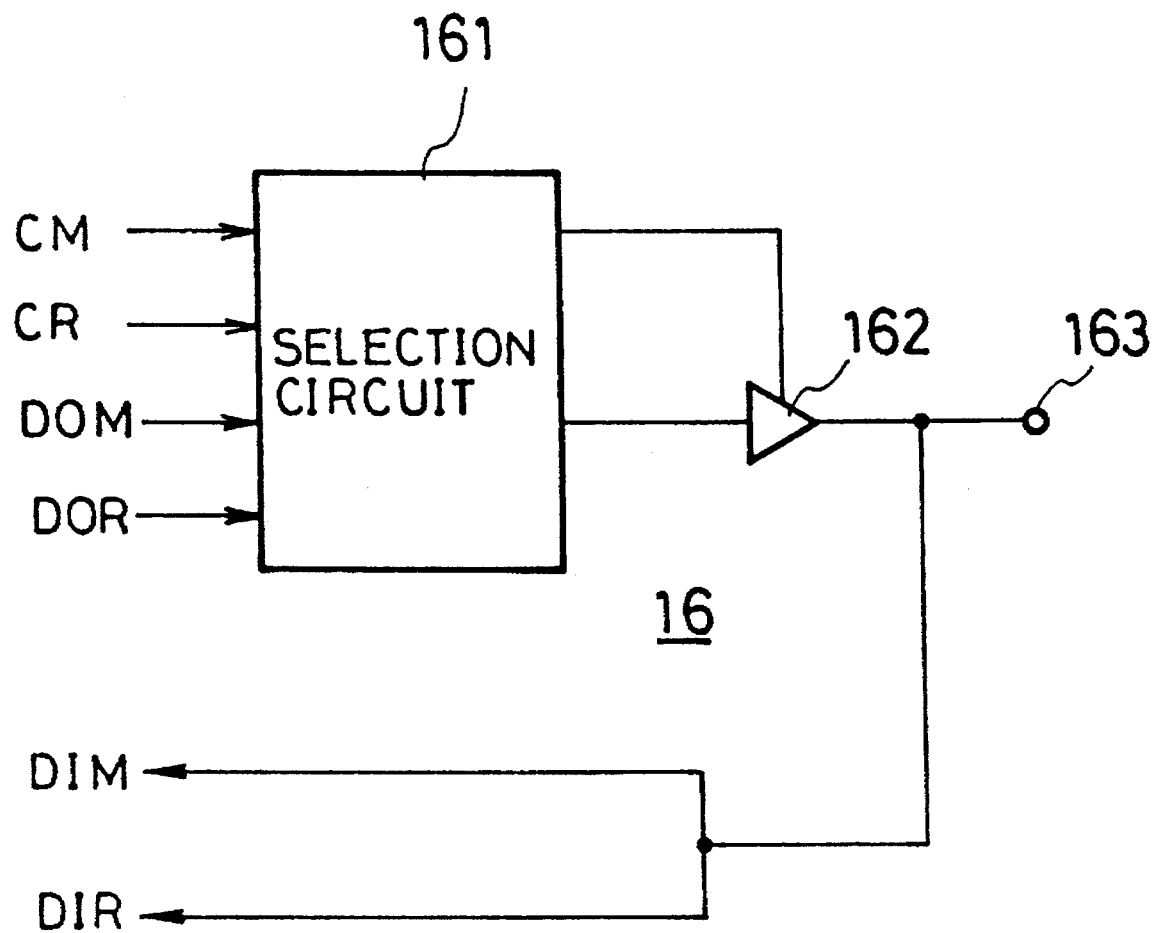
FIG. 44 shows the constitution of the input/output circuit included in the MCU in FIG. 43.
Figure 45:
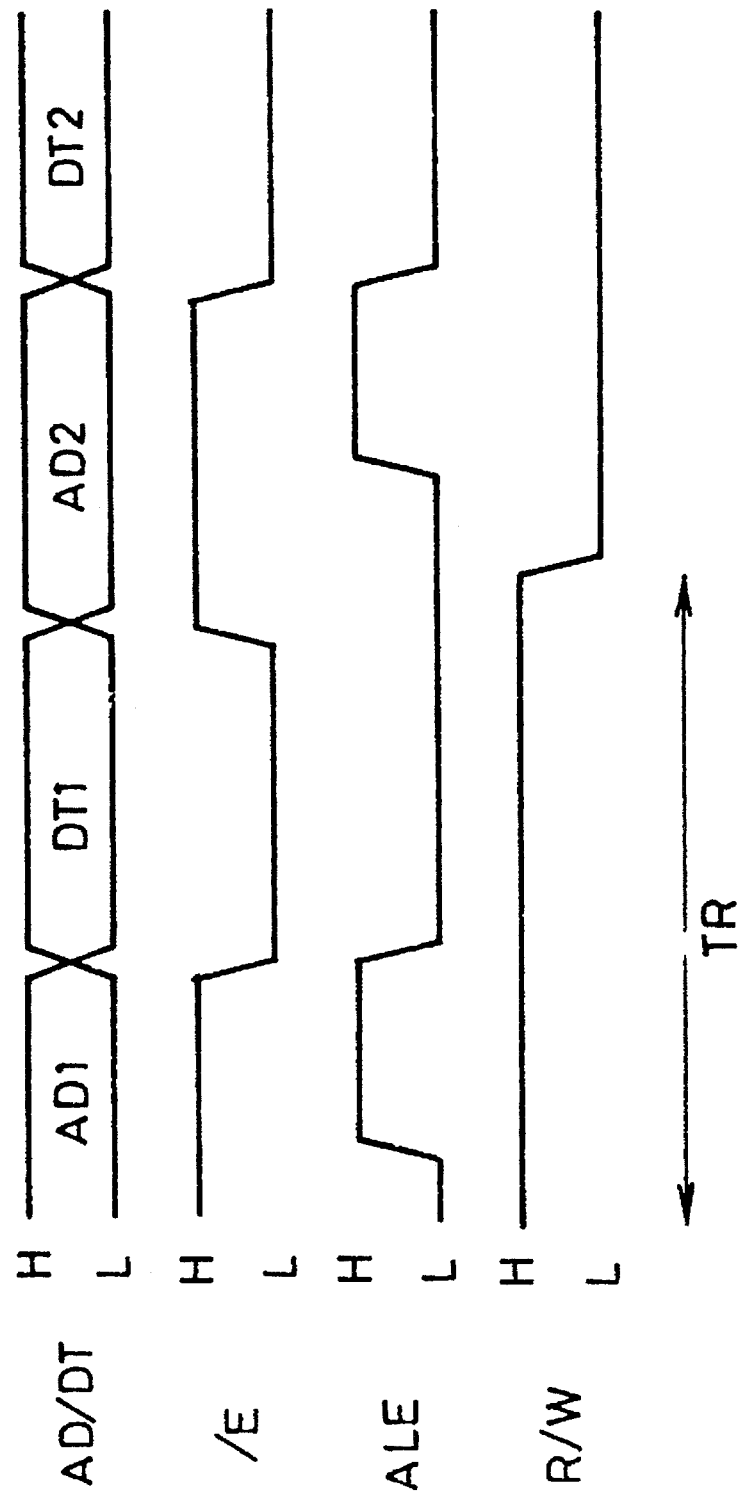
FIG. 45 is a timing chart for explaining the operation of the MCU in FIG. 43.

The constitution of other portions of the microcomputer 32g in FIG. 13 is the same as the constitution of the microcomputer 32a in FIG. 43.

Figure 16:
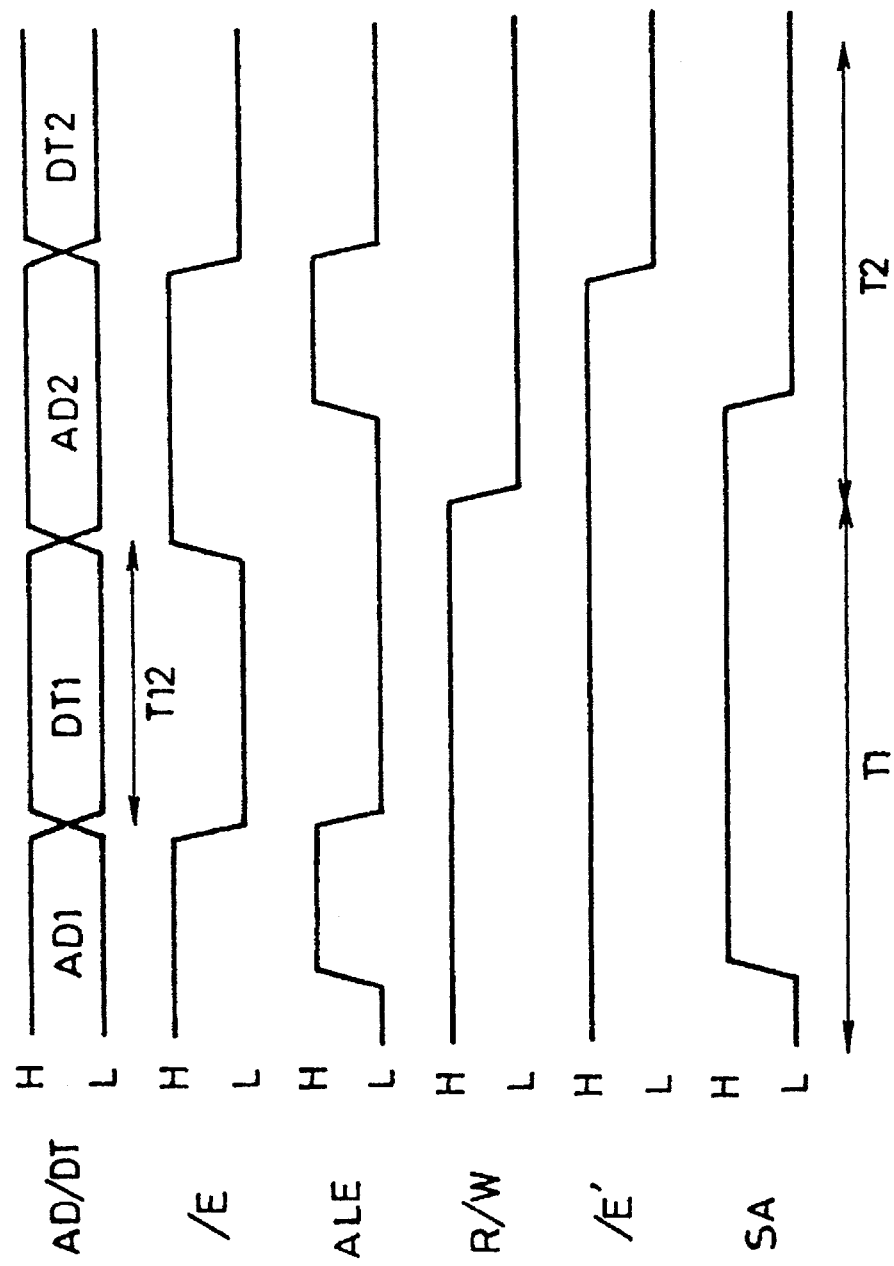
FIG. 16 is a timing chart for explaining the operation of the microcomputer in FIG. 13.

FIG. 16 is a timing chart for explaining the operation of the MCU 32g shown in FIG. 13. In FIG. 16, the period T1 shows a period for the MCU core 32b to read data from the newly-added circuit section 32c and the period T2 shows a period for the MCU core 32b to write data in a unit outside the chip.

In the period T1, the MCU core 32b is set to the state for indicating "read" and the read/write signal R/W is set to "H". Under this state, the MCU core 32b gives the address signal AD1 for specifying the newly-added circuit section 32c to the input/output circuit 16 and address detection circuit 51 through the signal line L10. Then, the address signal AD1 is given to the newly-added circuit section 32c from the input/output circuit 16 through the signal line L5.

Then, the address signal AD1 is fetched into the newly-added circuit section 32c by using the change of the latch signal ALE to "H" as a trigger. At the same time, the address detection circuit 51 fetches part of the address signal AD1 and detects that the address signal AD1 specifies the newly-added circuit section 32c. As a result, the "H"-level address detection signal SA is given to the enable signal control circuit 52 through the signal line L14.

The newly-added circuit section 32c provides the input/output circuit 15 with the data DT1 corresponding to the address signal AD1 through the signal line L5 from the point of time the data enable signal /E outputted from the MCU core 32b goes active ("L"). Then, the data DT1 is given to the MCU core 32b from the input/output circuit 15 through the signal line L10. Thus, data is read from the newly-added circuit section 32c.

In the output period T12 of the data DT1 during the period T1, the address detection signal SA is "H". Therefore, the external data enable signal /E' outputted from the enable signal control circuit 52 is fixed to "H". The external enable signal /E' is a signal for indicating enabling or disabling of the MCU 32g to transfer data to or from an external unit. It is enabled for the external unit to output data to an internal unit of the MCU 32g when the external data enable signal /E' is under the active state ("L").

For the above embodiment, the external data enable signal/E' is set to "H" while the MCU core 32b accesses the newly-added circuit section 32c. Therefore, it is impossible to input external data to the MCU 32g even if the program development apparatus erroneously judges that an external unit of the MCU 32g is specified by the address signal AD1 when read operation for the newly-added circuit section 32c in the MCU 32g is debugged. As a result, it is avoided that the internal data read from the newly-added circuit section 32c collides with external data.

Therefore, it is possible to accurately debug the program for the new MCU 32g by using the existing program development apparatus developed for the existing MCU 32 without considering the newly-added circuit section 32c.

When the address signal AD2 for specifying objects other than the newly-added circuit section 32c is given to the address detection circuit 51 in the period T2 in FIG. 16, the address signal SA goes "L". Thereby, the data enable signal /E is directly outputted as the external data enable signal /E'. Therefore, the MCU 32g normally operates as ever.

Figure 17:
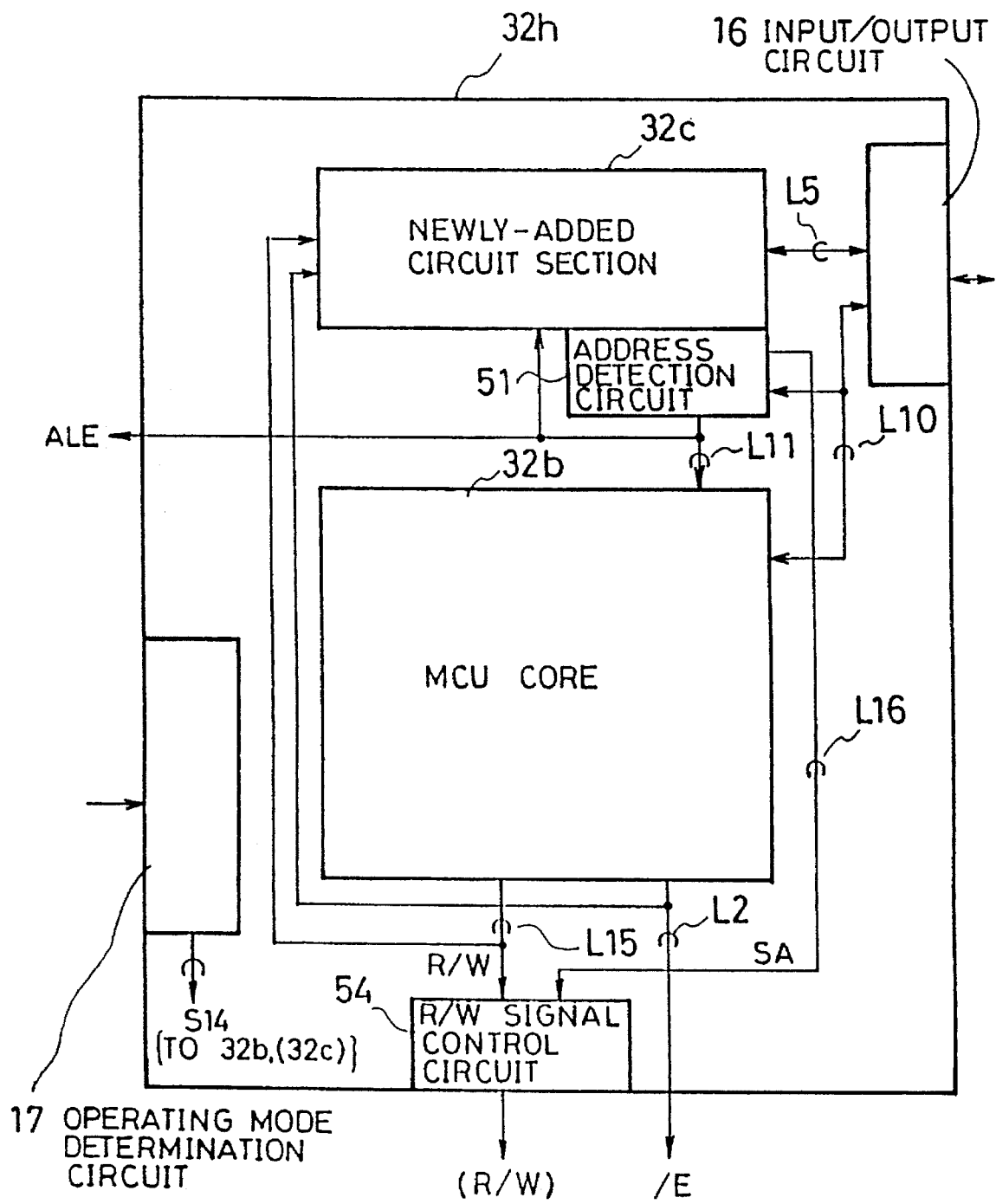
FIG. 17 is a block diagram showing the constitution of the microcomputer of the sixth embodiment.
Figure 18:
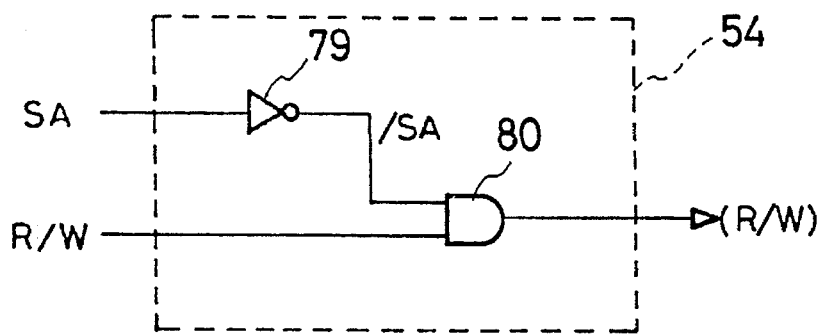
FIG. 18 is a circuit diagram showing the constitution of the read/write signal control circuit included in the microcomputer in FIG. 17.
Figure 19:
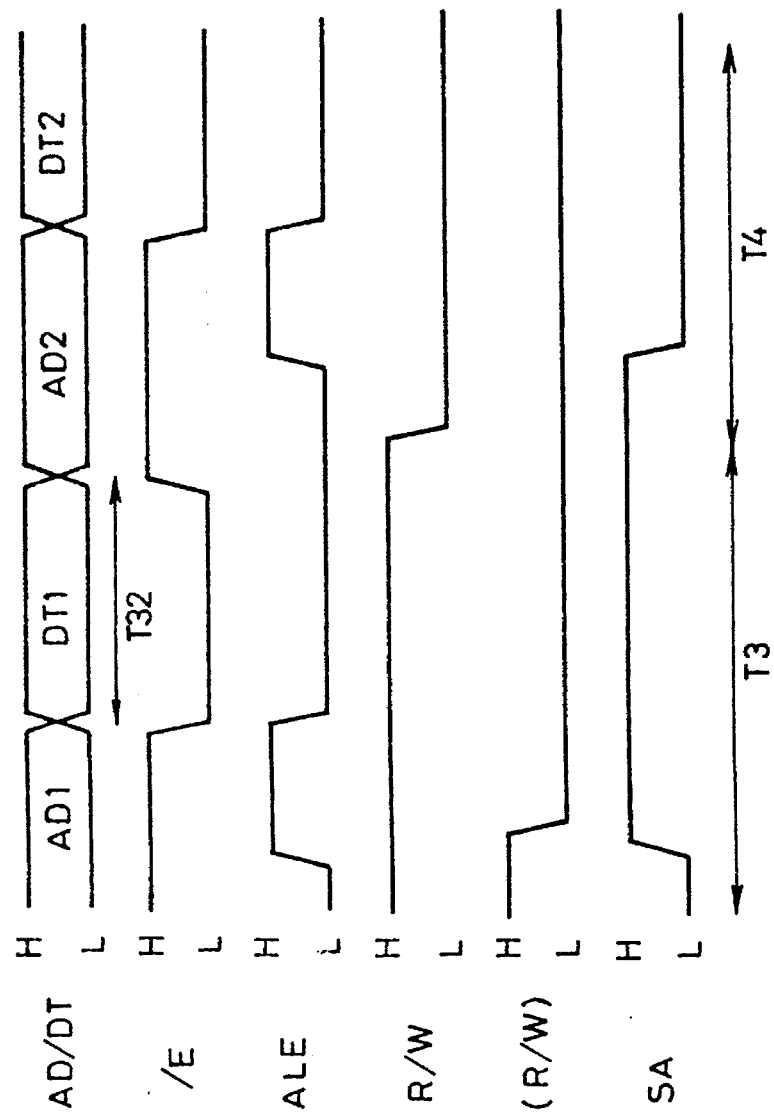
FIG. 19 is a timing chart for explaining the operation of the microcomputer in FIG. 17.

(6) Microcomputer of sixth embodiment (FIGS. 17 to 19)

FIG. 17 is a block diagram showing the constitution of the microcomputer of the sixth embodiment. The MCU 32h in FIG. 17 is different from the MCU 32g in FIG. 13 in the fact that the read/write signal control circuit (hereafter referred to as R/W signal control circuit) 54 is used instead of the enable signal circuit 52.

The MCU core 32b outputs the data enable signal /E to the newly-added circuit section 32c and chip outside through the signal line L2 and gives the read/write signal R/W to the newly-added circuit section 32c and R/W signal control circuit 54 through the signal line L15. The address detection circuit 51 gives the address detection signal SA to the R/W control circuit 54 through the signal line L16.

The R/W signal control circuit 54 receives the read/write signal R/W and address detection signal SA and outputs the external read/write signal $(R/W)_1$ to the chip outside.

FIG. 18 shows detailed constitution of the R/W signal control circuit 54. As shown in FIG. 18, the R/W signal control circuit 54 includes the inverter 79 and AND gate 80. The inverter 79 reverses the address detection signal SA and outputs the reversed address detection signal /SA. The AND gate 80 receives the reversed address detection signal /SA and read/write signal R/W. The output signal of the AND gate 80 serves as the external read/write signal (R/W)'.

The constitution of other portions of the MCU 32h shown in FIG. 17 is the same as that of the MCU 32g shown in FIG. 13.

FIG. 19 is a timing chart for explaining the operation of the MCU 32h in FIG. 17. In FIG. 19, the period T3 shows a period for the MCU core 32b to read data from the newly-added circuit section 32c and the period T4 shows a period for the MCU core 32b to write data in an external unit.

In the period T3, the MCU core 32b is set to the state for indicating "read" and the read/write signal R/W is set to "H". Under this state, the MCU core 32b gives the address signal AD1 for specifying the newly-added circuit section 32c to the input/output circuit 16 and address detection circuit 51 through the signal line L10. Then, the address signal AD1 is given to the newly-added circuit section 32c from the input/output circuit 16 through the signal line L5.

Then, the address signal AD1 is fetched to the newly-added circuit section 32c by using the change of the latch signal ALE to "H" as a trigger. At the same time, the address detection circuit 51 fetches part of the address signal AD1 to detect that the address signal AD1 specifies the newly-added circuit section 32c. Thereby, "H"-level address signal SA is given to the signal control circuit 54 through the signal line L16.

The newly-added circuit section 32c provides the input/output circuit 16 with the data DT1 corresponding to the address signal AD1 through the signal line L5 from the point of time the data enable signal/E outputted from the MCU core 32b goes active ("L"). Then, the data DT1 is given to the MCU core 32b from the input/output circuit 16 through the signal line L10. Thus, data is read from the newly-added circuit section 32c.

In the data-DT1 output period T32 during the period T3, the external read/write signal (R/W)' outputted from the R/W signal control circuit 54 is fixed to "L" because the address detection signal SA is "H". The external read/write signal (R/W) is a signal for indicating read/write of data from or in an external unit of the MCU 32h. Data read is indicated when the external read/write signal (R/W)' is "H" and data write is indicated when the signal (R/W)' is "L". The external unit is set to the data input ready state when the external read/write signal (R/W)' is "L".

For the above embodiment, the external read/write signal (R/W)' is set to "L" while the MCU core 32b accesses the newly-added circuit section 32c. Thereby, the external unit is indicated to wait data input.

Therefore, the program development apparatus does not erroneously input external data to the MCU 32h even if the program development apparatus erroneously judges that an external unit of the MCU 32h is specified by the address signal AD1 when read operation for the newly-added circuit section 32c in the MCU 32h is debugged. As a result, it is avoided that the internal data read from the newly-added circuit section 32c collides with external data similarly to the case of the embodiment in FIG. 13.

Therefore, the program for the new MCU 32h can accurately be debugged by directly using the existing program development apparatus developed for the existing MCU 32.

When the address signal AD2 for specifying objects other than the newly-added circuit section 32c is given to the address detection circuit 51 in the period T4 in FIG. 19, the address detection signal SA goes "L". Thereby, the read/write signal R/W is directly outputted as the external read/write signal (R/W)'. As a result, the MCU 32h normally operates as ever.

Figure 21:
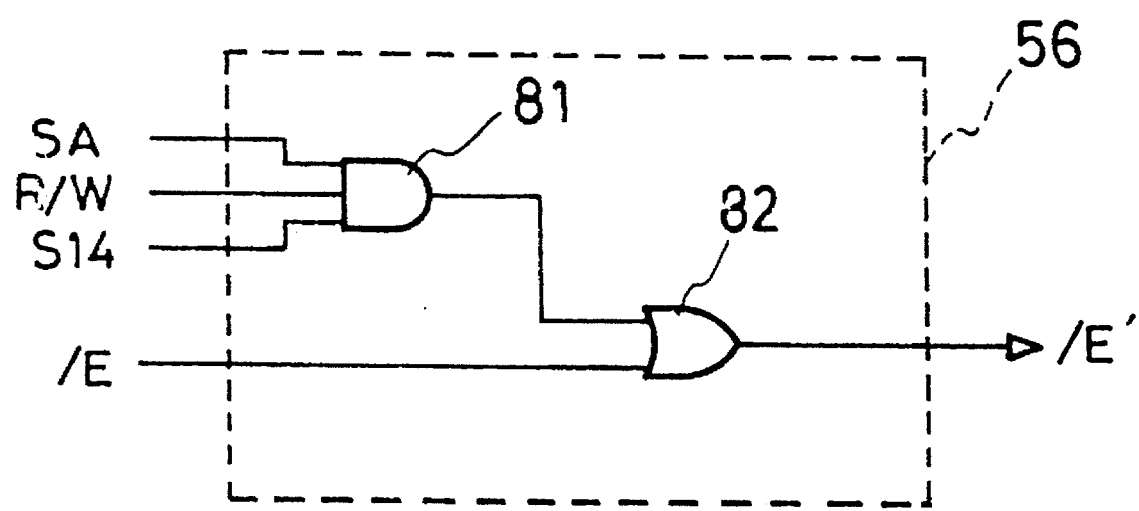
FIG. 21 is a circuit diagram showing the constitution of the enable signal control circuit included in the microcomputer in FIG. 20.

(7) Microcomputer of seventh embodiment (FIGS. 20 and 21)

FIG. 20 is a block diagram showing the constitution of the microcomputer of the seventh embodiment. The MCU 32i in FIG. 20 is different from the MCU 32g in FIG. 3 in the fact that the enable signal control circuit 56 is used instead of the enable signal control circuit 52.

The enable signal control circuit 56 receives the address detection signal SA, read/write signal R/W, and data enable signal /E shown in FIG. 13 similarly to the enable signal control circuit 52. Moreover, the circuit 56 receives the operating-mode signal S14 from the operating-mode determination circuit 17 through the signal line L17 and outputs the external data enable signal /E' to the chip outside.

The operating-mode signal S14, as described above, goes "L" when the MCU 32i is set to normal operating mode and goes "H" when the MCU 32i is set to the program-development operating mode.

FIG. 21 shows detailed constitution of the enable signal control circuit 56. As shown in FIG. 21, the enable signal control circuit 56 includes the three-input AND gate 81 and OR gate 82. The AND gate 81 receives the address detection signal SA, read/write signal R/W, and operating-mode signal S14. The OR gate 82 receives the output signal of the AND gate 81 and the data enable signal /E. The output signal of the OR gate 82 serves as the external data enable signal /E'.

The constitution of other portions of the MCU 32i shown in FIG. 20 is the same as that of the MCU 32g shown in FIG. 13.

For the embodiment shown in FIG. 20, the operating-mode signal S14 goes "H" when the MCU 21i is set to the program-development operating mode by a signal given from an external unit. Thereby, the enable signal control circuit 56 becomes equivalent to the enable signal control circuit 52 shown in FIG. 13. Therefore, the MCU 32i performs the operation completely equivalent to that of the MCU 32g. As a result, this embodiment shows the same effect as the embodiment in FIG. 13.

When the MCU 32i is set to the normal operating mode by a signal given from an external unit, the operating-mode signal S14 goes "L". Thereby, the data enable signal /E is always outputted as the external data enable signal /E' regardless of the address detection signal SA and read/write signal Therefore, to test only the MCU core 32b having the same constitution as the existing MCU 32, the testing equipment for the existing MCU 32 can be used by setting the MCU 32i to the normal operating mode.

Thus, the effect is obtained that the external unit used for the MCU core 32b having the same constitution as the existing MCU 32 is more widely used.

Figure 22:
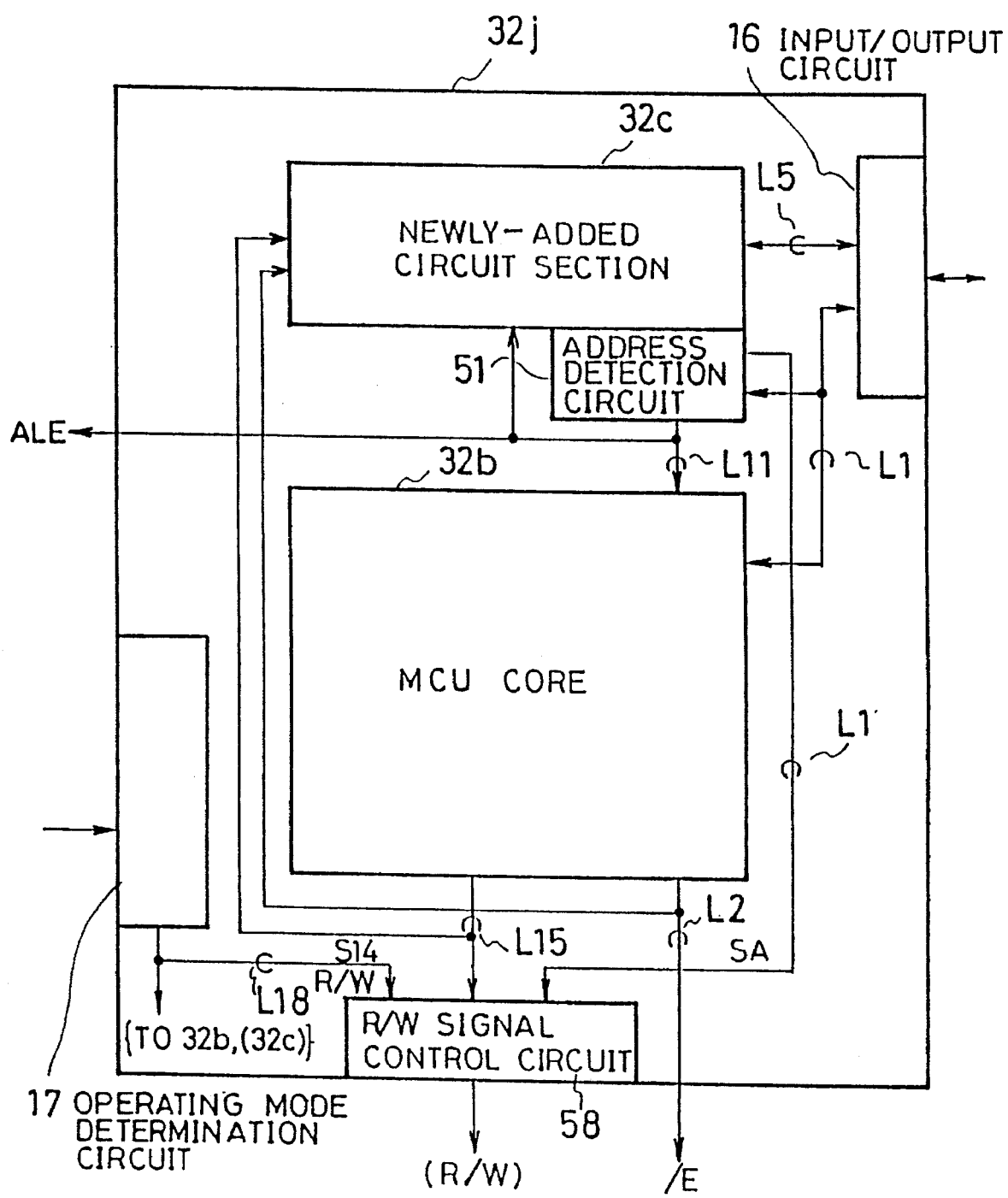
FIG. 22 is a block diagram showing the constitution of the microcomputer of the eighth embodiment.
Figure 23:
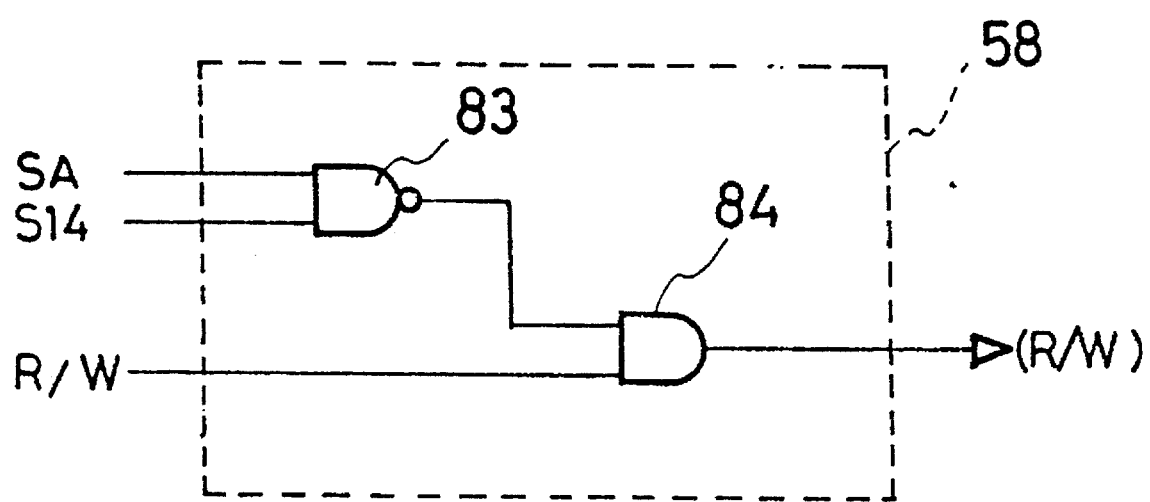
FIG. 23 is a circuit diagram showing the constitution of the read/write signal control circuit included in the microcomputer in FIG. 22.

(8) Microcomputer of eighth embodiment (FIGS. 22 and 23)

FIG. 22 is a block diagram showing the constitution of the microcomputer of the eighth embodiment. The MCU 32j in FIG. 22 is different from the MCU 32h in FIG. 17 in the fact that the R/W signal control circuit 58 is used instead of the R/W signal control circuit 54.

The R/W signal control circuit 58 receives the read/write signal R/W and address detection signal SA similarly to the R/W signal control circuit 56 shown in FIG. 17, and moreover receives the operating-mode signal S14 form the operating-mode determination circuit 17 through the signal line L18 and outputs the external read/write signal (R/W)' to the chip outside.

FIG. 23 shows detailed constitution of the R/W signal control circuit 58. As shown in FIG. 23, the R/W signal control circuit 58 includes the NAND gate 83 and AND gate 84. The NAND gate 83 receives the address detection signal SA and operating-mode signal S14. The AND gate 84 receives the output signal of the NAND gate 83 and the read/write signal R/W. The output signal of the AND gate 84 serves as the external read/write signal (R/W)'.

The constitution of other portions of the MCU 32j shown in FIG. 22 is the same as that of the MCU 32h shown in FIG. 17.

For the embodiment in FIG. 22, the operating-mode signal S14 goes "H" when the MCU 32j is set to the program development operating mode. Thereby, the R/W signal control circuit 58 becomes equivalent to the R/W signal control circuit 54 shown in FIG. 17. Therefore, the MCU 32j performs the operation completely equivalent to that of the MCU 32h shown in FIG. 17. As a result, this embodiment shows the same effect as the embodiment in FIG. 17.

When the MCU 32j is set to the normal operating mode, the operating-mode signal S14 goes "L". Thereby, the read/write signal R/W is always outputted as the external read/write signal (R/W)' regardless of the address detection signal SA. Therefore, Thus, the effect is obtained that the external unit used for the MCU core 32b having the same constitution as the existing MCU 32 is more widely used, similarly to the case of the embodiment in FIG. 20.

(9) Program development apparatus of ninth embodiment (FIGS. 24 to 28)

Figure 24:
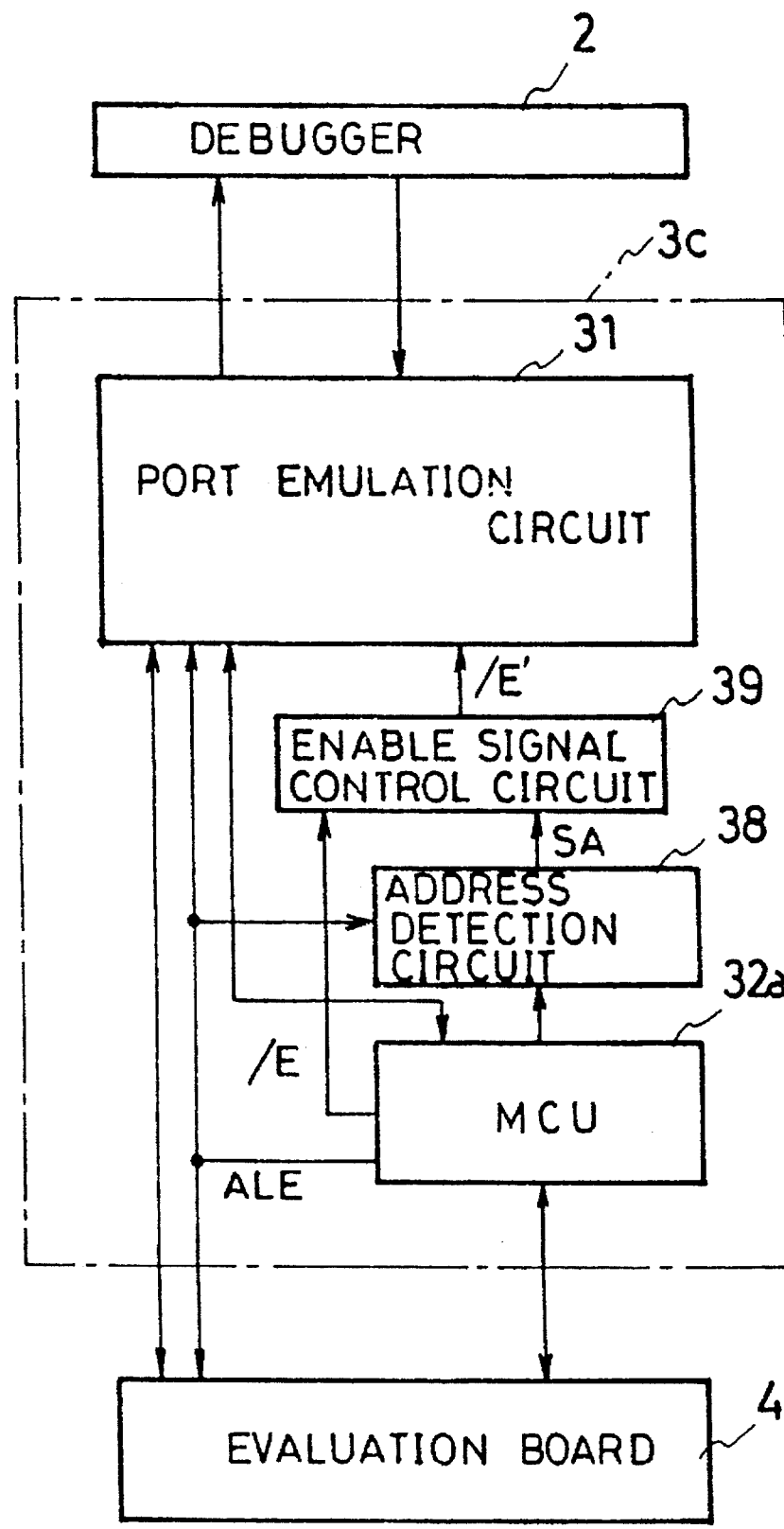
FIG. 24 is a block diagram showing the constitution of the program development apparatus of the ninth embodiment.

FIG. 24 is a block diagram showing the constitution of the pod 3c of the program development apparatus of the ninth embodiment. The entire constitution of the program development apparatus is the same as the constitution shown in FIG. 33.

Figure 42:
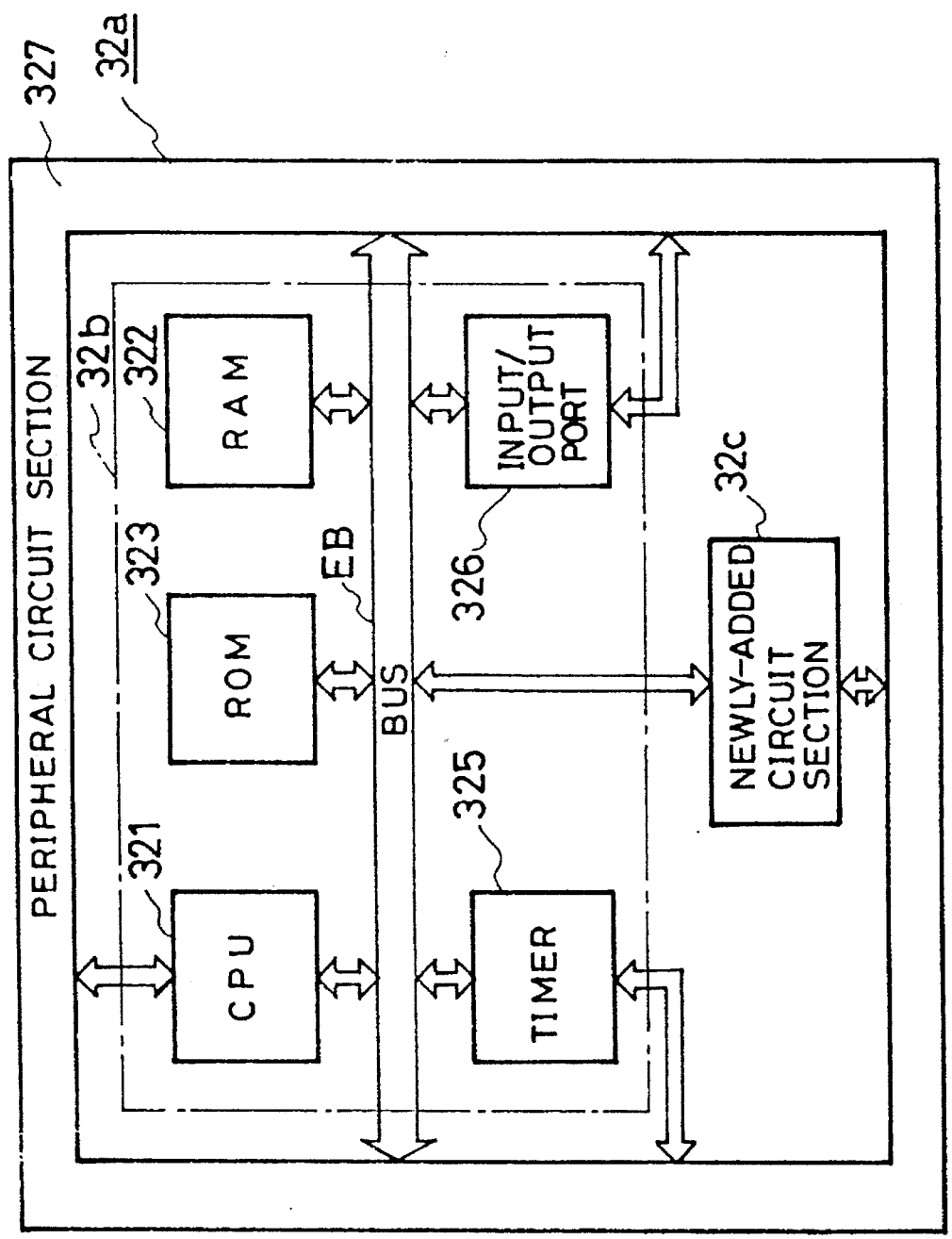
FIG. 42 is a block diagram showing an example of the constitution of an MCU including a newly-added circuit section.

The pod 3c includes the port emulation circuit 31, evaluation MCU 32a, address detection circuit 38, and enable signal control circuit 39. The constitution of the evaluation MCU 32a is same as the constitution shown in FIGS. 41 to 43. The address map of the evaluation MCU 32a is the same as the address map shown in FIG. 46. In FIG. 24, neither address latch nor data bus buffer are illustrated.

An address signal is given to the address detection circuit 38 from the evaluation MCU 32a. The address detection circuit 38 outputs "H"-level address detection signal SA when the address signal specifies an address in the newly-added circuit area shown in FIG. 46. The enable signal control circuit 39 gives data enable signal /E' to the port emulation circuit 31 by responding to the the address detection signal SA outputted from the address detection circuit 38 and the data enable signal /E output ted from the MCU 32a.

Figure 25:
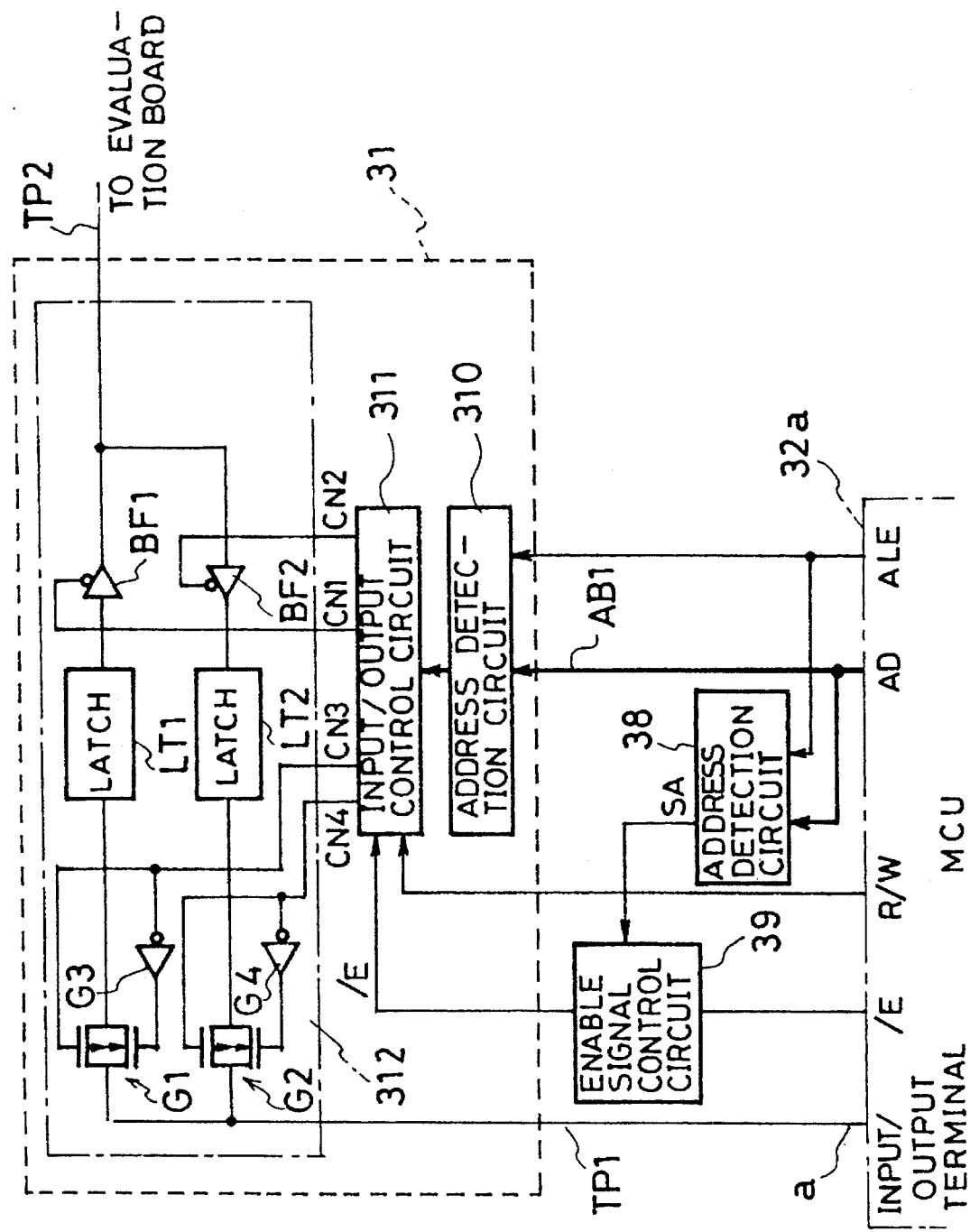
FIG. 25 is a diagram showing the connection between the port emulation circuit, evaluation MCU, address detection circuit, and enable signal control circuit included in the pod in FIG. 24.

FIG. 25 shows the connection between the port emulation circuit 31, evaluation MCU 32a, address detection circuit 38, and enable signal control circuit 39. The port emulation circuit 31 includes the address detection circuit 310, input/output control circuit 311, and a plurality of input/output circuits similarly to the port emulation circuit 31 shown in FIG. 36. Only one input/output circuit 312 related to a set of input/output terminals TP1 and TP2 is shown in FIG. 25. The input/output terminal TP 1 is connected to one input/output terminal "a" of the evaluation MCU 32a.

The address detection circuit 38 outputs the address detection signal SA by responding to the address signal AD given from the MCU 32a through the address bus AB1 and the latch signal ALE given from the MCU 32a. The enable signal control circuit 39 outputs the data enable signal /E' by responding to the data enable signal /E given from the MCU 32a and the address detection signal SA given from the address detection circuit 38. The data enable signal /E' is given to the input/output control circuit 311 in the port emulation circuit 31.

Figure 26:
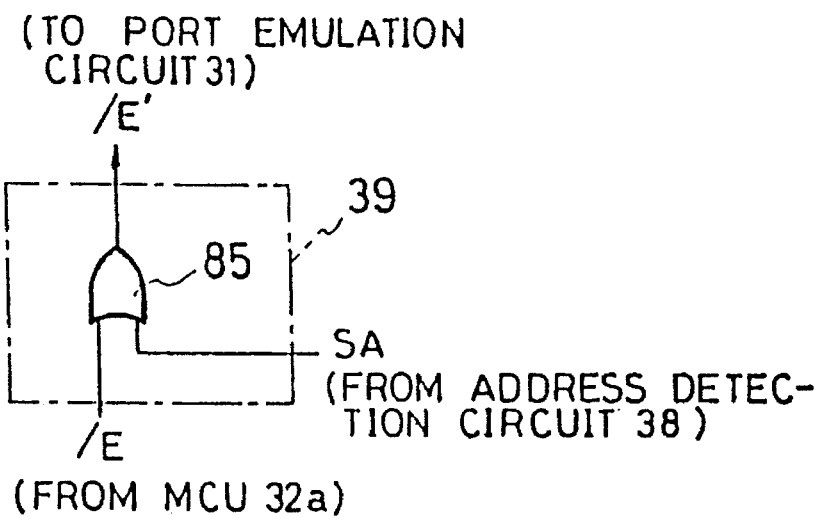
FIG. 26 is a circuit diagram showing the constitution of the enable signal control circuit included in the pod in FIG. 24.

FIG. 26 shows detailed constitution of the enable signal control circuit 39. The enable signal control circuit 39 includes the OR gate 85. The OR gate 85 receives the data enable signal /E from the MCU 32a and the address detection signal SA from the address detection circuit 38. The output signal of the OR gate 85 is given to the port emulation circuit 31 as the data enable signal /E'.

The enable signal control circuit 39 outputs "H"-level data enable signal /E' when the address detection signal SA is "H" and the data enable signal /E as the data enable signal /E' when the address detection signal SA is "L". Thus, the data enable signal /E' is set to the data input/output disabling state ("H") when the the address signal outputted from the MCU core 32b in the MCU 32a specifies an address in the newly-added circuit section 32c. Therefore, the input/output circuit 312 in the port emulation circuit 31 is set to the data input/output disabling state.

Figure 27:
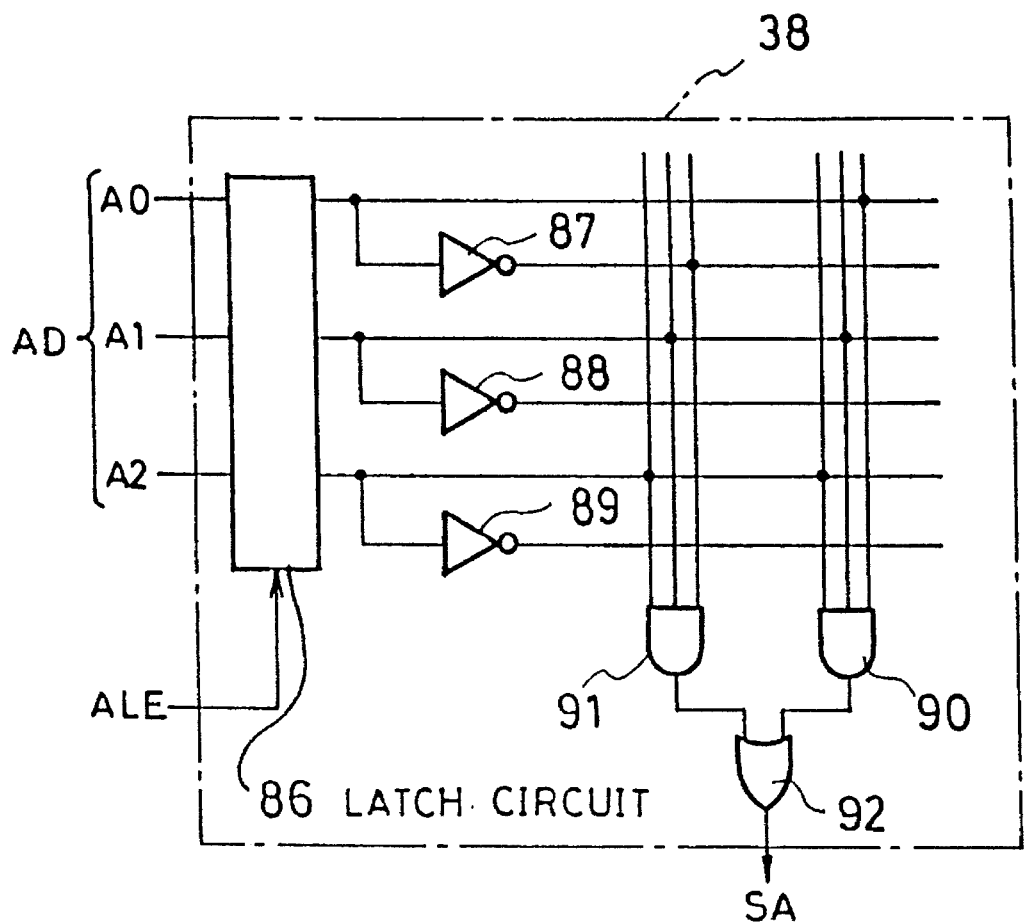
FIG. 27 is a circuit diagram showing the constitution of the address detection circuit included in the pod in FIG. 24.

FIG. 27 shows detailed constitution of the address detection circuit 38. In FIG. 27, the address signal AD includes 3-bit address signals A0, A1, and A2 in order to simplify the description.

The address detection circuit 38 includes the latch circuit 86, inverters 87 to 89, AND gates 90 and 91, and OR gate 92. The latch circuit 86 fetches the address signal AD by responding to the latch signal ALE and outputs it to the gates 87 to 91 at the next stage. Finally, the output signal of the OR gate 92 serves as the address detection signal SA.

Three-bit address signals A0, A1, and A2 can specify up to eight addresses. In FIG. 27, a constitution is shown in which two of eight addresses, that is, an address shown by A0="H", A1="H", and A2="H" and an address shown by A0="L", A1="H", and A2="H" are detected to output the address detection signal SA.

Figure 28:
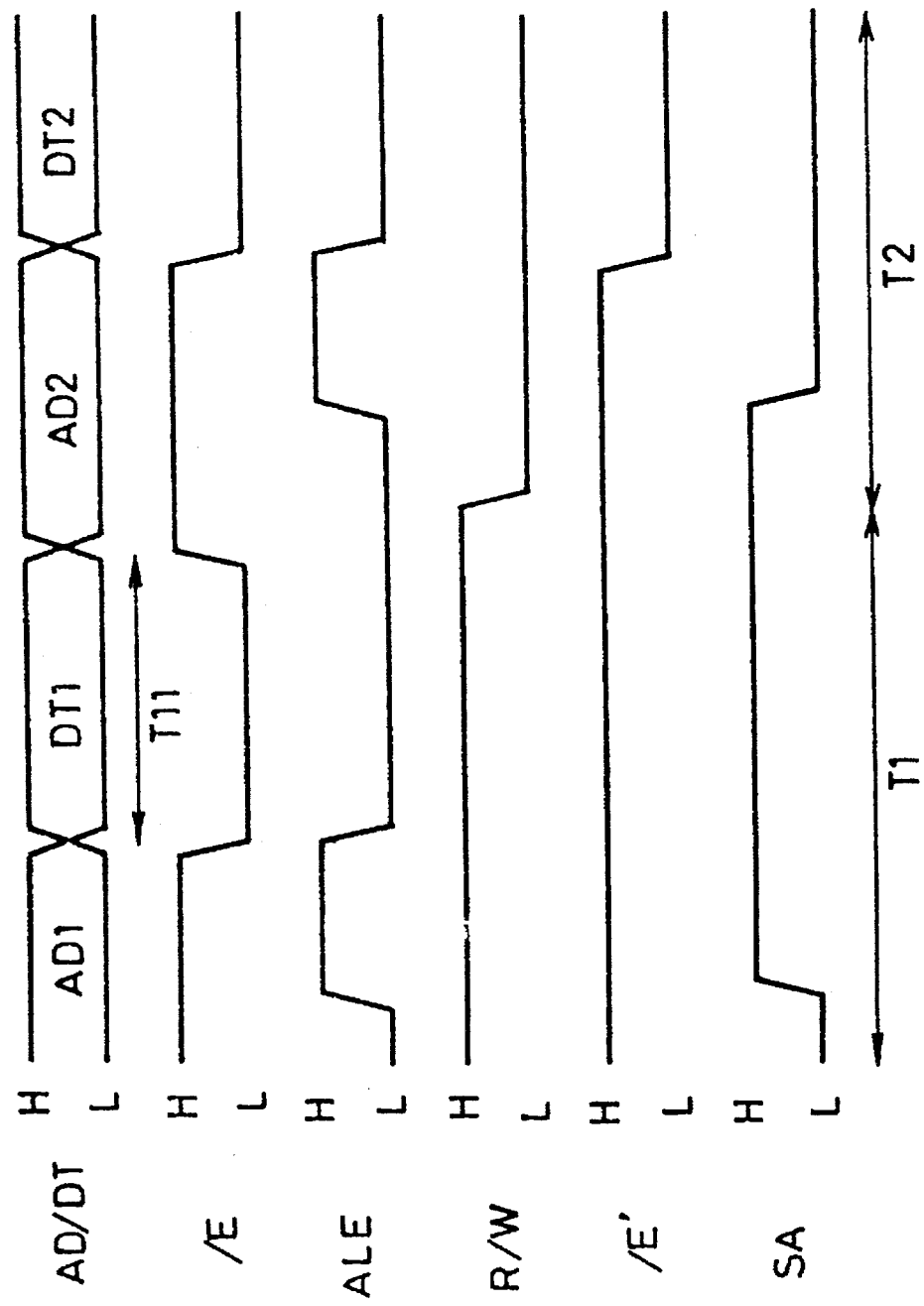
FIG. 28 is a timing chart for explaining the operation of the pod in FIG. 24.

FIG. 28 is a timing chart for explaining the operation of the pod 3c shown in FIG. 24. In FIG. 28, the period T1 shows a period for the MCU core 32b (see FIG. 43) in the MCU 32a to read data from the newly-added circuit section 32c (see FIG. 43) and the period T2 shows a period for the MCU core 32b to write data in an external unit.

In the period T1, the MCU core 32b is set to the state for indicating "read" and the read/write signal R/W is set to "H". Therefore, port emulation circuit 31 judges that the MCU 32a is in the data read state.

For the existing pod 3, the data enable signal /E outputted from the MCU 32a is given to the port emulation circuit 31. Therefore, the port emulation circuit 31 judges that the MCU 32 is in the data input/output enabling state during the period T1 when the data enable signal /E is "L" and gives data to the input/output terminal "a" of the MCU 32a.

For the pod 3c of the above embodiment, however, the data enable signal /E' outputted from the enable signal control circuit 39 is given to the port emulation circuit 31 instead of the the data enable signal /E outputted from the MCU 32a. The data enable signal /E' is set to "H" when the address detection signal SA is "H".

Therefore, the data enable signal /E' is set to "H" also in the period T11. Therefore, the port emulation circuit 31 judges that the MCU 32a is set to the data input/output disabling state and does not give data to the input/output terminal "a" of the MCU 32a.

Thus, when the MCU core 32b in the MCU 32a reads data from the newly-added circuit section 32c assigned with an address corresponding to the chip-outside address area of the developed MCU 32, the data enable signal /E' under the data input/output disabling state ("H") is given to the port emulation circuit 31. Thereby, the input/output circuit 312 in the port emulation circuit 31 is set to the input/output disabling state.

Therefore, it is avoided. that the signal given from the evaluation board 4 or debugger 2 to the port emulation circuit 31 collides with the signal outputted from the newly-added circuit section 32c in the evaluation MCU 32a.

This embodiment makes it possible to use the program development apparatus used for the existing MCU 32 also for a newly-developed MCU by providing the program development apparatus with the simple address detection circuit 38 and enable signal control circuit 39.

(10) Program development apparatus of tenth embodiment (FIGS. 29 to 32)

Figure 29:
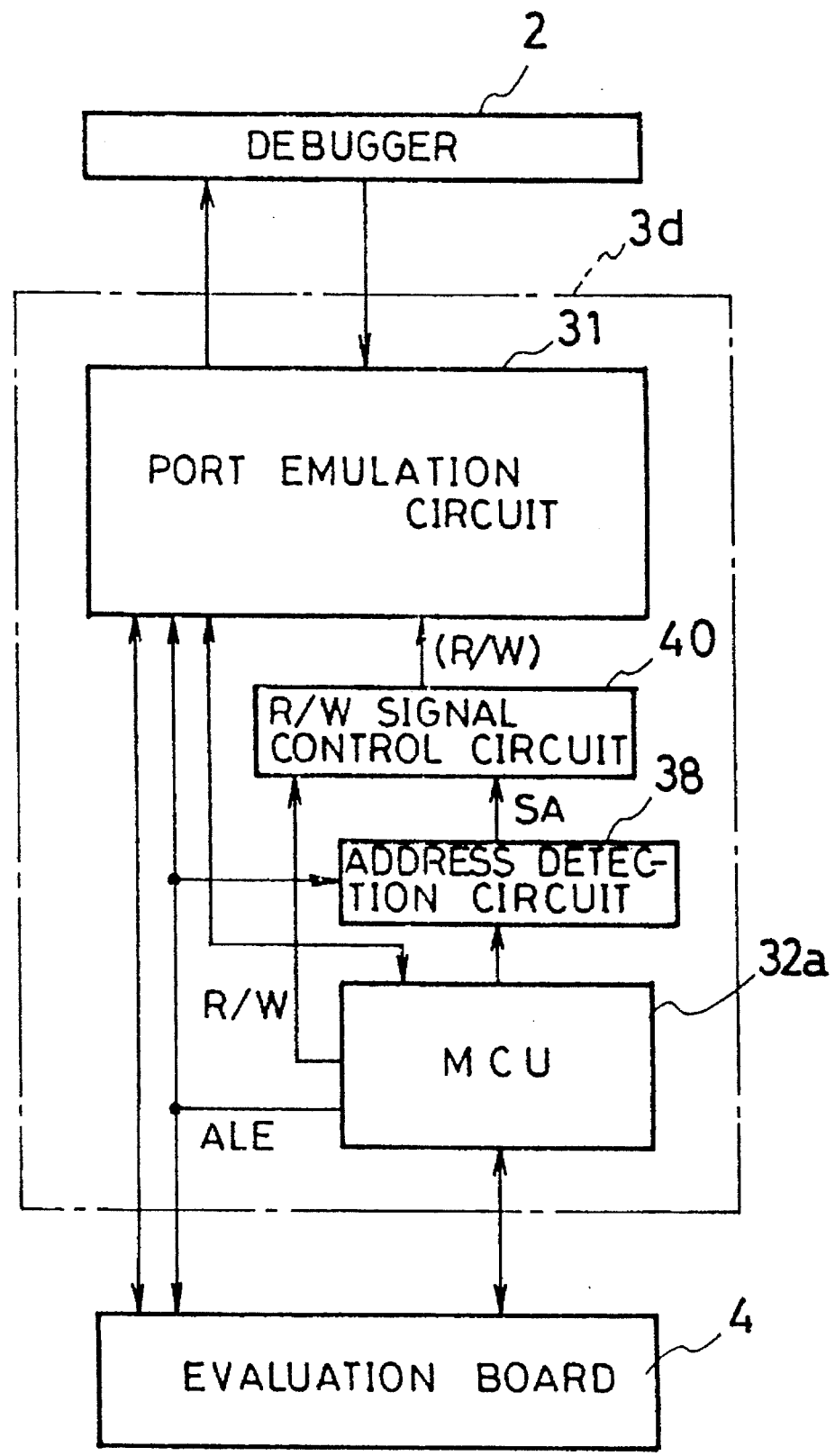
FIG. 29 is a block diagram showing the constitution of the program development apparatus of the tenth embodiment.

FIG. 29 is a block diagram showing the constitution of the program development apparatus of the tenth embodiment. The entire constitution of the program development apparatus is the same as the constitution shown in FIG. 33.

The pod 3d shown in FIG. 29 is different from the pod 3c shown in FIG. 24 in the fact that the read/write signal control circuit (hereafter referred to as R/W signal control circuit) 40 is used instead of the enable signal control circuit 39. The R/W signal control circuit 40 receives the read/write signal R/W outputted from the MCU 32a and the address detection signal SA outputted from the address detection circuit 38 and gives the read/write signal (R/W)' to the port emulation circuit 31. The constitution of other portions is the same as the constitution shown in FIG. 24.

Figure 30:
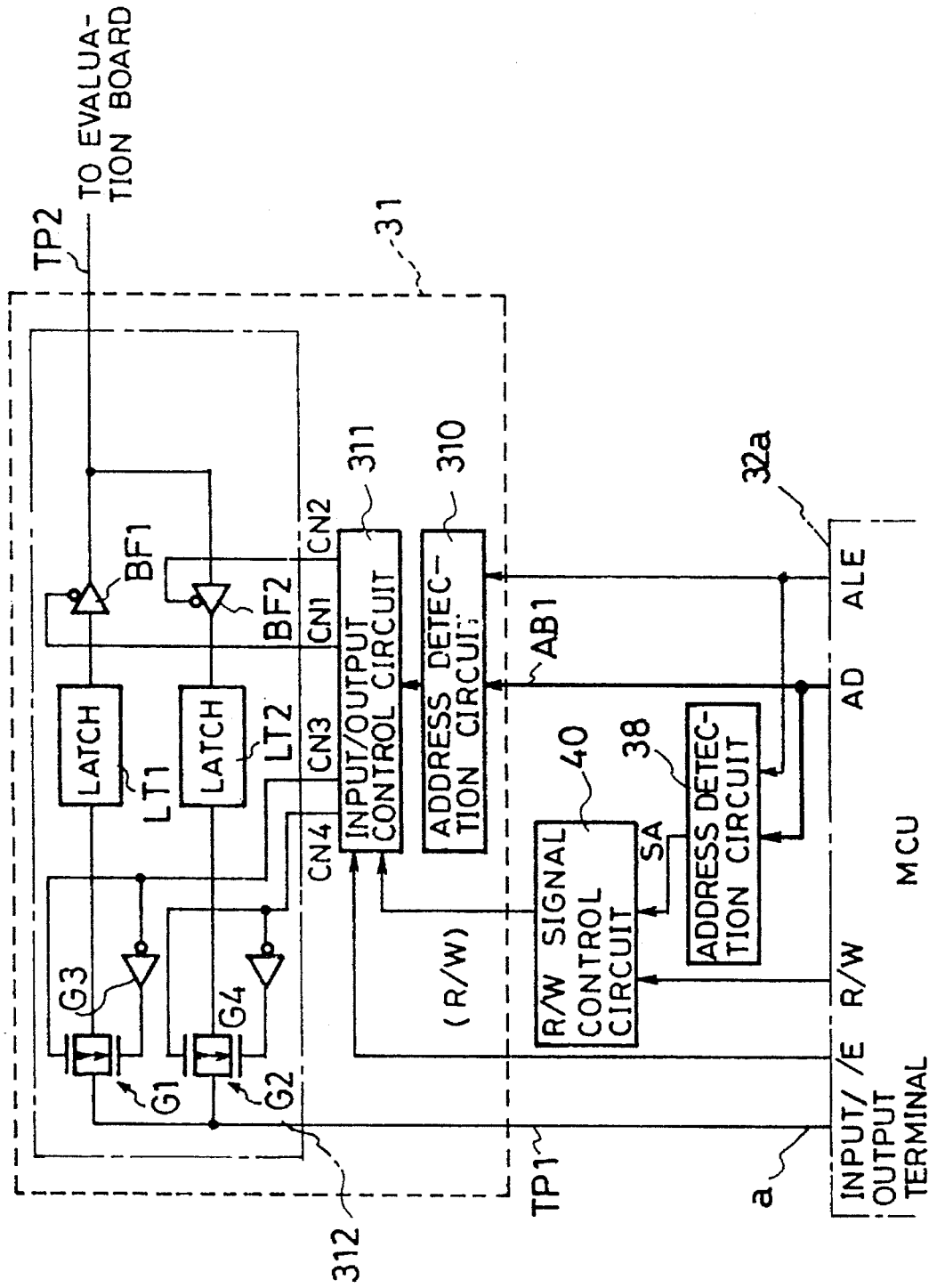
FIG. 30 is a diagram showing the connection between the port emulation circuit, evaluation MCU, read/write control circuit, and address detection circuit included in the pod in FIG. 29.

FIG. 30 shows the connection between the port emulation circuit 31, evaluation MCU 32a, address detection circuit 38, and R/W signal control circuit 40. The R/W control circuit 40 outputs the read/write signal (R/W)' by responding to the read/write signal outputted from the MCU 32a and the address detection signal SA outputted from the address detection circuit 38. The read/write signal (R/W)' is given to the input/output control circuit 311 in the port emulation circuit 31. The constitution of other portions is the same as the constitution shown in FIG. 25.

Figure 31:
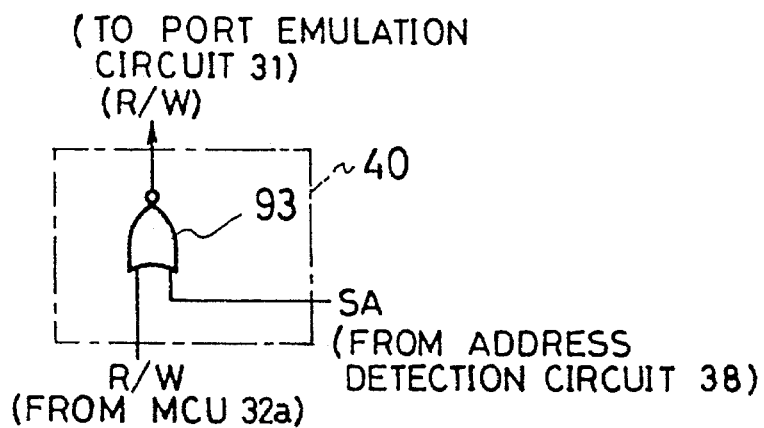
FIG. 31 is a circuit diagram showing the constitution of the read/write control circuit included in the pod in FIG. 29.

FIG. 31 shows detailed constitution of the R/W signal control circuit 40. The R/W signal control circuit 40 includes the NOR gate 93. The NOR gate 93 receives the read/write signal R/W from the MCU 32a and the address detection signal SA from the address detection circuit 38. The output signal of the NOR circuit 39 is given to the port emulation circuit 31 as the read/write signal (R/W)'.

The R/W signal control circuit 40 outputs "L"-level read/write signal showing the data writing state when the address detection signal SA is "H" and the read/write signal R/W as the read/write signal (R/W)' when the address detection signal SA is "L".

Thus, the read/write signal (R/W)' is set to "L" (writing state) when the address signal AD outputted from the MCU core 32b in the MCU 32a specifies an address in the newly-added circuit section 32c. Therefore, the input/output circuit 312 in the port emulation circuit 31 is set to the data output state.

Figure 32:
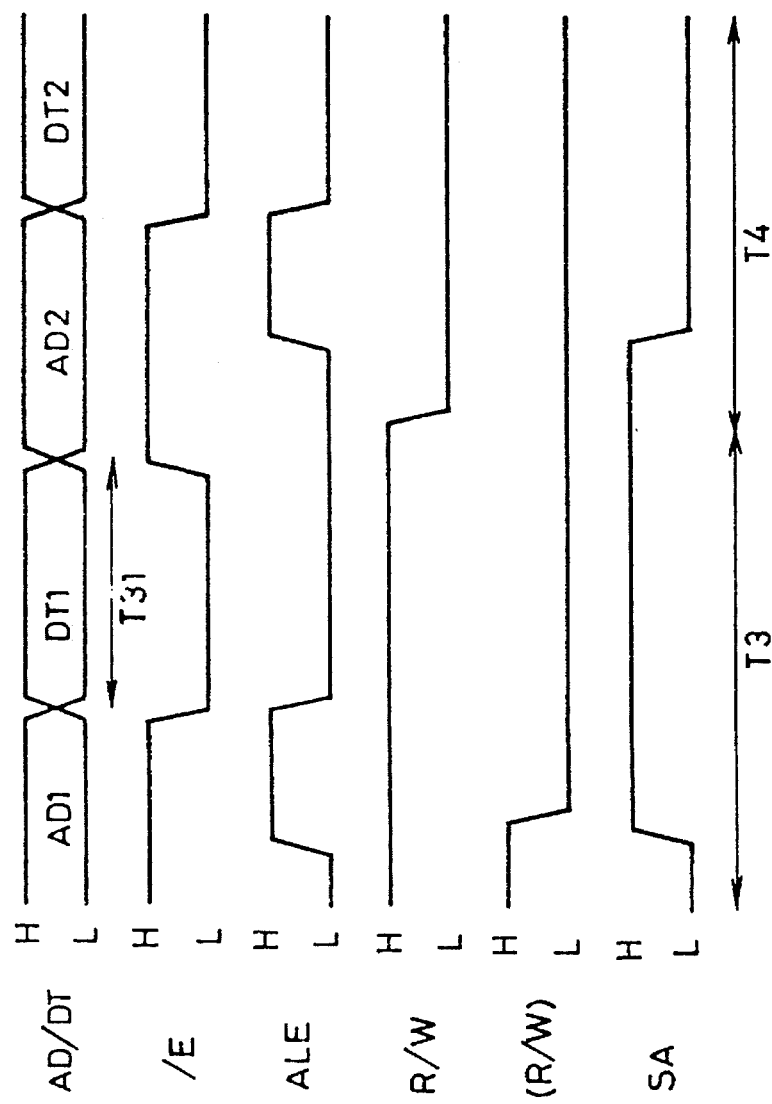
FIG. 32 is a timing chart for explaining the operation of the pod in FIG. 29.

FIG. 32 is a timing chart for explaining the operation of the pod 3d shown in FIG. 29. In FIG. 32, the period T3 shows a period for the MCU core 32b (see FIG. 43) to read data from the newly-added circuit section 32c (see FIG. 43) and the period T4 shows a period for the MCU core 32b to write data in an external unit.

In the period T3, the MCU core 32b is set to the state for indicating "read" and the read/write signal R/W is set to "H".

For the existing pod 3, the read/write signal R/W outputted from the MCU 32a is given to the port emulation circuit 31. Therefore, the port emulation circuit 31 judges that the MCU 32a is set to the data reading state. Thereby, the input/output circuit 312 is set to the data output state. Resultingly, no data is given to the input/output terminal "a" of the MCU 32a.

Thus, when the MCU core 32b in the MCU 32a reads data from the newly-added circuit section 32c assigned with an address corresponding to the chip-outside address area of the developed MCU 32, "L"-level read/write signal (R/W)' for indicating the data writing state is given to the port emulation circuit 31. As a result, the input/output circuit 312 in the port emulation circuit 31 is set to the output state.

Therefore, it is avoided that the signal given from the evaluation board 4 or debugger 2 to the port emulation circuit 31 collides with the signal outputted from the newly-added circuit section 32c in the evaluation MCU 32a. Thereby, the MCU 32a normally operates.

This embodiment makes it possible to apply the program development apparatus used for the existing MCU 32 also for a newly-developed MCU by providing the program development apparatus with the simple address detection circuit 38 and R/W signal control circuit 40.

The first embodiment makes it possible to develop a program for a newly developed microcomputer by proving the existing program development apparatus with a disabling means.

The second and third embodiments make it possible to develop a program for a newly developed microcomputer without extremely increasing the number of wires in the existing program development apparatus because an address detection means is used for the microcomputer.

Especially, it is possible to avoid decrease of the number of general-purpose input/output terminals of the program development apparatus by using a common external terminal and selection means.

If the detection means also detects an address in the third address area, an external circuit can directly be connected with the microcomputer even if the method for connection between the program development apparatus and external circuit is restricted due to restriction of the operation of the program development apparatus. Moreover, when an address area should be changed due to future change of a system, it can be changed only by changing the program for operating the program development apparatus. As a result, it is possible to constitute a very flexible program development system.

The fourth embodiment makes it possible to constitute a program development system by using the existing program development apparatus in order to develop a program for a newly developed microcomputer.

The fifth embodiment makes it possible to develop a program for a newly developed microcomputer by using the external unit of the program development apparatus for the existing microcomputer because an indication signal output means is used for the microcomputer.

The sixth and seventh embodiments make it possible to develop a program for a newly developed microcomputer by using a signal output means for the existing program development apparatus.

For the first to seventh embodiments, as described above, it is unnecessary to develop a new program development apparatus for a newly developed microcomputer. Therefore, it is possible to greatly decrease the development cost, development period, and development labor.

What is claimed is:

1. Apparatus for use in a microcomputer, said microcomputer capable of addressing an addressable area having at least a first address area and a second address area, wherein the microcomputer includes:
   a microcomputer core including an internal circuit assigned with the first address area;
   a logic circuit means assigned with the second address area, said second address area being different from the first address area; and
   a detection means, responsive to an address signal from the microcomputer, for outputting a detection signal when the address signal specifies an address in the second address area; and wherein the apparatus further includes:
   an input/output means, coupled between said microcomputer and an external unit, said means responsive to an address signal from the microcomputer, for inputting a signal from the external unit to the microcomputer when said input/output means is set to an input state, and for outputting a signal from the microcomputer to the external unit when said input/output means is set to an output state; and
   a disabling means for preventing the input/output means from being set to the input state by responding to the detection signal sent from the detection means.

2. Apparatus according to claim 1, wherein the microcomputer further includes:
   a common external terminal and a selection means, wherein said selection means is for transferring an input or output signal either to the microcomputer core or to the logic circuit; and
   a detection signal generated by the detection means, wherein said detection signal is transferred to or from the common external terminal by time-sharing between the detection signal and the input or output signal.

3. Apparatus according to claim 1, wherein the addressable area of the microcomputer further comprises a third address area different from the first and second address areas, and wherein the detection means also outputs the detection signal when the address signal specifies an address in the third address area.

4. Apparatus for use with a first microcomputer, wherein the apparatus includes:
   a second microcomputer including an internal circuit assigned with a first address area; and
   an input/output means, responsive to an address signal sent from the second microcomputer, for inputting a signal given from an external unit to the second microcomputer when said input/output means is set to an input state; and for outputting a signal given from the second microcomputer to an external unit when said input/output means is set to an output state; and wherein the first microcomputer includes:
   a microcomputer core including an internal circuit assigned with the first address area;
   a logic circuit means assigned with a second address area different from the first address area, said logic circuit means connected to the second microcomputer and the input/output means of the apparatus; and
   a control means, responsive to signals from said microcomputer, for independently operating the logic circuit means.

5. A microcomputer capable of addressing at least a first and a second address area, the microcomputer comprising:
   a microcomputer core including an internal circuit assigned with the first address area;
   a logic circuit means assigned with the second address area, said second address area different from the first address area; and
   an indication signal output means, coupled to said microprocessor and responsive to an address signal from the microcomputer, for outputting an indication signal to prevent input of data to the microprocessor when the address signal specifies an address located in the second address area.

6. Apparatus for use with a microcomputer, wherein the microcomputer includes a control circuit for generating an enable/disable indication signal to indicate whether to enable or disable input/output of data, a microcomputer core, and an internal circuit assigned with a first address area, wherein the apparatus comprises:
   an input/output means, responsive to an address signal from the microcomputer, for enabling transfer of an external signal to or from the microcomputer when the enable/disable indication signal indicates "enable" and for disabling transfer of an external signal to or from the microcomputer when the enable/disable indication signal indicates "disable"; and
   a signal generation means, responsive to an address signal received from the microcomputer, for providing the input/output means with a disable indication signal for setting the input/output means to the input/output disabling state, wherein said disable indication signal functions in place of the enable/disable indication signal sent from the microcomputer when the address signal specifies an address in a second address area different from the first address area.

7. Apparatus for use with a microcomputer, wherein the microcomputer includes a control circuit for generating a read/write indication signal to indicate read/write of data, a microcomputer core, and an internal circuit assigned with a first address area wherein the apparatus comprises:
   an input/output means, responsive to the read/write indication signal, for inputting a signal given from an external unit to the microcomputer when the read/write indication signal indicates "read" and for outputting a signal given from the microcomputer to an external unit when the read/write indication signal indicates "write"; and
   a signal generation means, responsive to an address signal received from the microcomputer, for providing the input/output means with a write indication signal for setting the input/output means to an output state, wherein said write indication signal functions in place of the read/write indication signal sent from the microcomputer when the address signal specifies an address in a second address area different from the first address area.

* * * * *

UNITED STATES PATENT AND TRADEMARK OFFICE
CERTIFICATE OF CORRECTION

PATENT NO. : 5,463,738
DATED : October 31, 1995
INVENTOR(S) : Tsugumi Matsuishi; Toshihiko Hori; Shinji Suda It is certified that error appears in the above-indentified patent and that said Letters Patent is hereby corrected as shown below:

Column 26, claim 5, lines 1-13

5. A microcomputer capable of addressing at least a first and a second address area, the microcomputer comprising:
    a microcomputer core including an internal circuit assigned with the first address area;
    a logic circuit means assigned with the second address area, said second address area different from the first address area; and
    an indication signal output means, coupled to [said microprocessor] <u>said microcomputer core</u> and responsive to an address signal from the microcomputer, for outputting an indication signal to preven tinput of data to [the microprocessor] <u>said microcomputer core</u> when the address signal specifies an address located in the second address area.

Signed and Sealed this

Twenty-seventh Day of August, 1996

Attest:

BRUCE LEHMAN

Attesting Officer      Commissioner of Patents and Trademarks